(12) United States Patent
Williams

(10) Patent No.: US 10,093,403 B2
(45) Date of Patent: *Oct. 9, 2018

(54) MODULAR RAPID DEVELOPMENT SYSTEM FOR BUILDING UNDERWATER ROBOTS AND ROBOTIC VEHICLES

(71) Applicant: Eddie Hugh Williams, Los Osos, CA (US)

(72) Inventor: Eddie Hugh Williams, Los Osos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/089,929

(22) Filed: Apr. 4, 2016

(65) Prior Publication Data

US 2016/0325809 A1 Nov. 10, 2016

Related U.S. Application Data

(63) Continuation of application No. 14/495,799, filed on Sep. 24, 2014, now Pat. No. 9,315,248.

(Continued)

(51) Int. Cl.
*B63G 8/00* (2006.01)
*B25J 9/08* (2006.01)
(Continued)

(52) U.S. Cl.
CPC ........... *B63G 8/001* (2013.01); *B25J 9/08* (2013.01); *B63B 3/13* (2013.01); *B63B 9/06* (2013.01);
(Continued)

(58) Field of Classification Search
CPC . B63G 8/00; B63G 8/001; B63G 8/08; B63G 2008/00; B63G 2008/001;
(Continued)

(56) References Cited

U.S. PATENT DOCUMENTS 896,361 A 8/1908 Cage
1,358,081 A 11/1920 Kennedy
(Continued)

OTHER PUBLICATIONS

Hacksters Blog; "Fathom One is an Affordable, Modular Underwater Drone"; http://blog.hackster.io/fathom-one-is-an-affordabe-modular-underwater-drone-5f5efb62408f; Aug. 30, 2016; pp. 1-2.

(Continued)

*Primary Examiner* — Daniel V Venne
(74) *Attorney, Agent, or Firm* — Fitch, Even, Tabin & Flannery LLP

(57) ABSTRACT

An underwater robotic vehicle development system for building underwater robotic vehicles (URVs), including a pressure vessel system, modular chassis elements, a propulsion system and compatible buoyancy modules. The pressure vessel system uses standardized, interchangeable modules to allow for ease of modification of the URV and accommodation of different internal and external components such as sensors and computer systems. The system also includes standard, reconfigurable connections of the pressure vessel to the modular chassis system. A standardized, modular propulsion system includes a magnetic clutch, and a magnetic sleeve used to power the URV on or off.

19 Claims, 69 Drawing Sheets

Related U.S. Application Data

(60) Provisional application No. 61/881,894, filed on Sep. 24, 2013.

(51) Int. Cl.
*B63G 8/08* (2006.01)
*B63B 3/13* (2006.01)
*B63B 9/06* (2006.01)

(52) U.S. Cl.
CPC .......... *B63G 8/08* (2013.01); *B63G 2008/005* (2013.01); *Y10S 901/01* (2013.01)

(58) Field of Classification Search
CPC ........ B63G 2008/002; B63G 2008/004; B63G 2008/005; B63G 2008/007; B63G 2008/08; B63G 2008/008; B63B 3/13; B63B 9/06; B25J 9/08; Y10S 901/01
USPC ....... 114/312, 313, 321, 322, 324, 325, 330, 114/332, 333, 337, 338, 341, 342
See application file for complete search history.

(56) References Cited

U.S. PATENT DOCUMENTS

| | | | |
|---|---|---|---|
| 1,753,399 A | 4/1930 | Blair | |
| 1,817,780 A | 8/1931 | Stack | |
| 2,401,453 A | 6/1946 | Bell | |
| 3,635,183 A | 1/1972 | Keatinge | |
| 3,957,007 A * | 5/1976 | Thomas | A63B 35/125 114/315 |
| 5,417,597 A | 5/1995 | Levedahl | |
| 5,995,882 A * | 11/1999 | Patterson | B63B 27/36 114/312 |
| 6,427,615 B1 | 8/2002 | Ku | |
| 6,484,660 B1 | 11/2002 | English | |
| 6,634,825 B2 | 10/2003 | Tolkoff | |
| 6,807,921 B2 | 10/2004 | Huntsman | |
| 6,928,947 B1 | 8/2005 | Clapham | |
| 7,013,827 B2 | 3/2006 | Harland-White | |
| 7,290,496 B2 | 11/2007 | Asfar | |
| 7,533,625 B2 | 5/2009 | Lambertus | |
| 7,721,669 B1 | 5/2010 | Portmann | |
| 7,926,438 B2 | 4/2011 | Guerrero | |
| 8,333,295 B1 * | 12/2012 | Parker | H05K 5/061 114/312 |
| 2008/0041293 A1 | 2/2008 | Diorio | |
| 2008/0041294 A1 | 2/2008 | Diorio | |
| 2011/0061583 A1 | 3/2011 | MacKinnon | |
| 2011/0094433 A1 | 4/2011 | Shoda | |
| 2012/0073490 A1 * | 3/2012 | Kohnen | B63G 8/04 114/312 |

OTHER PUBLICATIONS

OpenROV How to Assemble OpenROV v2.5; openrov.dozuki.com; pp. 1-70; 2014.

PBS NewsHour; "How do you Stop Invasive Lionfish? Maybe with a Robotic Zapper"; http://www.pbs.org/newshour/updates/robot-lionfish-invasive-species-rise-nekton/; Aug. 24, 2016; pp. 1-11.

Stackpole; OpenROV How to Assemble OpenROV 2.6; openrov.dozuki.com; pp. 1-90; 2014.

USPTO; Notice of Allowance issued in U.S. Appl. No. 14/495,799 dated Dec. 7, 2015.

Williams; U.S. Appl. No. 14/495,799, filed Sep. 24, 2014.

* cited by examiner

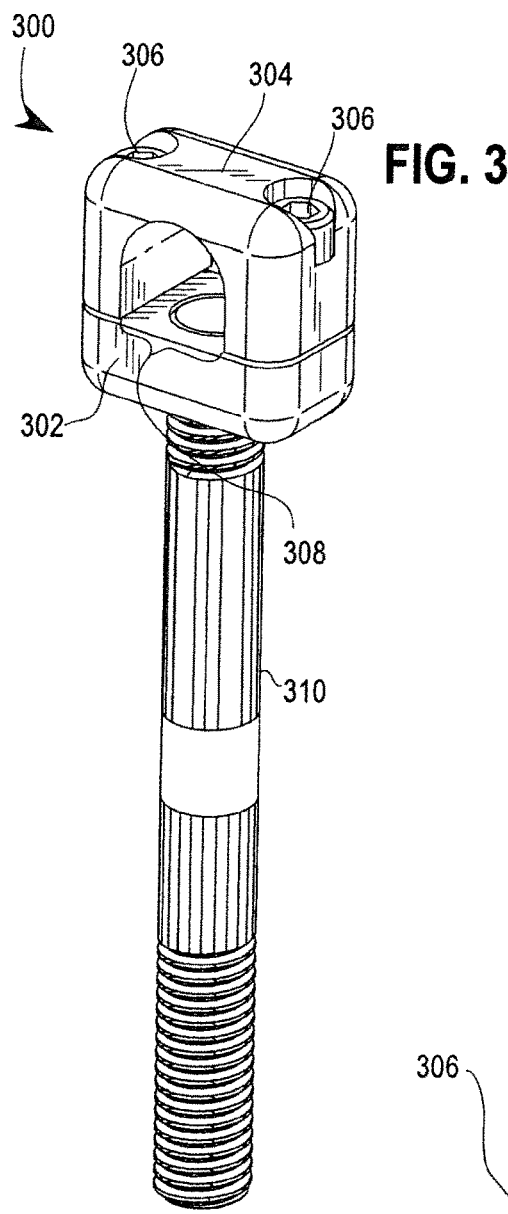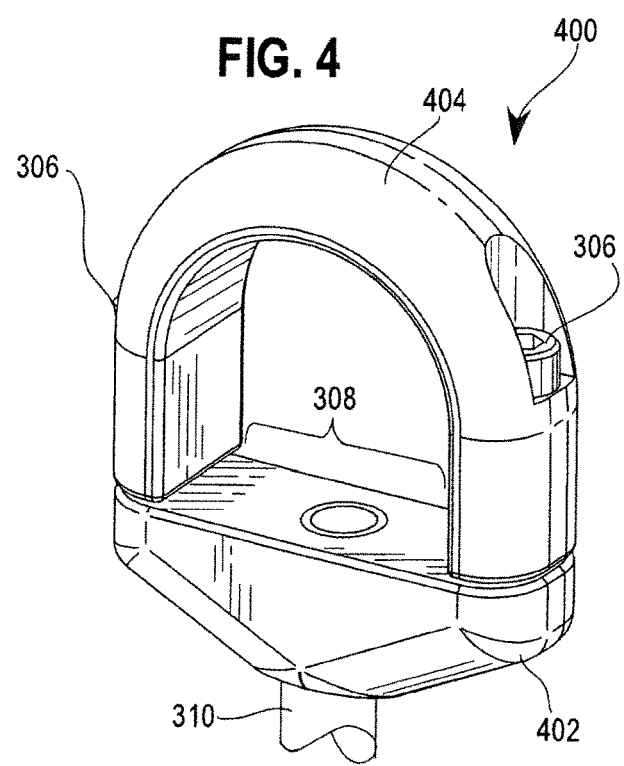

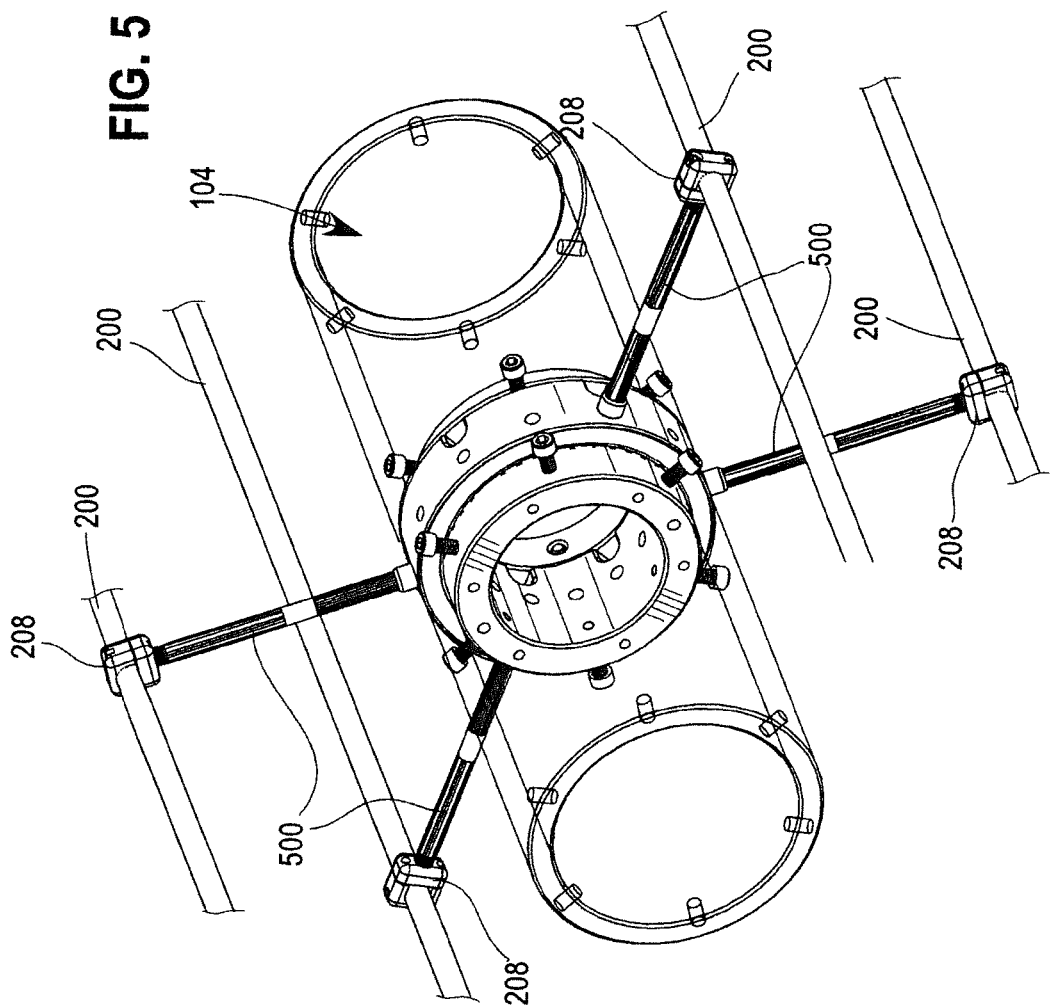

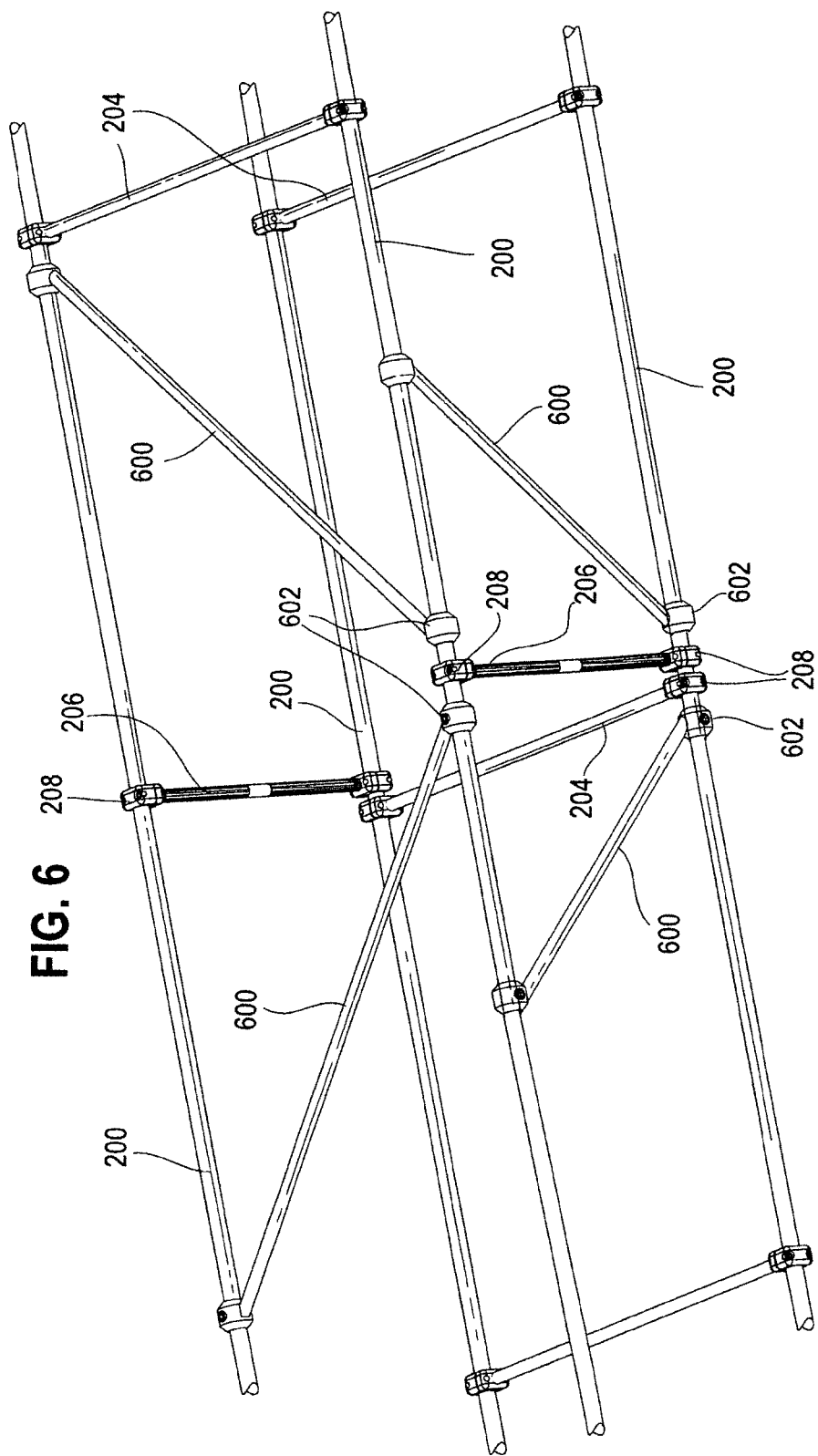

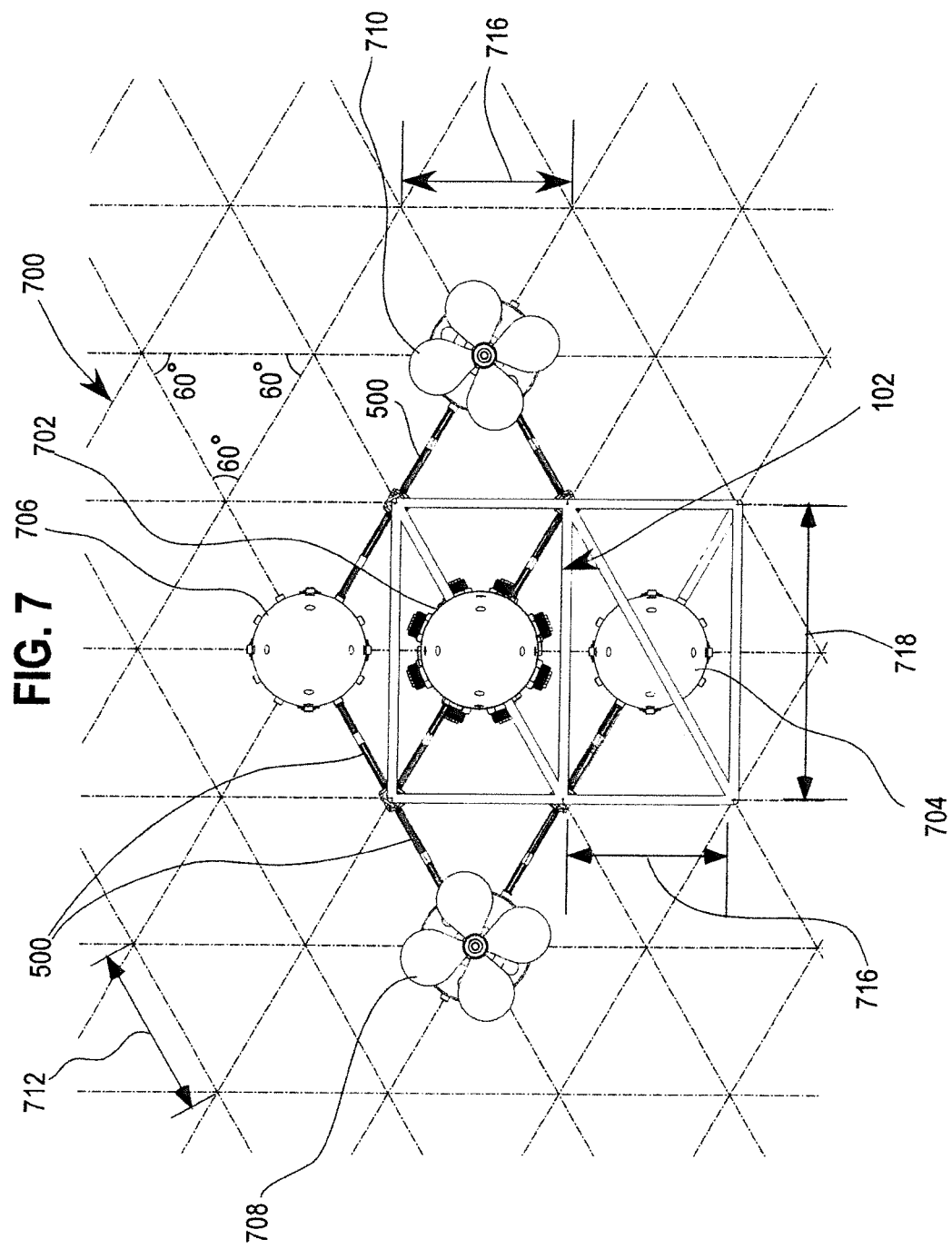

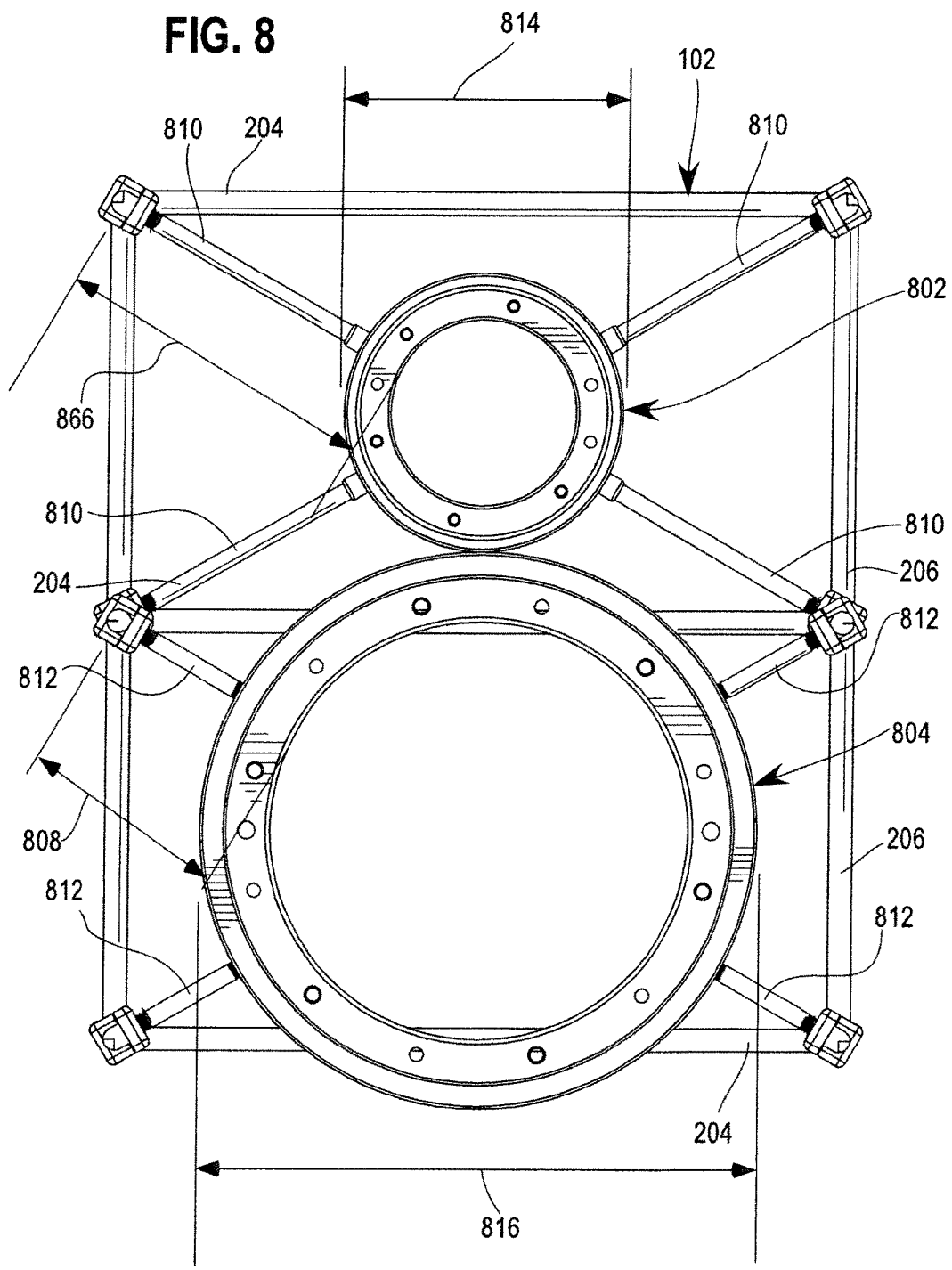

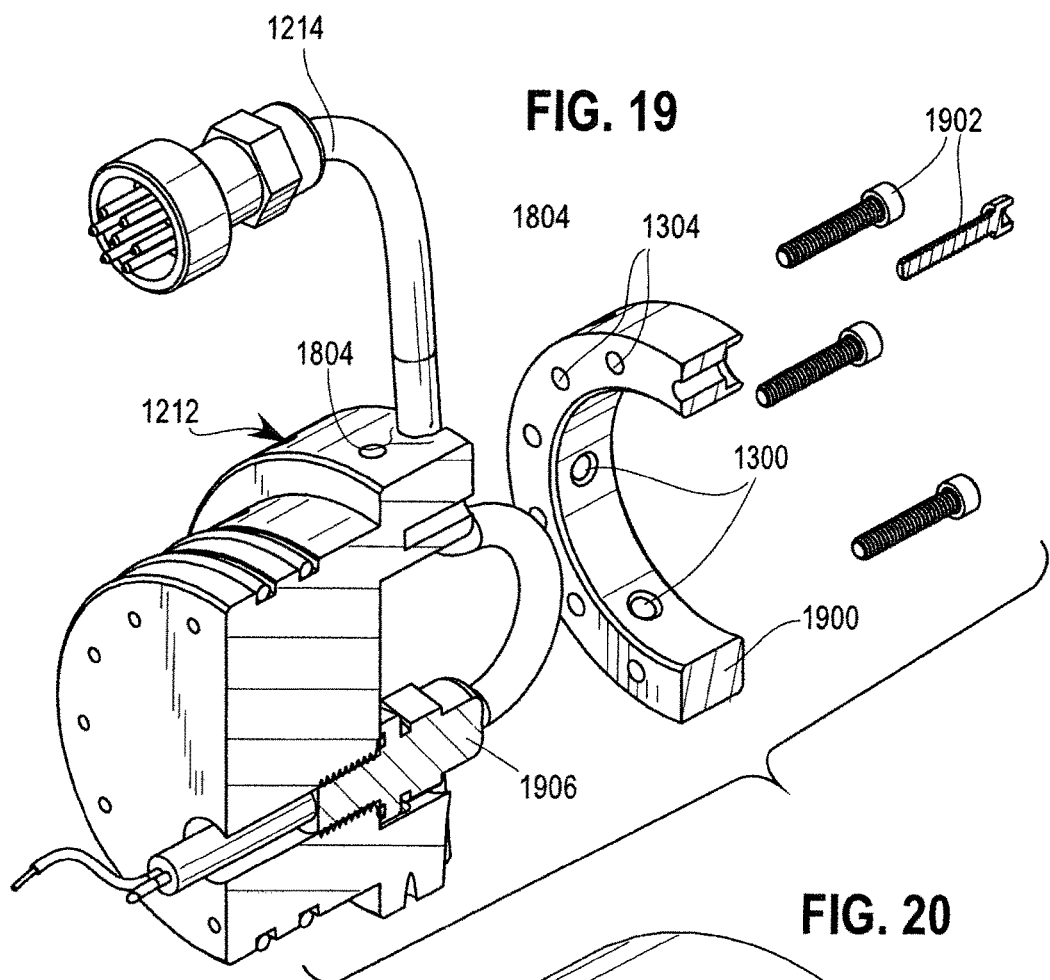

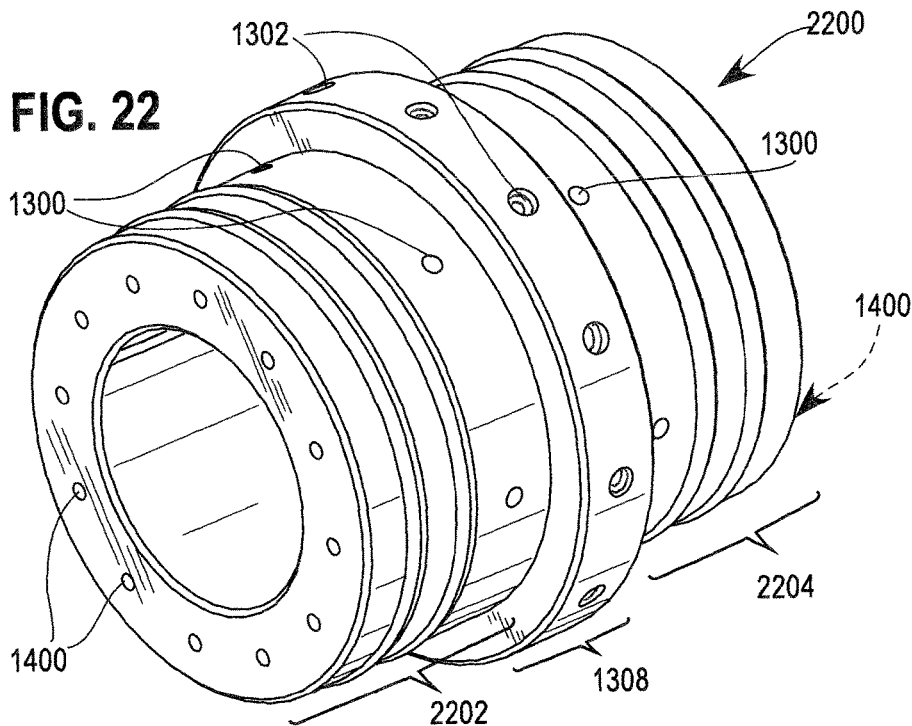
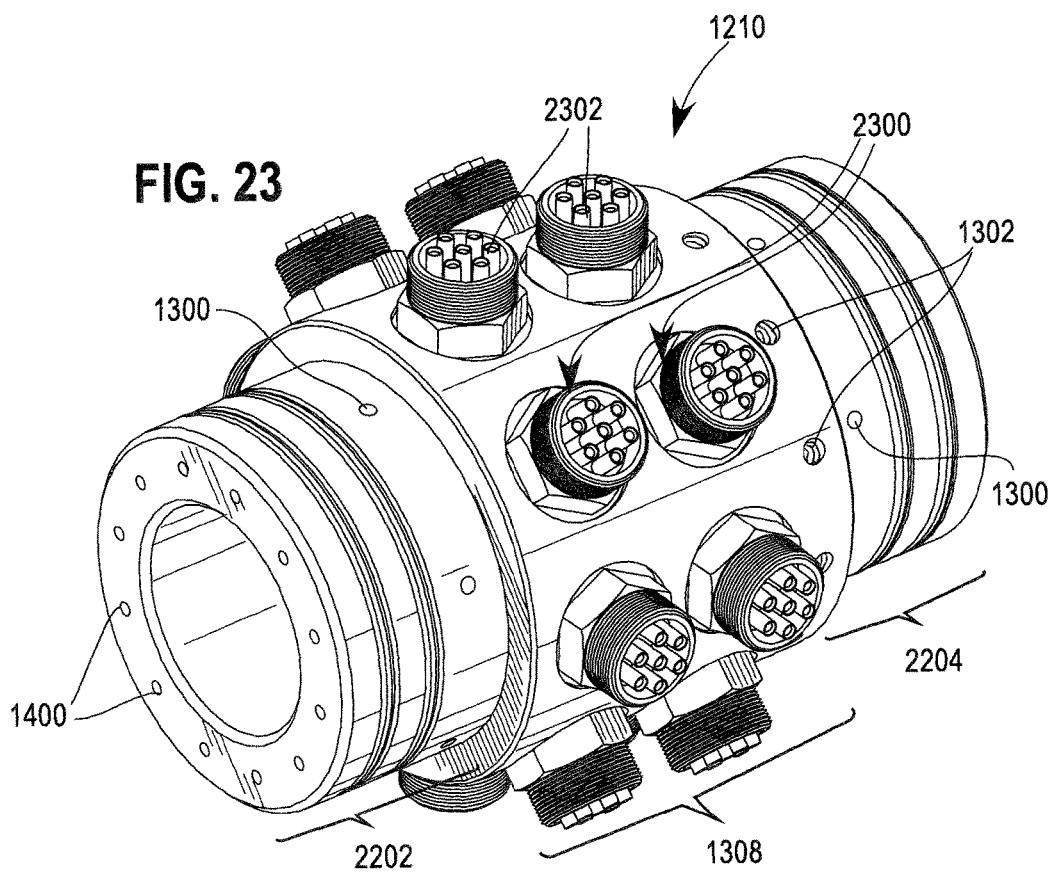

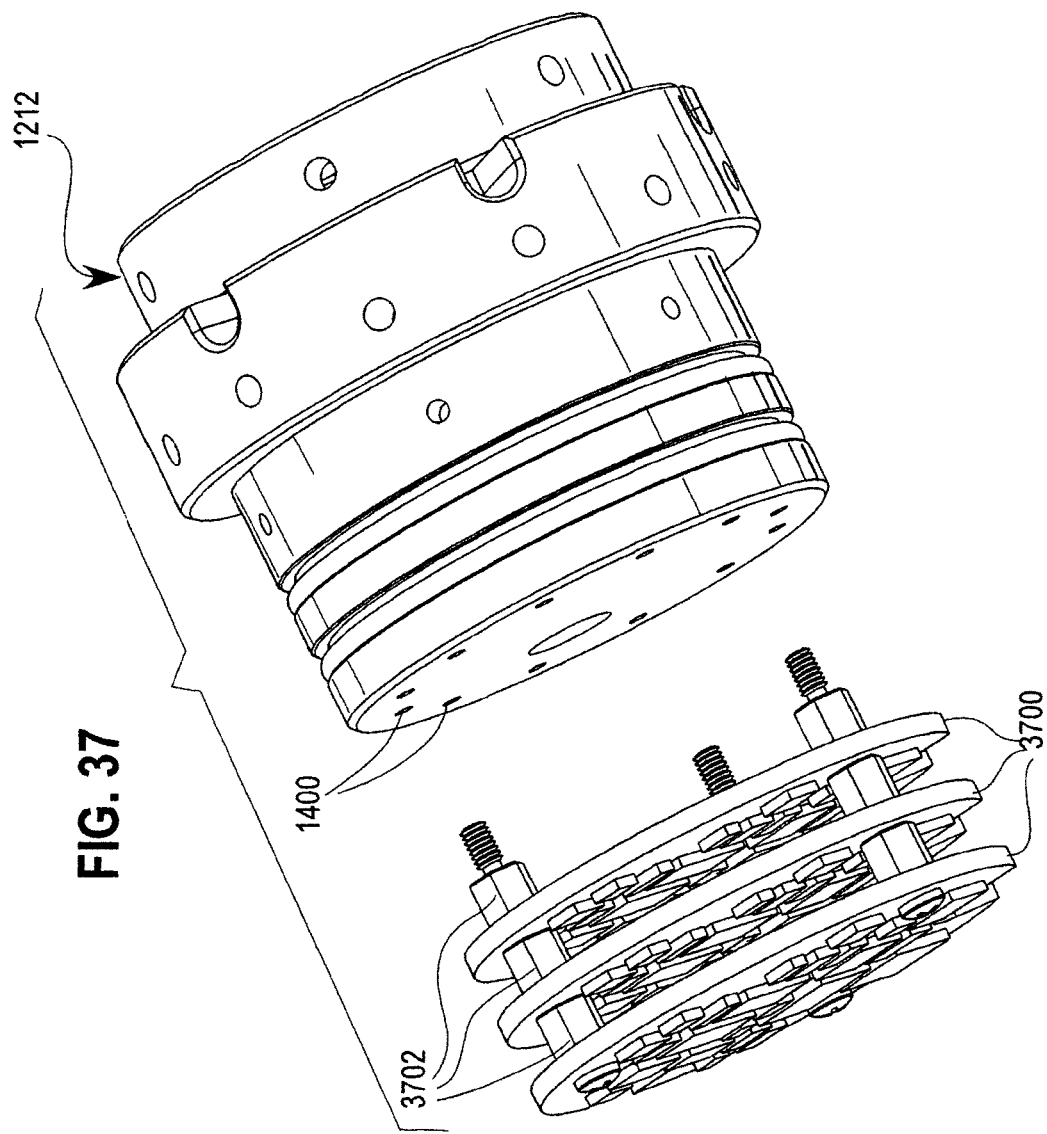

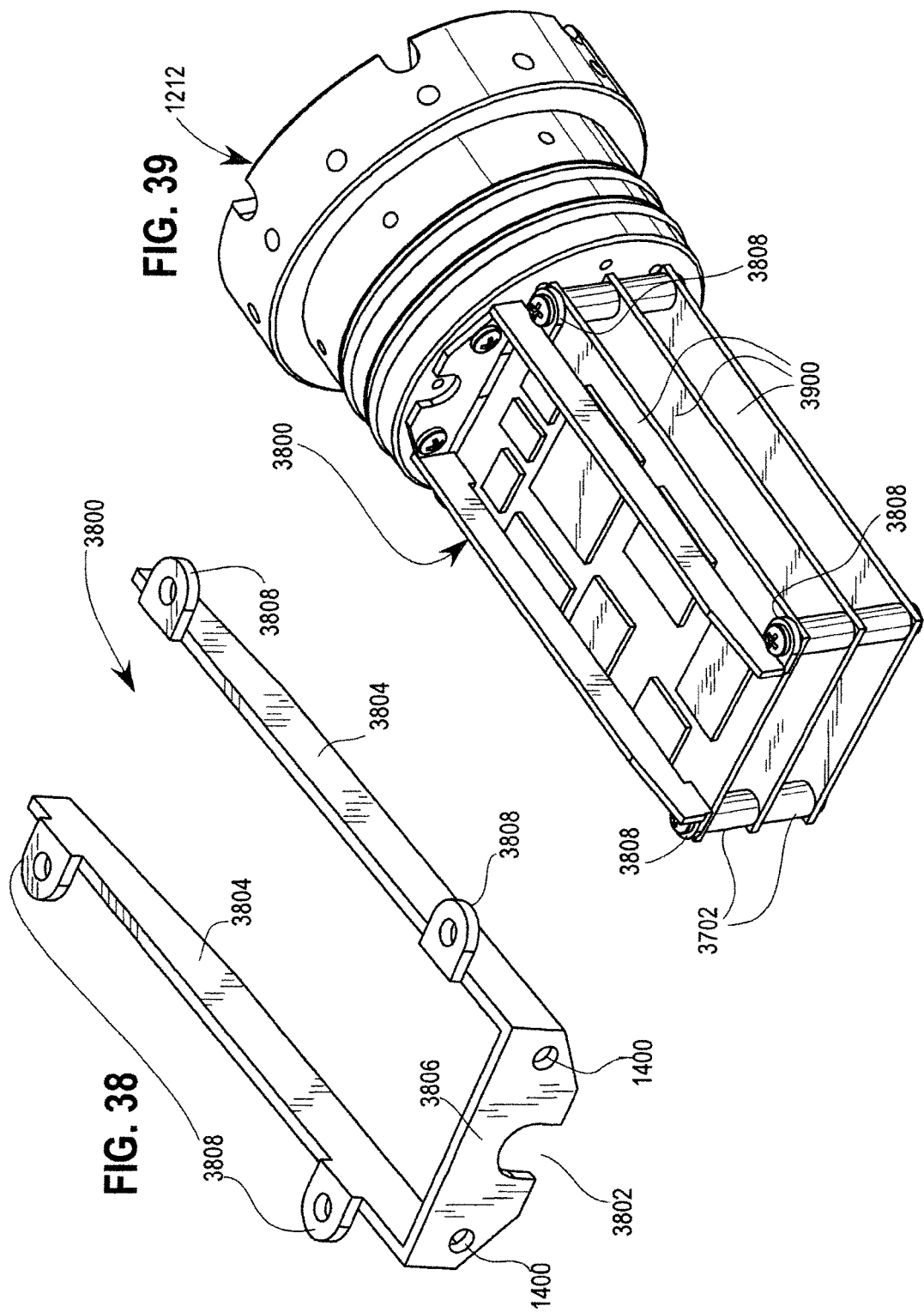

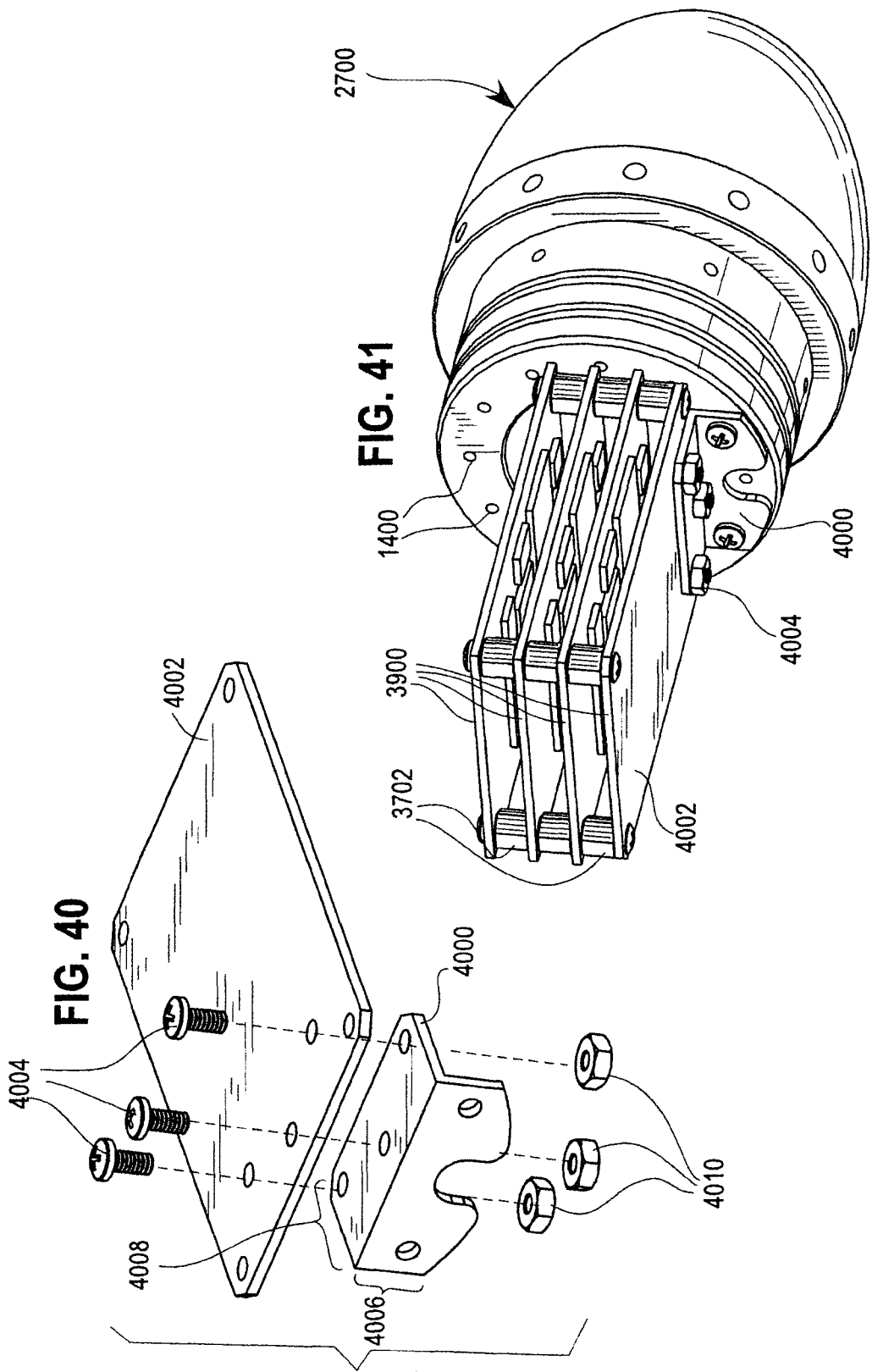

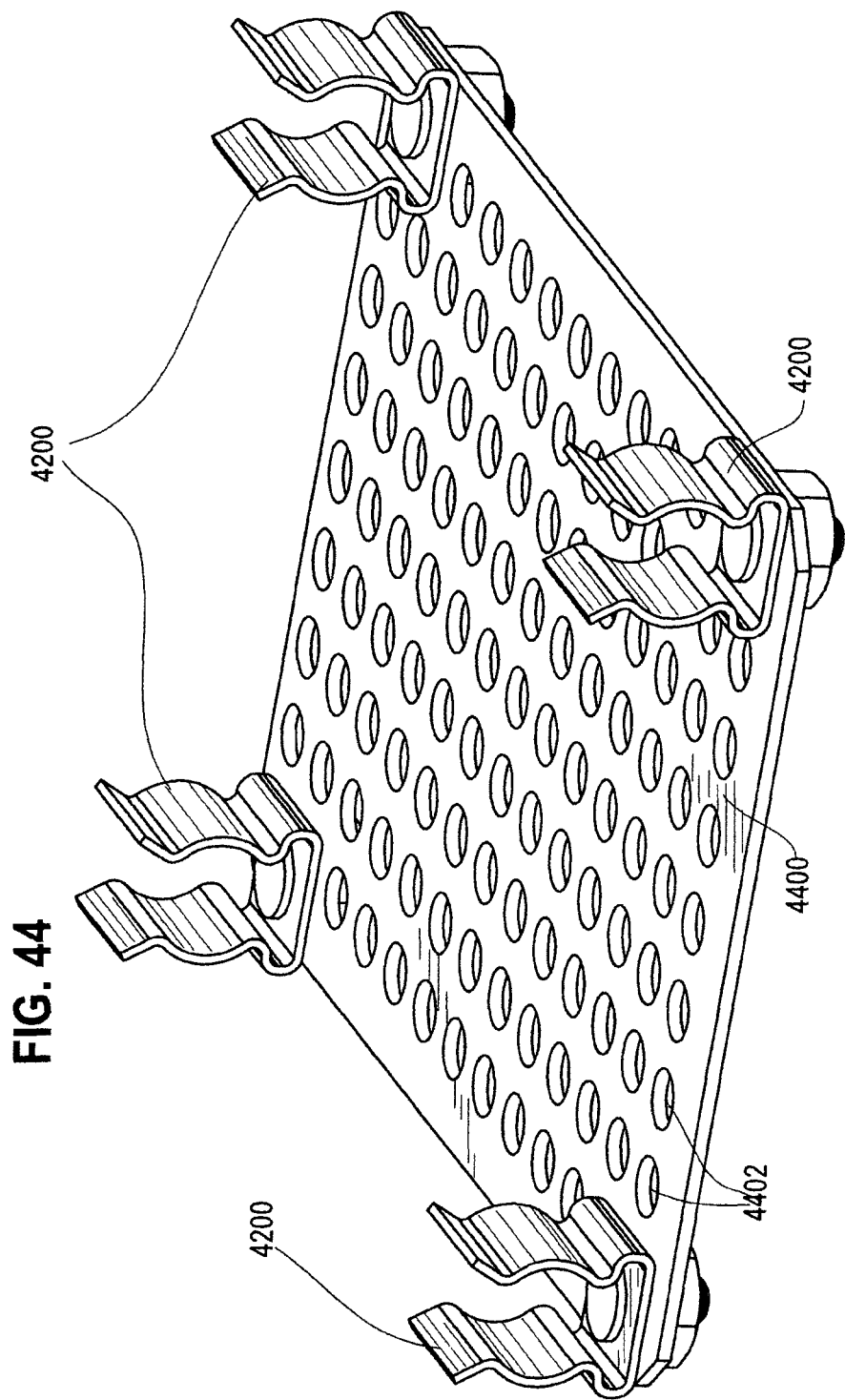

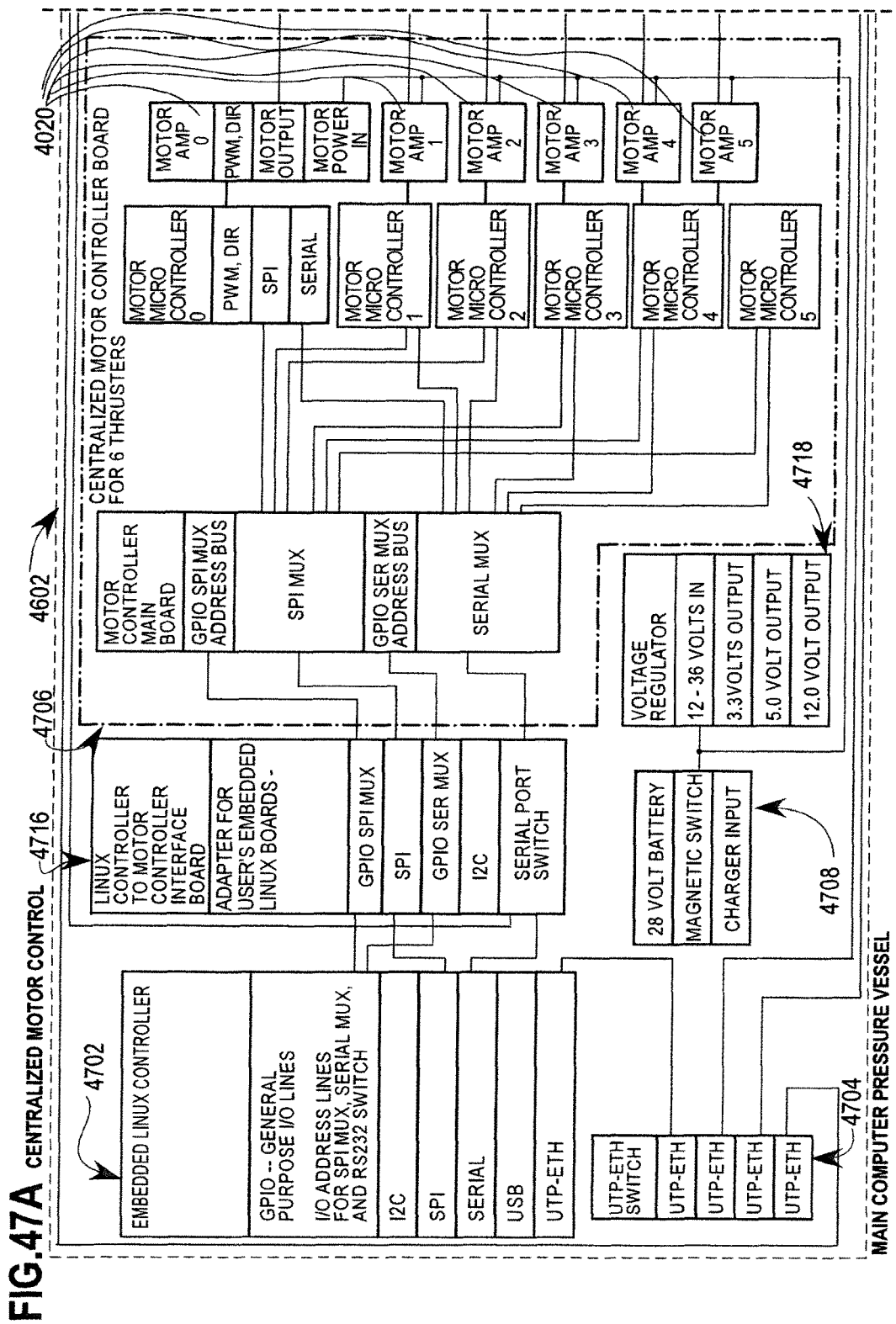
FIG.47A CENTRALIZED MOTOR CONTROL

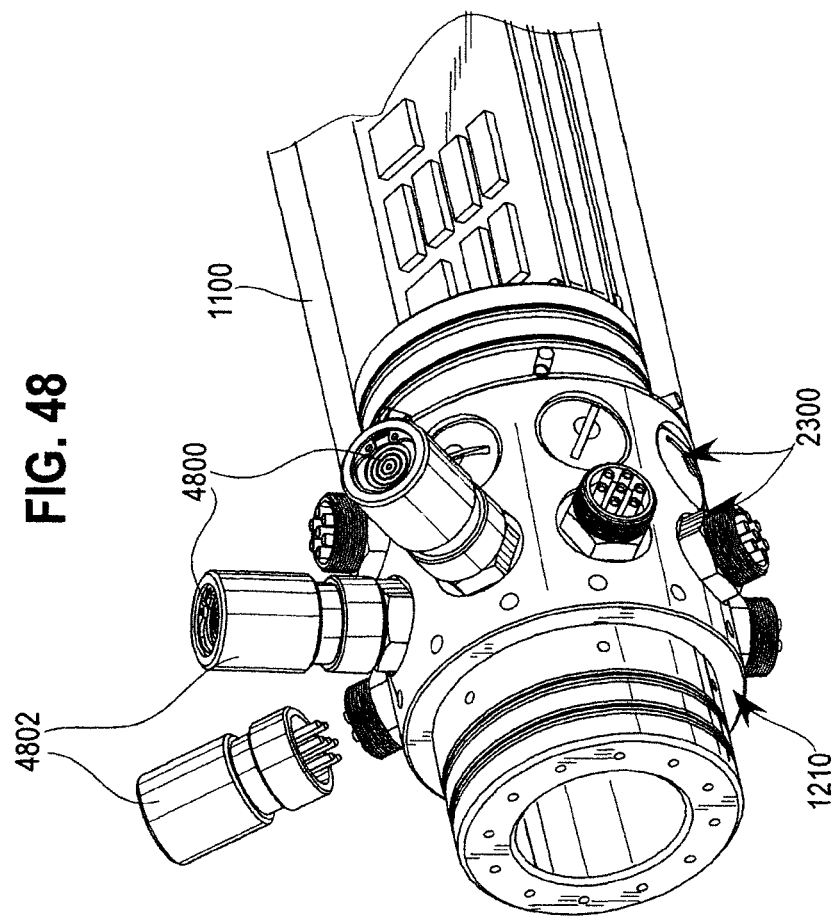

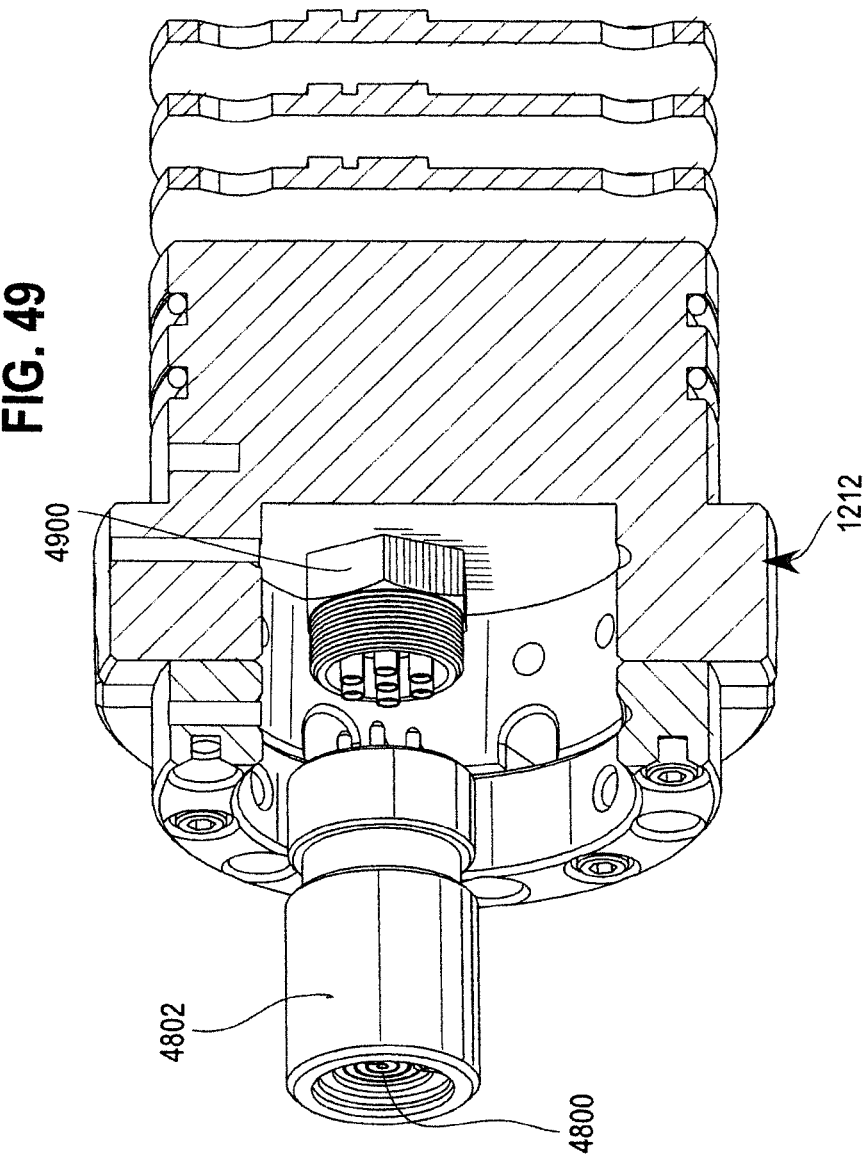

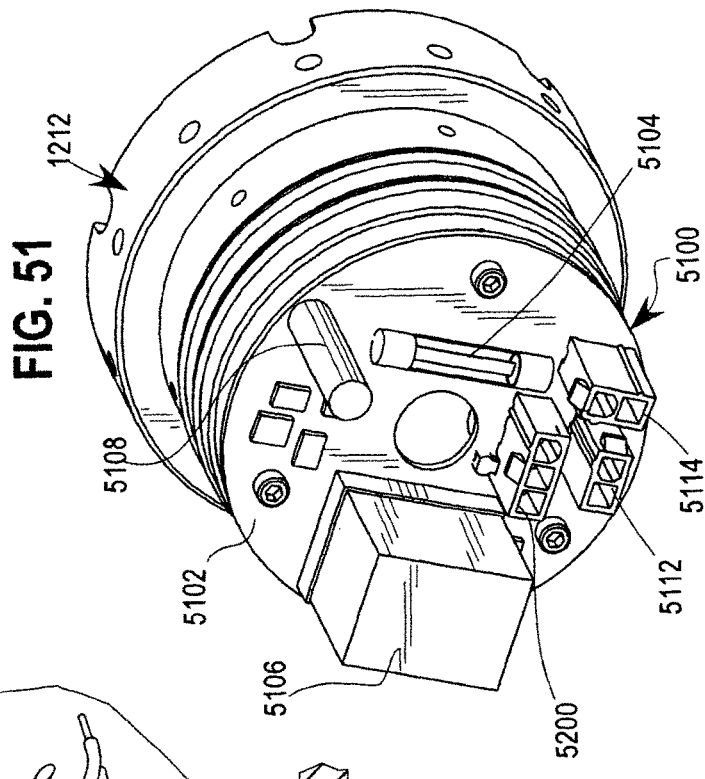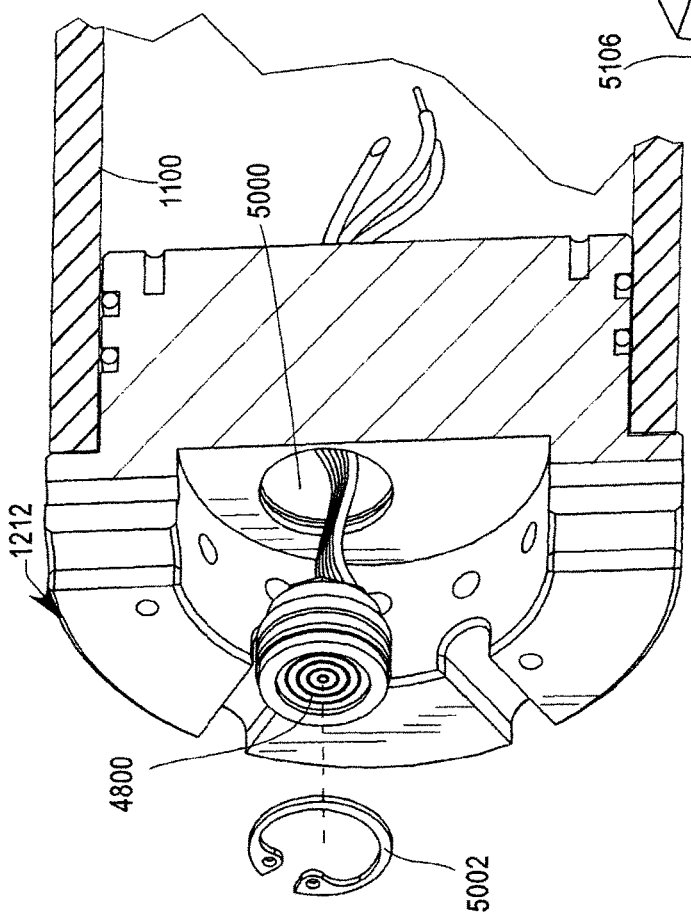

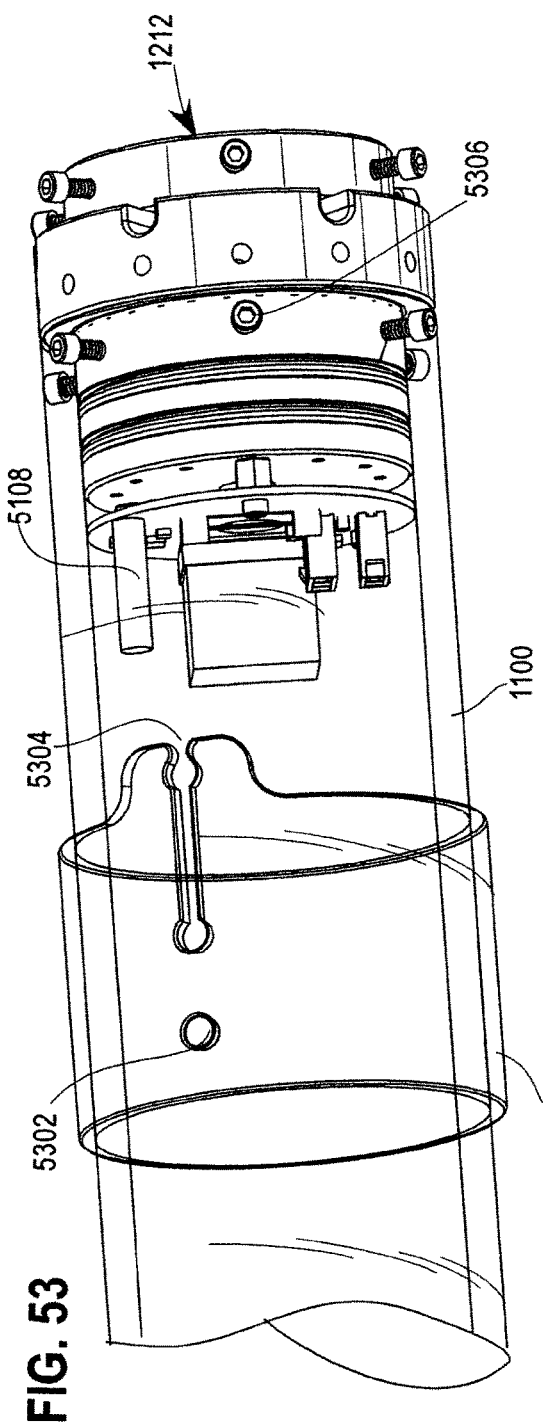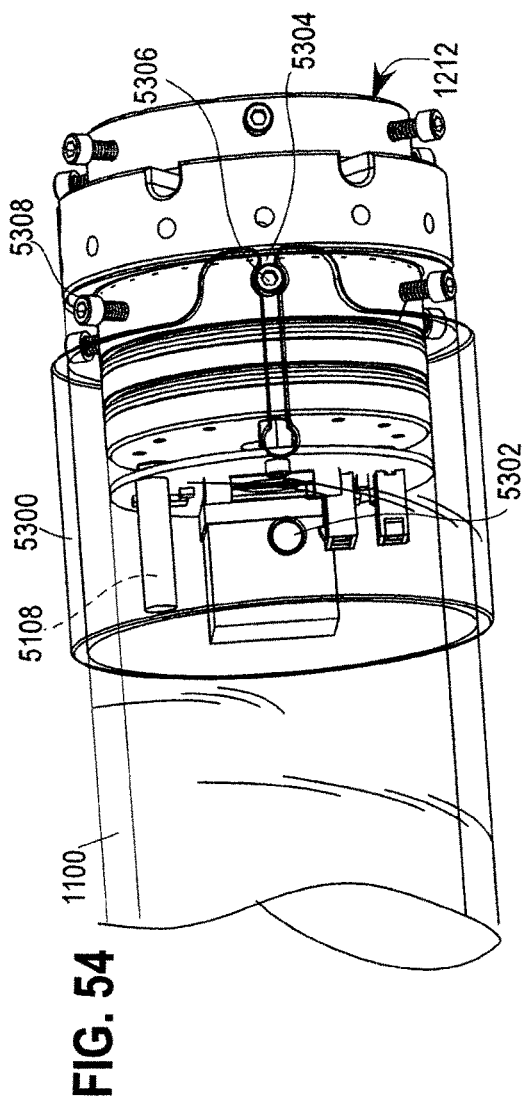
FIG. 53
FIG. 54

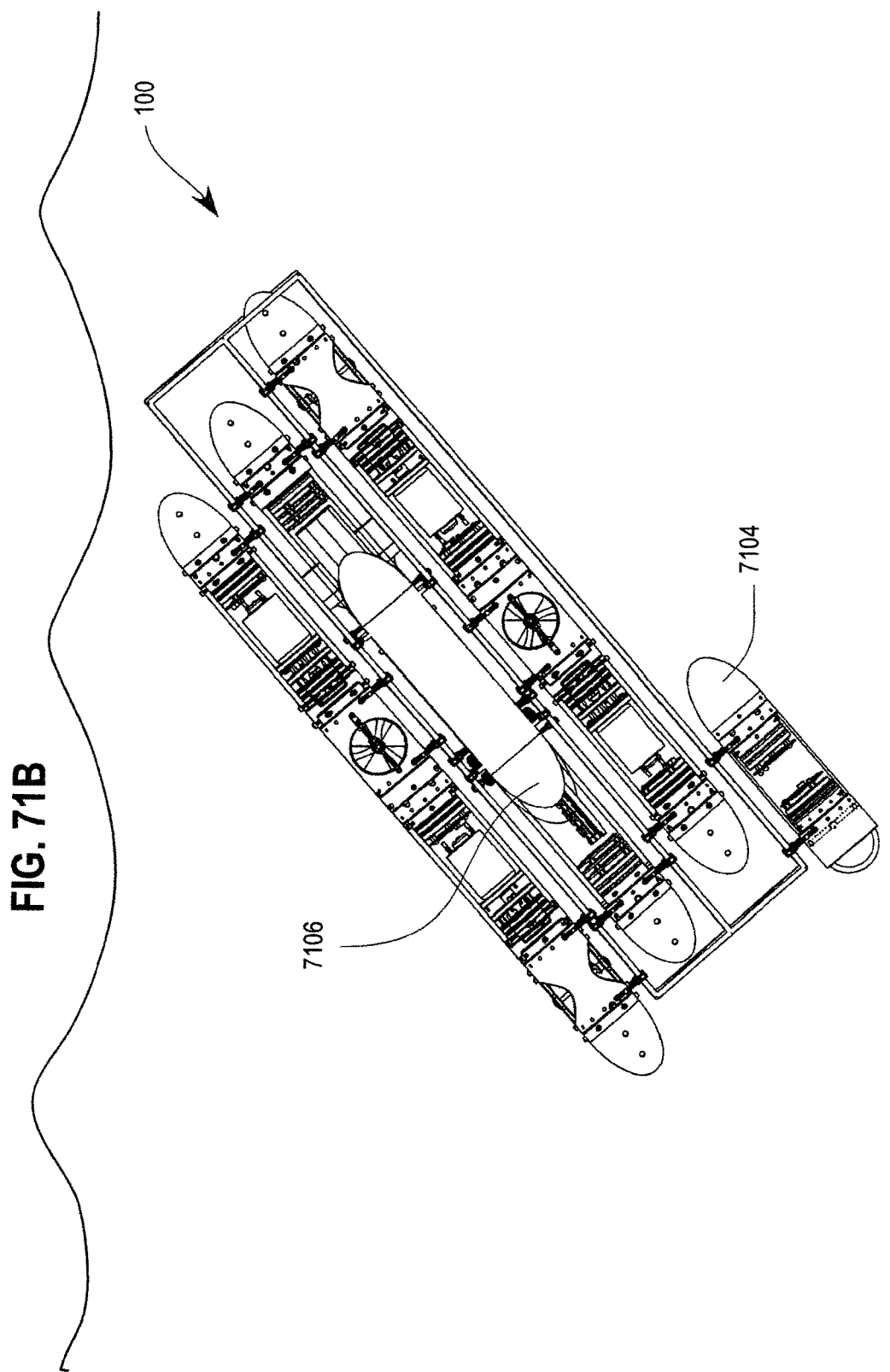

MODULAR RAPID DEVELOPMENT SYSTEM FOR BUILDING UNDERWATER ROBOTS AND ROBOTIC VEHICLES

This application is a continuation of U.S. application Ser. No. 14/495,799, filed Sep. 24, 2014, for MODULAR RAPID DEVELOPMENT SYSTEM FOR BUILDING UNDERWATER ROBOTS AND ROBOTIC VEHICLES, now U.S. Pat. No. 9,315,248, which claims the benefit of U.S. Provisional Application No. 61/881,894, filed Sep. 24, 2013, for MODULAR RAPID DEVELOPMENT SYSTEM FOR BUILDING UNDERWATER ROBOTS AND ROBOTIC VEHICLES, which is incorporated in its entirety herein by reference.

BACKGROUND OF THE INVENTION

1. Field of the Invention

The present invention relates generally to autonomous underwater robots, and more specifically, to systems and methods for building autonomous underwater robots and remotely piloted underwater robotic vehicles

2. Discussion of the Related Art

Just as robotic vehicles have proven their effectiveness as an alternative to manned space exploration, researchers in Oceanography, Sub-Sea Oil and Gas and Mineral Production, Fisheries Management, Marine Environmental Pollution Management, Marine Biological Diversity Surveys, Marine Salvage, Underwater Search and Rescue, and other related fields have found underwater robotic vehicles an effective alternative to sending divers into the water.

Several companies manufacture underwater robotic systems. The primary users of these robots are the sub-sea oil and gas companies, whose profits may justify the robots' high cost. The largest of the marine science institutions such as Scripps Oceanographic Institution, Monterey Bay Aquarium Research Institute, Woods Hole Oceanographic Institute, as well as large governmental agencies such as the National Oceanic and Atmospheric Administration (NOAA) also employ such vehicles for deep ocean research, although in far smaller numbers than in the oil field. The typical high prices reflect their high performance, providing reliable maneuverability, video tele-presence, and ability to manipulate construction tools sometimes thousands of feet below the ocean surface under some of the harshest environmental conditions on earth.

A few companies make relatively low performance systems for a much smaller cost, and many of these are used by municipal search and rescue teams, or for sub-surface ship inspection and other less demanding shallow water tasks. But even at the "low end" those commercial underwater robotic systems exceed the budgets of the majority of potential users of underwater robotic systems.

A second problem exists for these potential users. The least expensive of the commercial systems tend to be single purpose vehicles of very simple design and thus the least flexible in terms of configuration. Many researchers require vehicles with more options for attaching instrument payloads, different cameras, more thruster characteristics, etc., than are present in any commercial systems they can afford. But no commercially available Underwater Robotic System offers its users freedom of choice, at a modular level, over the mechanical configuration of their system (e.g., how many thrusters for degrees of freedom of locomotion), what computational hardware is used to control the system (e.g., a full-function Intel-based computer running either Windows or Linux or a small 8 or 16-bit microcontroller) and whether that processor is programmed in C, Java, Python, or another language. Changing any of these would usually mean switching manufacturers or buying a second system to fit the new requirements. No inexpensive 'build-by-menu and reconfigure-at-will' underwater robotic solution exists for those who need broad freedom in design and configuration.

As a result, most potential users of underwater telepresence robots who need a cheap, simple, easily re-configured system must currently design and build their own underwater robotic system from scratch; this is difficult for even experienced researchers and usually prohibitively so for the inexperienced. While such a do-it-yourself method allows the system to be tailored exactly to the mission requirements at hand, costs can easily exceed the those of a comparable commercial system when design and test time spent dealing with the inadequacies of a leaky, unreliable prototype are factored in. And unless modularity, extendibility, and re-configurability are carefully thought out and designed into the prototype, these scratch-built systems usually fail to provide the flexibility for expansion and re-configuration that the user will soon wish for to meet new performance requirements or to attach new payloads.

SUMMARY OF THE INVENTION

Several embodiments of the invention advantageously address the needs above as well as other needs by providing an underwater pressure vessel system, comprising: a dry end cap comprising a generally cylindrical internal portion including at least one groove extending around a perimeter of the cylindrical body, the at least one groove located proximate to a first end of the dry end cap configured for receiving an o-ring seal; at least one o-ring seal coupled to the cylindrical body and seated in the at least one groove; a generally cylindrical external portion concentric to the internal portion and located distal to the first end, wherein a diameter of the external portion is greater than the diameter of the internal portion, and wherein the end of the external portion distal to the internal portion is a second end of the dry end cap; a plurality of component mounting holes included in the first end of the internal portion, the component mounting holes arrayed in a circle proximate to the perimeter of the internal portion and oriented parallel to a longitudinal axis of the connection module, the component mounting holes configured for coupling of a component to the connection module; a plurality of link strut mounting holes including in the external portion of the connection module, the link strut mounting holes arrayed around a perimeter of the external portion and oriented radially with respect to the external portion, the link strut mounting holes configured to couple to a link strut; and a plurality of tube mounting holes arrayed around the perimeter of the internal portion, oriented radially with respect to the internal portion, and located between the at least one o-ring and the external portion, wherein the plurality of tube mounting holes are configured for coupling to a pressure vessel tube.

BRIEF DESCRIPTION OF THE DRAWINGS

The above and other aspects, features and advantages of several embodiments of the present invention will be more apparent from the following more particular description thereof, presented in conjunction with the following drawings.

FIG. 3 is a perspective view of a light-duty rail clamp.

FIG. 4 is a perspective view of a heavy-duty rail clamp.

FIG. 5 is a perspective view of a pressure vessel coupled to rails via link struts.

FIG. 6 is a perspective view of a portion of the chassis.

FIG. 7 is an elevational end-view of an exemplary URV system superimposed on a chassis grid geometry.

FIG. 8 is an elevational end-view of an exemplary two-frame chassis coupled to two differently-sized pressure vessel.

FIG. 19 is an exploded cross-sectional view of one embodiment of the dry end cap with a mounting rim.

FIG. 20 is a perspective view of an end cap collar in one embodiment of the present invention.

FIG. 22 is a perspective view of the dry link module.

FIG. 23 is a perspective view of a cable manifold link in one embodiment of the present invention.

FIG. 37 is an exploded view of a plurality of circular PCBs is shown for mounting to the dry end cap.

FIG. 38 is a perspective view of a rectangular PCB mounting bracket in one embodiment of the present invention.

FIG. 39 is a perspective view of a plurality of rectangular PCBs mounted to the dry end cap.

FIG. 40 is an exploded view of a rectangular PCB mounting shelf and mounting plate.

FIG. 41 is a perspective view of rectangular PCBs coupled to the dry nosecone using the mounting shelf and the mounting plate.

FIG. 44 is a perspective view of a generic mounting plate with mounting clips.

FIG. 48 is a perspective view of the cable manifold link including directly connecting sensors.

FIG. 49 is a cross-sectional view of the dry end cap including a sensor cable port.

FIG. 50 is an exploded cross-sectional view of the dry end cap including a sensor hole in one embodiment of the invention.

FIG. 51 is a perspective view of a power management system coupled to the dry end cap.

FIG. 53 is a perspective view of the pressure vessel including a magnetic switch sleeve in a first location.

FIG. 54 is a perspective view of the pressure vessel including the magnetic switch sleeve in a second location.

FIG. 71B is a second elevational view of the underwater URV.

Figure 1:
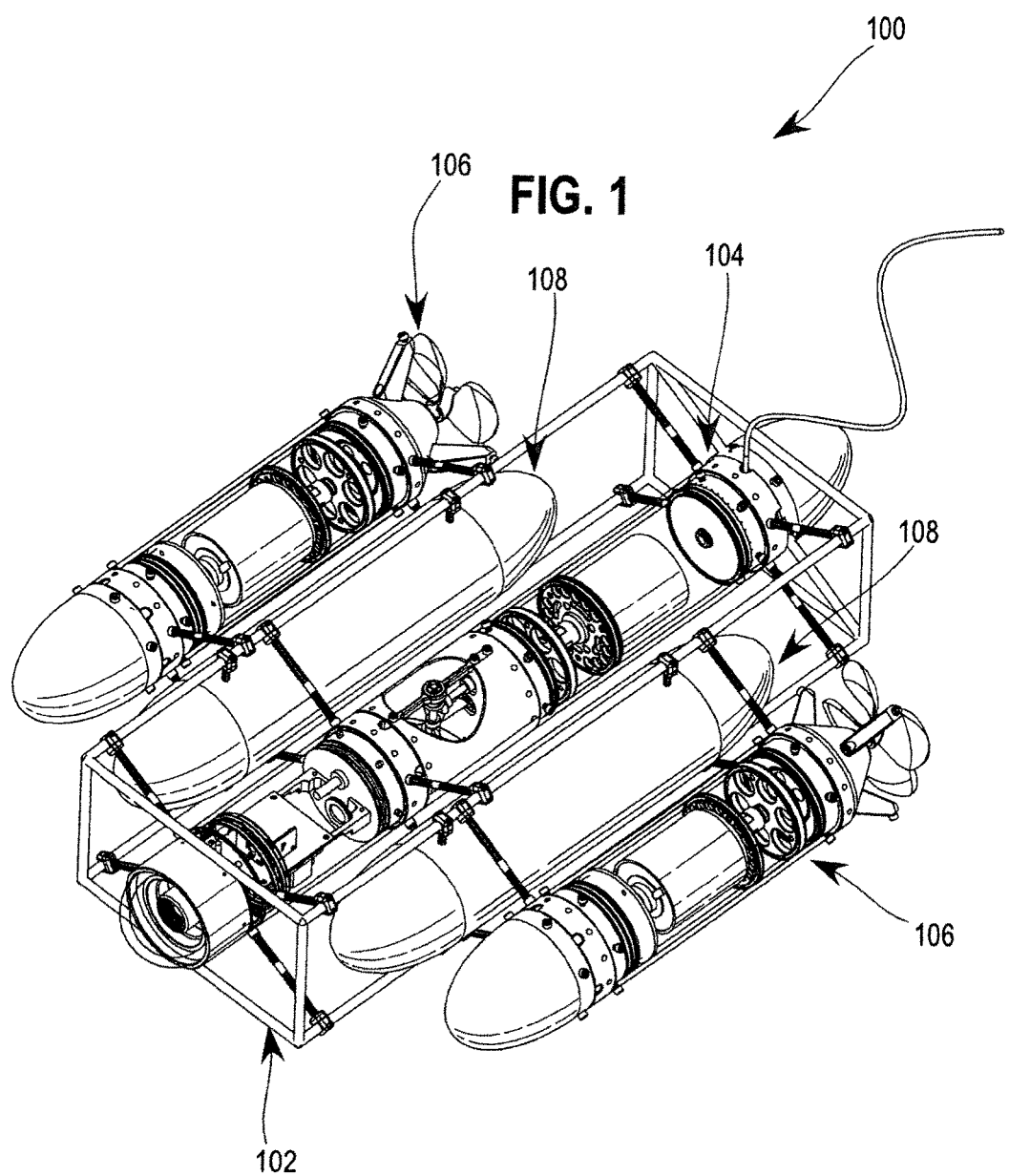
FIG. 1 is a perspective view of an exemplary Underwater Robotic Vehicle (URV) as constructed in accordance with an Underwater Robotic Vehicle Development System (URVDS).

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, modules, and so forth. In other instances, well-known structures, materials, or operations are not shown or described in detail to avoid obscuring aspects of the invention.

It will be appreciated that the present disclosure and drawings describe and depict one or more preferred embodiments of an actual working vehicle configuration that has been built with the system. Where dimensions are provided, the dimensions referred to are those of the actual components used in the one or more exemplary embodiments disclosed herein. It will be appreciated that many other configurations are possible within the scope of this disclosure.

Referring first to FIG. 1, an exemplary Underwater Robotic Vehicle (URV) 100 as constructed in accordance with a Underwater Robotic Vehicle Development System (URVDS) is shown. Shown are a chassis 102, a plurality of pressure vessels 104, a plurality of thruster pressure vessels 106, and a plurality of buoyancy modules 108.

The exemplary URV 100 comprises the structural chassis 102, which is typically constructed in an open framework configuration. In one embodiment, the chassis 102 comprises elements of a modular chassis system described further below. The pressure vessels 104, buoyancy modules 108, and other elements of the URV 100 are coupled to and supported by the chassis 102. The pressure vessels 104 comprise the functional systems of the URV 100, and may include electrical systems, internal support architecture, propulsion systems, and systems for coupling peripheral components to the URV 100. The pressure vessels 104, buoyancy modules 108 and additional URV components are described further below.

The URVDS as described herein serves to simplify and speed up the design process for those who need to build a variety of reliable, low-cost underwater robotic vehicles. In one form, the URVDS is an "erector-set"-like construction set of modular elements and methods for building underwater robots that includes two features. The first feature is the chassis system, a set of modular structural elements for rapidly assembling the chassis 102 for the URV 100 in a systematic, coherent, and extensible way in accordance with standardized form factors. Using or building chassis modules in adherence with the form factors laid out in a chassis geometry grid convention ensures trouble-free mechanical interconnection and interoperability with existing chassis modules, allowing easy expansion of the system and allowing new chassis modules to be shared with other users. The second feature is the pressure vessel system comprising a standardized set of modular elements, from which a nearly unlimited number of different URV 100 designs can be quickly assembled. Each of these components performs at least one function related to a structural assembly of URV 100 functional components onto the chassis 102. These functions include, but are not limited to, reliable electrical wiring distribution between pressure vessels 104, mounting control circuitry within pressure vessels 104, or propeller thrusters for locomotion. Typically pressure vessel modules combine one or more of these functions with the function of providing watertight sealing of the pressure vessel 104 assembled with the modules.

The pressure vessel and chassis systems provide the tools to quickly build a robust mechanical platform and reliable underwater environmental protection for the user's choice of the electronic components (computers, motors, sensors, etc.) around which to design their URV 100.

The URVDS provides the system of modular elements to build URVs 100 that are fundamentally mutable in scale, complexity, and mission capability. The URVDS seamlessly integrates several systems including some known elements and components into a unified, systematic, coherent and extensible method for constructing the URV 100.

The URVDS supports the mutability of the entire system to build completely different URVs 100 is a fundamental property of each element and component in the system. Each element and component interconnects with others via the chassis 102 to form functional cells, and the chassis 102 supports the easy addition of additional chassis elements with attached functional pressure vessels 104 to increase the functionality of the URV 100. Also, the URVDS includes a set of architectural rules and dimensional standards by which other designers can build additional chassis modules that interoperate with existing system chassis modules.

The URVDS is easily adapted to attachment to a non-robotic underwater load (large instrument, camera, or heavy object to be simply moved) in order to provide convenient mobility to the object in cases where the object is too heavy to be easily or safely moved by divers 1004 or needs to be moved between points, either under human control or autonomously, in a more predictable and repeatable manner than human divers 1004 can provide (such as a large format underwater camera precisely repeating underwater tracking shots with complex camera movements or speeds for a number of separate 'takes').

The URVDS allows a builder to easily share and interchange the entire suite of chassis modules needed to build the URV 100 with other builders in a systematic and collaborative way, increases value and reduces cost and reinvention time for all users, especially researchers whose work requires peer review and experimental duplication and validation.

Like any robotic system, URV 100 is composed of computational electronics, sensors 4800, actuators, a power supply (typically batteries), and the chassis 102 to connect all components together. In addition, the URV 100 also needs means of protecting the electronics from water ingress, and the URV 100 also requires some means of precise buoyancy control and three-dimensional propulsion through water. Many options for computation and control electronics exist for robotics. Hobby radio-control transmitter-receiver-servo based systems, embedded Linux controllers, microcontroller based control solutions like Arduino™ are becoming cheaper, more powerful, and becoming familiar and available to increasingly wider numbers of users. The Hobby Radio Control Vehicle user base drives the cost of control components, camera systems and power components such as NiMH and Lithium Ion batteries and charging systems down and their power and reliability up, so that now there are many ground and aerial robotic systems that let users reconfigure and swap the mechanical and electronic hardware systems to improve performance or change the overall performance and mission capability of their robots.

But this growth in variety of vehicle choices is not echoed in low cost underwater robotics for either the underwater research user community or the hobbyist community. While a very few inexpensive URV 100 systems exist, they are built to one configuration, without the ability to customize them to different missions, mobility configurations, or control systems. There are no "build-by-menu", reconfigurable-at-will "erector-set" type construction kit systems for underwater robotics equivalent to the many such systems for on-land or aerial (drone) robotics.

The URVDS provides those capabilities through a set of module and associated component systems from which users can construct a wide variety of underwater robotic systems to accomplish their data gathering tasks. The systems include the chassis system, a pressure vessel system, a printed circuit board mounting system, an electrical distribution system, a propulsion system, and a buoyancy management system.

In the one embodiment, the chassis system includes elements to easily and quickly build the strong, lightweight, and easily reconfigurable chassis 102 for the URV 100, upon which all the other elements are mounted.

The pressure vessel system in one embodiment of the present invention includes watertight housings to contain control electronics, batteries, sensors 4800, cameras, thruster motors 5800 for locomotion, and similar components necessary to the operation of the URV 100.

The electrical distribution system comprises the power system and control system architecture of the URV 100.

The buoyancy system may include one or more buoyant modules coupled to the chassis 102.

Generally, the term module is used to refer to elements used in constructing the pressure vessels 104, including tubes 1100, end caps, links, and thruster propeller modules. The term component is used to refer to elements supported by or contained within the pressure vessel or chassis, such as cables 1214 2604, ports 2300, printed circuit boards, and sensors.

Chassis System

Figure 2:
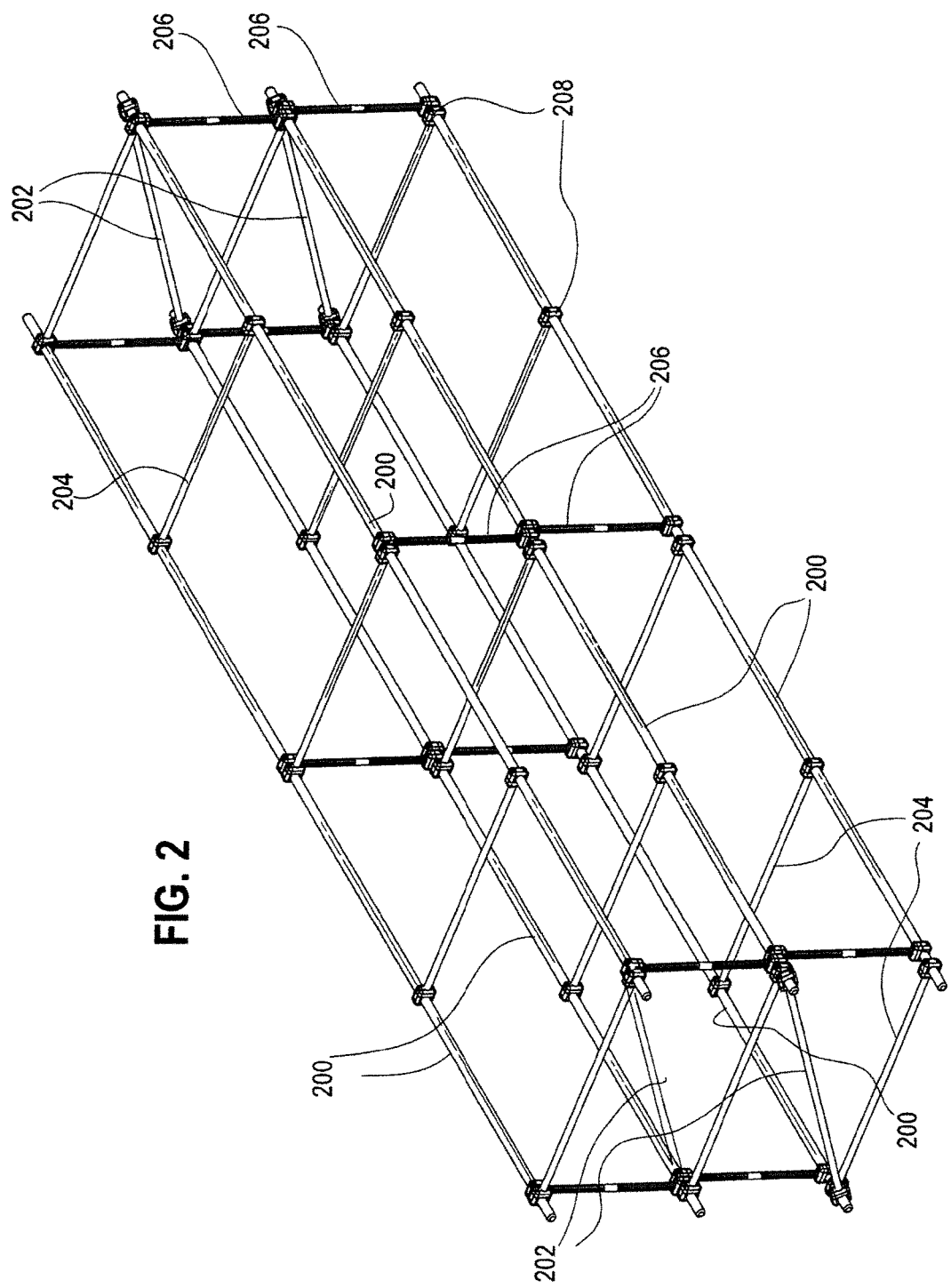
FIG. 2 is a perspective view of a URV chassis in one embodiment of the present invention.

Referring next to FIG. 2, the URV chassis 102 in one embodiment of the current invention is shown. Shown are a plurality of chassis rods 310, including rails 200, braces 202, beams 204 and posts 206. A plurality of rail clamps 208 is also shown.

The chassis 102 is comprised of the plurality of chassis rods 310 coupled together to form a three-dimensional space frame. In the embodiment shown the space frame is orthogonal in shape, but it will be appreciated by those skilled in the art that non-orthogonal systems and systems including curved rods 310 may be constructed using the chassis system elements shown in FIG. 2. For the chassis 102 as shown in FIG. 2, the y-direction is oriented parallel to the longitudinal axis of the chassis 102 and also to the longitudinal axes of the pressure vessel 104 mounted to the chassis 102. The orthogonal x-direction forms a horizontal plane with the y-direction, and the z-direction is defined to be upwards from the x-y plane.

The rods 310 may be comprised of stainless steel, anodized aluminum, or any other submersible, non-corrosive material with suitable strength. In the present embodiment, the rods 310 include a round cross-section, but the cross-section may be any cross-section suitable for use with the rail clamp 208 connectors, the operation of which is described in more detail below. The rods 310 may have any diameter required to support various URV pressure vessels 104 and other components mounted on the chassis 102. In the present embodiment, the rail 200 diameters are ¼" for a light-use chassis 102 and 1" for a heavy-use chassis 102. Other chassis rods 202 204 206 are ³⁄₁₆" rods threaded on each end with 10-32 threads. Rods 310 configured for coupling to rail clamps 208 are threaded on each end. In another, heavy-duty embodiment, rails may be 1" in diameter and other rods 202 204 206 ¾" in diameter.

In the chassis 102 shown in FIG. 2, six continuous rails 200 oriented parallel to the longitudinal axis of the chassis 102 (i.e. in the y-direction) and extending an entire length of the chassis 102 are coupled to perpendicular rods 310 (i.e. in the x- and z-directions) to form the space frame. Geometrical spacing of the rails 200 is described further below in FIGS. 7 and 8. In the x-direction, beams 204 are coupled to intersecting rails 200 with the rail clamps 208 threadably coupled to each end of the beam 204. Each rail clamp 208 includes a rail aperture 308 for receiving one rod 310, typically a rail 200, as described below. The rail clamps 208 are configured to threadably couple to the beam 204 (or other type of rod 310), slide over the rail 200, and demountably clamp to the rail 200. When more than one rod 310 is coupled to the rail 200 at a single joint, the rail clamps 208 may be slightly staggered to accommodate the multiple connections.

Beams 204 may be spaced at any dimension as required for stability and strength of the chassis 102.

In the z-direction, vertical posts 206 are coupled to intersecting rails 200 using the rail clamps 208. As with the beams 204, the posts 206 may be spaced at any suitable dimension. In the embodiment shown, the posts 206 are spaced at a dimension approximately twice the dimension between the rails 200 in the x-direction. Diagonal braces 202 in the x-y, y-z or x-z planes may also be used to provide lateral stability to the structure.

Referring again to FIG. 2, the chassis system is reconfigurable to provide structural support for any combination of URVDS pressure vessels 104 and components. The rail clamps 208 provide for pressure vessels 104 that can be easily attached, detached, slid along the frame to adjust in-water balance, or repositioned or removed from the frame and recombined into new vehicles for different purposes, as described further below. This makes development of new vehicles much faster than in current static URV 100 designs which require substantial re-design to incorporate new pressure vessels 104 and/or components, especially ones that changes the balance enough to make the URV 100 nose-heavy or tail-heavy. By making the rails 200 the central mechanical structure upon which the URV is built, ease of addition and reconfiguration of thrusters, computation, sensors 4800, power, buoyancy and other modules and/or components are core features of the URVDS.

The reconfigurable chassis 102 can thus be quickly assembled which allows the user to start mounting pressure vessels 104 and/or components to test various vehicle configurations and get an experimental vehicle up and running. The user can add or subtract chassis length by swapping in different rods 310 as needed, or add sections vertically or horizontally to fit more components as needed. Once a chassis design is finalized, the user can continue to use the reconfigurable chassis or a construct a permanent chassis of welded steel or aluminum. In one embodiment, the permanent chassis may be constructed using rods 310 (comprising carbon fiber, fiberglass, or other suitable material) in conjunction with pre-made corner and/or tee pieces that are coupled to the rods 310, similarly to PVC pipe construction.

Rods 310 typically comprise either stainless steel or aluminum rod commercially available from many sources. If aluminum is used and the chassis 102 is to be used in sea-water, the rods 310 may be anodized to inhibit corrosion. In other embodiments the rods may be other materials such as PVC pipe which is commonly used among amateur URV 100 builders.

The rods 310 themselves need not necessarily be solid rods. The rods may be open tubes to reduce weight and material while retaining structural stiffness or they may be larger diameter tubular housings for long thin elements such as batteries. The rods 310 may thus function both as structural elements and as pressure vessel 104 provided that the stresses imposed by functioning as the chassis rod 310 do not compromise its integrity as the pressure vessel 104.

The reconfigurable chassis system as shown in FIG. 2 allows quick and easy reconfiguration of the chassis geometry. However, it will be appreciated that it may be desirable, once a chassis configuration is finalized, to replace the reconfigurable chassis system with a permanent, welded configuration. Due to the greater rigidity of the welded joints, members of the reconfigurable configuration may be eliminated in the welded configuration while still preserving the structural capacity of the chassis 102. The welded chassis 102 may be comprised of steel, aluminum, or other suitable weldable material.

Referring next to FIG. 3, a light-duty rail clamp 300 coupled to the beam 204 is shown in one embodiment of the present invention. Shown are the beam 204, a light-duty rail clamp base 302, a light-duty rail clamp collar 304, a plurality of rail clamp screws 306, a rail aperture 308, and the rod 310.

In the embodiment shown, the light-duty rail clamp base 302 includes a threaded hole configured to be threadably coupled to the threaded end of the beam 204. It will be understood by those of ordinary skill in the art that the rail clamp 208 may be coupled to any threaded rod 310 of the chassis 102. The light-duty rail clamp collar 304 is approximately U-shaped, with legs of the U-shape demountably coupled to a side of the light-duty rail clamp base 302 opposite to the beam 204. In the embodiment shown, the light-duty rail clamp collar 304 is coupled to the light-duty rail clamp base 302 using at least two clamp screws 306 that screw into countersunk through-holes in the legs of the light-duty rail clamp collar 304. When the light-duty rail clamp collar 304 is coupled to the light-duty rail clamp base 302, the rail aperture 308 is formed. The light-duty rail clamp collar 304 is configured to provide for clamping to the desired rail 200 configuration, which in the light chassis configuration is ¼" in diameter. In the embodiment shown, a top edge of the rail aperture 308 is curved. The rail 200 may be slid through the rail aperture 308 or the light-duty rail clamp collar 304 may be installed after the beam 204 and the light-duty rail clamp base 302 are positioned on the rail 200. Further tightening of the clamp screws 306 frictionally locks the light-duty rail clamp 300 to the rail 200. The light-duty rail clamp 300 may be moved or removed by loosening of the clamp screws 306.

Referring next to FIG. 4, a heavy-duty rail clamp 400 is shown in one embodiment of the present invention. Shown are the beam 204, the rail aperture 308, the clamp screws 306, a heavy-duty rail clamp base 402, a heavy-duty rail clamp collar 404, and the rod 310.

Similar to the light-duty rail clamp 400, the heavy-duty rail clamp 400 comprises the heavy-duty rail clamp base 402 threadably coupled to the rod 310, and the heavy-duty rail clamp collar 404, in a general U-shape, with legs of the U-shape demountably coupled to the heavy-duty rail clamp base 402. In the present embodiment, the heavy-duty rail clamp 400 is configured to threadably receive the rod 310 approximately 3/16" in diameter and attach to the rail 200 approximately 1" in diameter. The configuration and operation of the heavy-duty rail clamp collar 404 is similar to that of the light-duty rail clamp collar 304. It will be apparent to those skilled in the art that the dimensions of the light-duty and heavy duty rail clamps 300 400 may be modified to accommodate alternate rails 200 and rods 310 with alternate cross-sectional geometry and dimensions.

Referring again to FIGS. 3 and 4, the beam 204 (or other type of rod 310) is threadably coupled to the clamp base using the threaded hole in the clamp base. The clamp collar and clamp base include threaded holes on each side for receiving the clamp screws 306.

Rail clamps 208 may be comprised of stainless steel or aluminum, or any other metal suitable for forming the rail clamp 208 shape and coupling to the rod 310. Alternately, the rail clamp base 302 402 and the rail clamp collar 304 404 may comprise different materials. Preferably, the U-shaped portion of the rail clamp 208 that forms the mechanical interlock with the rail 200 is oriented towards the outside of the chassis 102, and removable via the clamp screws 306. This would ensure that the pressure vessel 104 connected to the rails 200 could be slid in and out from between even four rails 200 without having to separate the rails 200. This would facilitate exchange of pressure vessels 104 for test or repair without disturbing the chassis 102 and other pressure vessels 104 mounted onto it.

Additionally, a portion of the rail clamp base 302 402 that contacts the rail 200 is essentially straight so that the rail clamp base 302 402 may be removed from the rail 200 of the chassis 102 without having to move the rail 200. If the rail clamp base were curved to receive the rail 200, in order to remove the rail clamp 208 the rail 200 would have to be moved out of the curved area. The straight rail clamp base 302 402 allows the rail clamp base 302 402 to be slid away from the rail 200 when the rail clamp collar 304 404 is removed.

In addition to the pressure vessels 104, other types of peripherals may be directly mounted on the chassis 102 using the rail clamps 208. For, example, a sonar transducer module as shown may be configured to receive a link strut 500 coupled to the rail clamp 208. The rail clamp 208 may then be removably coupled to the chassis 102 as previously described. Mounting one or more peripheral devices on rail clamps 208 allows them to be freely positioned around the URV 100 for ranging and local collision avoidance.

Referring next to FIG. 5, the pressure vessel 104 is shown coupled to the rails 200 via the link struts 500. Shown are the pressure vessel 104, the rails 200, the rail clamps 208, and the link struts 500.

The link struts 500 are rods used to couple pressure vessels 104 or other URV components to the chassis 102. As with beams 204, posts 206 and braces 202, the link strut 500 is threaded at each end. The link struts 500 may comprise the same material and/or geometry as the beam 204, post 206 or brace 202. A first end of the link strut 500 is coupled to the rail 200 of the chassis 102 using the rail clamp 208 as previously described. A second end of the link strut 500 is threadably coupled to an external threaded hole in the pressure vessel 104. The pressure vessels 104 include the external threaded holes configured for receiving the link strut 500, as described further below. In order to provide stability of the pressure vessel 104, typically link struts 500 are coupled to the pressure vessel 104 at an angle to at least one other link strut 500, relative to the longitudinal axis of the pressure vessel 104.

The length and attachment angle of the link strut 500 may be varied using a plurality of link strut mounting holes 1302 of the pressure vessel 104 to accommodate different pressure vessel 104 sizes and locations relative to the chassis 102. The length and angle would also still typically conform to a chassis grid convention as described further below.

Referring next to FIG. 6, a portion of the chassis 102 including a plurality of rail-to-rail truss rods 600 is shown. Shown are the rails 200, the rail clamps 208, the posts 206, the beams 204, a plurality of truss rod rail clamps 602 and the truss rods 600.

Additional diagonal truss rods 600 may be used between post 206, beam 204 or brace 202 connection points. Truss rods 600 may comprise threaded rods with the rail clamp 208 coupled to each end, similar to the post 206, beam 204 or brace 202 rods. The rail clamp 208 is modified to provide for a connection to the truss rod 600 at an angle between 0-90 degrees relative to the rail 200 axis (with the typical rail clamp 208 providing an approximately 90 degree connection). In the exemplary version shown in FIG. 6, the truss rods 600 are coupled to the rails 200 at an approximately 45 degree angle.

In another embodiment, the truss rod 600 includes truss rod rail clamps 602 at each end of the truss rod for removable coupling of the truss rod to the rail 200. In yet another embodiment, the truss rods 600 may be permanently welded to the rails 200. The truss rods 600 may couple two rails 200, as shown, but also may couple any two other chassis members, e.g. rail-post, post-beam, etc.

When multiple pressure vessels 104 are mounted on the chassis 102, the triangular bracing of the link struts 500 stiffen the chassis rails 200 against lateral deflections from torsion and shear, but do not offer triangular bracing against front-to-back shear, e.g., from a forward impact to the end of the rail 200. When needed, the truss rods 600 may add additional stiffness against shear.

Referring next to FIG. 7, an end-view of an exemplary URV 100 system with a chassis grid 700 is shown. Shown are a first pressure vessel 702, a second pressure vessel 704, a third pressure vessel 706, a fourth pressure vessel 708, a fifth pressure vessel 710, the chassis 102, the chassis grid 700, a grid unit 712, a frame height 716, a frame width 718 and the plurality of link struts 500.

A chassis geometry convention system in one embodiment is based on the chassis grid 700 comprising identical equilateral triangles (60-60-60). The side length of the equilateral triangles may be revised as required by the pressure vessel 104 and chassis 102 size and configuration. In the embodiment shown, each equilateral triangle side, or grid unit 712, is equal to 4.5". Connections are typically made on chassis grid 700 intersections, thus rod 310 lengths are all determined using the grid unit 712 and the resulting equilateral triangle chassis grid 700. It will be appreciated that in other embodiments of the chassis geometry convention system the chassis grid 700 may comprise triangles other than equilateral triangles, for example 90-45-45 triangles.

For the equilateral triangle grid, the frame height 716 in the z-direction, or the nominal post 206 height between rail 200 axes, is equal to the grid unit 712. The frame width 718 in the x-direction, or the nominal beam 204 length between rails 200, is equal to twice the height of a single unit triangle, or $2*\cos(30°)*$grid unit$=1.732*$grid unit. In the embodiment shown, the chassis 102 is two grid units high and 1.732 grid units wide. The 2D rectangle formed by the x- and z-frame members is defined as a single frame. The exemplary chassis 102 shown in FIG. 2 includes two frames in the z-direction and one frame in the x-direction.

Pressure vessel 104 longitudinal centerlines are typically located at grid 700 intersections or at triangle side midpoints. The first pressure vessel 702 and second pressure vessel 704 are located at the central grid intersection of the top and bottom frames, respectively. The link struts 500 coupling the first and second pressure vessel 702 704 to the chassis 102 are oriented along the grid 700 lines. As determined by the grid geometry, the nominal distance from the centerline of the pressure vessel 104 to the connection of the link strut 500 to the chassis 102 is one grid unit 712. The actual length of the link strut 500 may be calculated based on a pressure vessel diameter 816, the grid unit 712 and rail clamp 208 radius dimensions.

Pressure vessels 104 may also be placed externally to the grid frames, as illustrated by the third, fourth and fifth pressure vessels 706 708 710. As with the first and second pressure vessel 702 704, the link struts 500 connecting the third, fourth and fifth pressure vessel 706 708 710 to the chassis 102 align with the rails 200 whose axes lie on gridlines. As the third pressure vessel 706 is located on a vertical gridline that bisects the frame, the link strut 500 locations and dimensions are determined similarly to the link struts 500 for the first and second pressure vessel 702 704, i.e. the centerline of the third pressure vessel 706 is located 0.5 grid units 712 above the top beam 204 of the top frame.

The fourth and fifth pressure vessels 708 710 are located to the left and the right of the top frame, respectively. The grid alignment in the x-direction results in the fourth and fifth pressure vessel 708 710 location of 0.866 grid units 712 from the adjacent post 206 location.

One skilled in the art will appreciate that this additional link strut 500 bracing creates very high stiffness in the chassis 102. In practice the chassis 102 so braced is extremely resistant to deformation as a results of the attachment of the pressure vessels 104 using the link struts 500.

Referring again to FIG. 7, the chassis grid 700 geometry as described ensures that pressure vessels 104, payloads, or other URV components will align and fit precisely with the rails 200 of any chassis 102 which follows the chassis geometry convention. This allows independent users to develop modules that will interconnect with other researcher's chassis 102 and pressure vessels 104 in a standardized way, greatly increasing the number of usable components and modules available to the entire research community.

When the chassis 102 is built following the chassis grid 700 geometry and with adequate bracing, it may be rigid and dimensionally precise, even though made of flexible materials like 48" long, 0.25" diameter rods. Because the chassis materials are flexible, and because of the large capacity for correcting dimensional errors by tweaking link strut 500 lengths away from nominal specified values, considerable liberties can be taken with 'forcing' not-quite-aligned parts to fit without serious adverse effects to the chassis precision and alignment.

Using the above method to match the given pressure vessel 104 to a given frame size, the overall chassis system is explicitly tolerant of variations in the pressure vessel diameter 816: the user is free to maintain a standard diameter for housings or use different diameters (and a matching set of struts) for whatever reason the user sees fit. Typically this will arise when making mountings for commercial off-the-shelf (COTS) products whose size is beyond the user's control e.g., mounting both a 1.4" diameter camera housing and a 3.25" sonar module on a 4.5" frame with 3" vessels. Using the method above to derive the appropriate strut 500 lengths, attaching the pressure vessels 104 with their differing diameters is trivial.

In some embodiments, it may be critical to the chassis geometry convention that relative lengths of the posts 206, beams 204, and braces 202 that define the chassis dimensions be such that the axes of the rails 200 remain at the vertices of a 30-60-90 triangle, and it may be critical that the link strut 500 lengths be such that, for any wet or dry link 2200, the center to center distance from the axis of the link strut 500 to the rail 200 axis of the rail clamp 208 is equal to the center to center distance between the axes of any two rails 200 at the ends of the post 206 (the frame height 716). In such embodiments, such configuration ensures that all rods 310 and connection points lie on the 60 degree triangular grid 700 and can attach to the rails 200 without distortion or stress. Further, the actual grid unit 712 that drives frame height 716 and link strut 500 axis to rail axis 200 radius is completely arbitrary, particularly so for the user building their own system according to these guidelines but with no intent to interoperate with other URVs 100 or use their pressure vessels 104. Whether the frame height 716 is 4.5 inches (as in one example system) or any larger or smaller number is user-defined as long as the 60-60-60 triangle geometry is maintained and the strut lengths keep the attachment points on grid.

One may manufacture pressure vessels 104 and/or components adhering to potentially several different grid sizes, especially ones that are even multiples of each other, for example 4.5", 9.0", 18", and claim the grid system on whatever scale the user decides upon. The diameter of the rails 200 also is arbitrary and set by user needs. In the exemplary 4.5" frame height 716 example system the rails 200 are ¼" diameter. In a 9 inch frame height 716, 1" diameter rails 200 may be used for a much heavier chassis 102, and the link strut 500 lengths and rail clamp 208 dimensions reflect the required adjustments to the larger pressure vessel 104 and/or components. One may use rail 200 diameters that allow the rails 200 to be hollow and use them as pressure vessels 104 for batteries. One would simply shorten the link struts 500 and use appropriately sized rail clamps 208.

Adjustments to strut lengths will also correct when machined parts are out of tolerance—e.g., when a builder sent a rush job to a machinist and receives wet links whose diameters are 2.900" instead of 3.0" and (being a rush job) is required to use them anyway. In order for the chassis and housing elements to align on a true 4.50" triangular grid from the example system, the length of the link struts need to be adjusted to make up the 0.050" radius difference.

Chassis rods 310 and link struts 500 are designed to a tolerance of +/−0.005".

The last 0.55"+/−0.025" of the link strut 500 is threaded typically with 10-32 thread on 0.187" diameter struts. A nominal depth to which the strut should be threaded into its link is 0.50" (assuming that the pressure vessel 104 diameter is exactly 3.0"). The link struts 500 can therefore compensate for small misalignments due to out of spec pressure vessels 104 by simply adjusting how deeply they the link strut 500 screwed into the pressure vessel 104. Since the rail clamp 208 should be aligned with the rail 200, the smallest available adjustment is one half-turn of the screw. The pitch of 10-32 screws is 0.03125", so each half turn of the 10-32 thread would make an adjustment of 0.015625."

Since the radius of the example out-of-spec pressure vessel 104 is 0.050" less than the specified dimension, instead of screwing the link strut 500 the nominal 0.50" into the pressure vessel 104, backing the link strut 500 out by 1-½ turns will lengthen the distance between the longitudinal axis of the undersized pressure vessel 104 and the axis of the rail by 0.015625*3=0.046875", leaving the tolerance only 0.003125" off.

In one exemplary form, nominally on a 4.5" grid, with 0.25" rails and 3.0" diameter pressure vessels, Link Struts are adjusted to extend exactly 2.875" above the surface of the link to which they are attached, +/−any variation from 3.00" in the link; e.g. if the housing measures 2.90" in diameter, 0.050" of lost radius is added to each strut length It will be appreciated that the 60-60-60 configuration is a preferred configuration for some embodiments but may be altered, where appropriate, for alternative embodiments of the URVDS.

Using the chassis grid geometry convention, the frame width 718 is derived from the grid unit 712. In other embodiments, the frame width 718 may be determined first and the grid unit 712 derived from the frame width 718. Most notably, if the frame width 718 is required to match existing dimensional requirements such as when spacing deck-mounted pressure vessels 104 along a 2D surface with pre-drilled holes (which must be matched by the hole spacings of the URV 100), it may be desirable to be able to express the chassis 102 dimensions as normalized to the frame width 718. For example, for the frame width=unit length and the frame height 716 is equal to the grid unit 712, the grid unit=tan(300)*grid unit. This allows the user to adapt the frame width 718 to pre-determined spacing requirements and derive new post 206, beam 204 and brace 202 lengths.

Referring next to FIG. 8, an end view of a two-frame chassis pressure vessel 800 coupled to two differently-sized pressure vessels 104 is shown. Shown are a 3" diameter pressure vessel 802, a 6" diameter pressure vessel 804, the pressure vessel diameter 816, a 3" pressure vessel diameter 814, a 3" pressure vessel link strut length 806, a 6" pressure vessel link strut length 808, beams 204, 3" pressure vessel link struts 810, 6" pressure vessel link struts 812, posts 206, and rails 200.

Using the chassis grid 700 as described in FIG. 7, lengths of link struts 500 for any size of pressure vessel 104 may be determined. For the 3" outside diameter pressure vessel 802 shown in FIG. 8, the actual link strut length 806 would be approximately 3.375 inches, taking into account connection lengths and joint offsets.

On the chassis 102, since the frame dimensions and distances between rails 200 are fixed, and the diameter of any given pressure vessel 104 or component to be attached may vary, a method is needed to adapt differently sized pressure vessels 104 to the chassis 102. Varying link strut 500 length is the primary method for adapting different pressure vessel diameters 816 to any given chassis 102. Modifying the length of the link strut 500 will accomplish this, and no other components or elements need be altered or adjusted to accommodate different sizes.

If a perimeter of the pressure vessel 104 does not extend past any beam 204 (which would constrain its diameter), then in a single frame, a single pressure vessel's radius 814 should not exceed the difference between the grid unit 712 and the adjacent rail 200 radius. For example, in a 4.5" grid unit chassis with 0.25" rails 200, a largest pressure vessel radius 814 possible is 4.375", for the pressure vessel diameter 816 of 8.75". In practice there will be further circumstantial constraints from the absolute maximum size such as interferences from protruding connectors and cables 1214, inaccessibility of screws, etc.

The size of the pressure vessel diameters 816 used is determined by the user, but in practice, the pressure vessel diameter 816 about ⅔rds of the frame height 716, e.g., 3" pressure vessels 104 on a 4.5" high frame, is convenient in terms of clearances, finger space to reach in to attach and detach cables 1214, manipulate screws, etc.

Similarly to the 3" diameter pressure vessel 802, the 6" pressure vessel link strut length 808 is calculated using the grid dimensions. The actual 6" pressure vessel link strut length 808 is approximately 1.875". It will be appreciated that the 6" pressure vessel diameter 816 is greater than the 4.5" chassis cell height as shown, thus beams 204 cannot be located at 6" pressure vessel 804 locations.

If the pressure vessel 104 extends beyond any chassis beam 204, forcing the pressure vessel 804 to clear the beam 204, then the pressure vessel's diameter 816 should not exceed the different between the grid unit 712 and the beam 204 diameter. In the 4.5" grid unit chassis with 0.1875" diameter beams 204, the pressure vessel diameter 816 is constrained to 4.3125". Again, in practice there will be further circumstantial constraints from the absolute maximum size such as interferences from protruding connectors and cables, inaccessibility of screws, etc.

Based on the grid layout as previously shown, the sum of the radii 814 of vertically adjacent pressure vessels 104 may not exceed the grid unit 712. For the exemplary 4.5" grid unit 712, it can be seen that the 3" diameter pressure vessel 802 above the 6" diameter pressure vessel 804 are tangent to each other when mounted to the chassis 102 using the grid system.

For horizontally adjacent pressure vessels 104, the maximum sum of the radii 814 may not exceed √3*grid unit, i.e. for the 4.5" grid unit 712, the sum of the radii 814 may not exceed 7.79".

Figure 9:
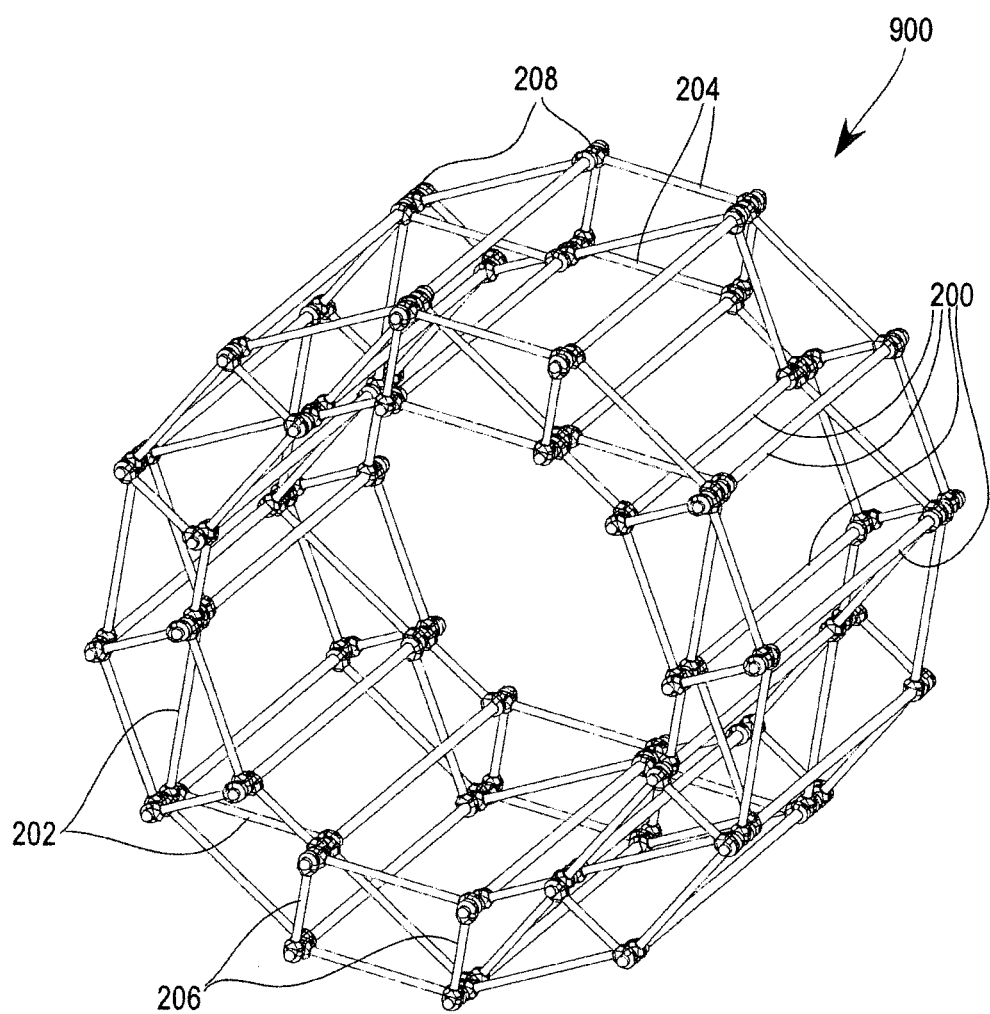
FIG. 9 is a perspective view of an exemplary non-orthogonal heavy-duty chassis configuration.

Referring next to FIG. 9, a perspective view of an exemplary non-orthogonal heavy-duty chassis configuration 900 is shown. Shown are the rails 200, the rail clamps 208, the beams 204, the posts 206 and the braces 202.

As an example, shown in FIG. 9 is the exemplary heavy-duty chassis 900 configured to carry a 1300 lb IMAX Underwater Camera system, used to create underwater movies in panoramic format for IMAX Theatres. The 63" diameter chassis 900 is built from the same four chassis member elements: 1" diameter rails 200, 9.0" long posts 206, 15.6" long beams 204, and 18.0" long braces 202. The chassis 900 uses the same equilateral triangle chassis grid system described previously in FIG. 7, but with the grid unit 712 equal to 9.0".

As stated, the chassis 900 in FIG. 9 includes frames that are not orthogonal to each other. The chassis system accommodates non-orthogonal configurations as well as the orthogonal configurations described previously.

Figure 10:
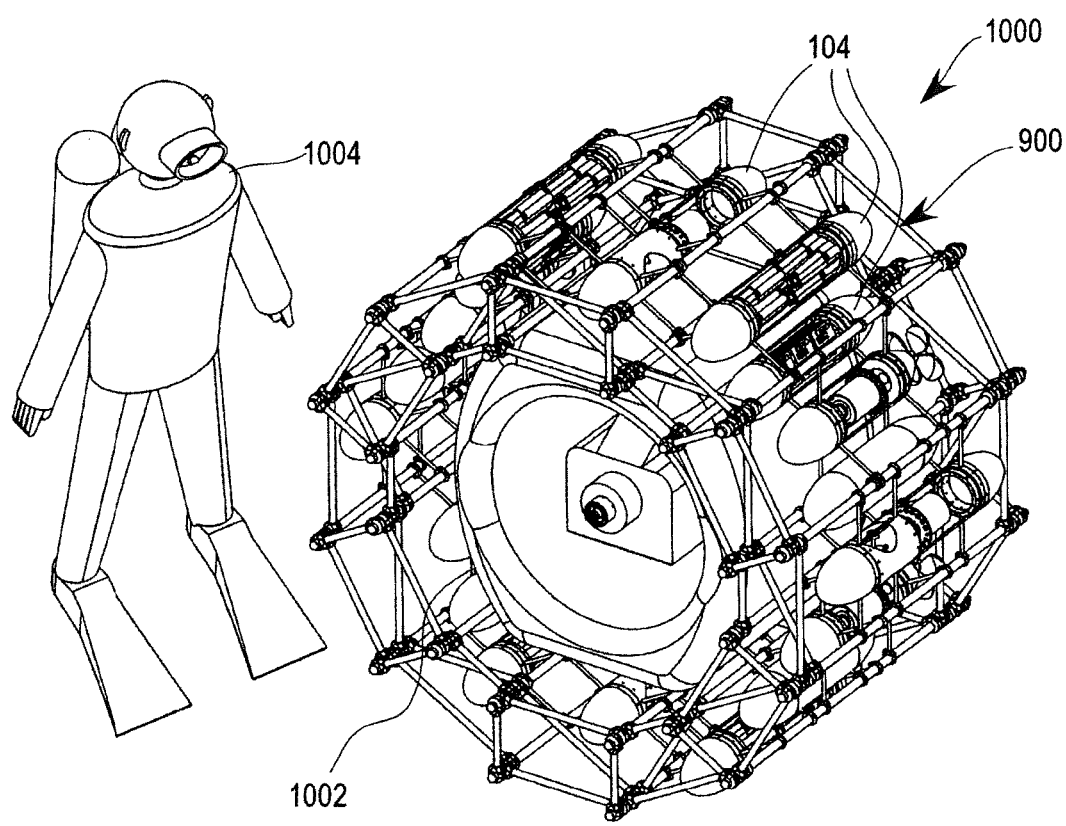
FIG. 10 is a perspective view of an exemplary URV including the heavy-duty chassis.

Referring next to FIG. 10, a perspective view of an exemplary IMAX® camera URV 1000 including the heavy-duty chassis of FIG. 9 is shown. Shown are the chassis 900, the pressure vessels 104, and the IMAX® camera 1002.

The pressure vessels 104 of the IMAX® camera URV 1000 include buoyancy, control and communication electronics, and thrusters providing 6-axis mobility.

As previously described in FIG. 9, the exemplary large-scale, heavy-duty URV 1000 including the heavy-duty chassis 900 is shown. The URVDS is configurable for both small-scale/light-duty and large-scale/heavy-duty applications.

Pressure Vessel System

The pressure vessel system comprises interconnected modules configured to contain and support control electronics, batteries, sensors 4800, cameras, lights, thruster motors 5800 for locomotion, and similar components necessary to the operation of the URV 100. Empty pressure vessels 104 may be also added to the URV 100 to provide additional buoyancy if needed. Each module includes a URVDS-specific standard module connection configuration such that all modules are configured at least for attachment to other pressure vessel 104 modules, the external chassis 102, and internal components.

Unless otherwise noted, all pressure vessel 104 modules may be comprised of machined polycarbonate, acetyl (delrin), ABS or similar plastic, or aluminum, but may also be cast or manufactured by other means.

Figure 11:
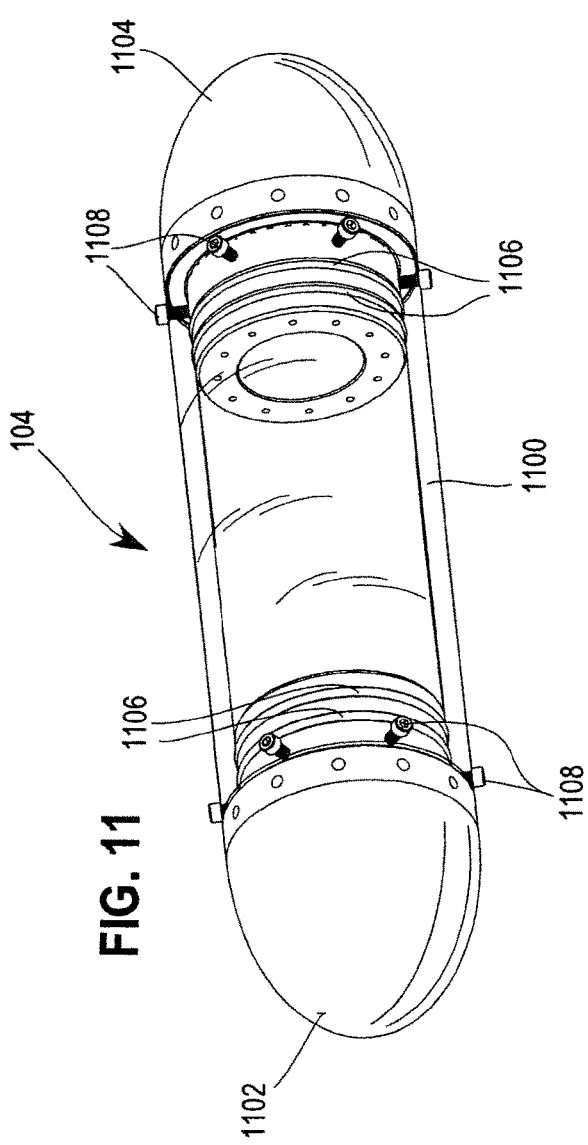
FIG. 11 is a perspective view of an exemplary pressure vessel in accordance with one embodiment of the invention.

Referring next to FIG. 11, an exemplary pressure vessel in an empty and dry configuration is shown. Shown are the tube 1100, a first dry nosecone 1102, a second dry nosecone 1104, a plurality of o-ring seals 1106 and a plurality of tube mounting screws.

A pressure vessel shell (i.e. only the structural shell, without additional components) is comprised of the tube 1100, interposed between the first dry nosecone 1102 and the second dry nosecone 1104. The dry nosecones 1102 1104 include an internal portion 1306 configured to slidably fit within an end of the tube 1100. Each dry nosecone 1102 1104 also includes two o-ring seals 1106 located around the perimeter of the internal portion 1306 of the dry nosecone and configured to provide a watertight seal between the tube 1100 and the dry nosecone, hence the term "dry", indicating that the module coupled to the tube 1100 provides a dry tube interior. Tube ends are coupled to the dry nosecones 1102 1104 by a plurality of tube mounting screws, using a standardized hole connection configuration described further below.

Figure 12:
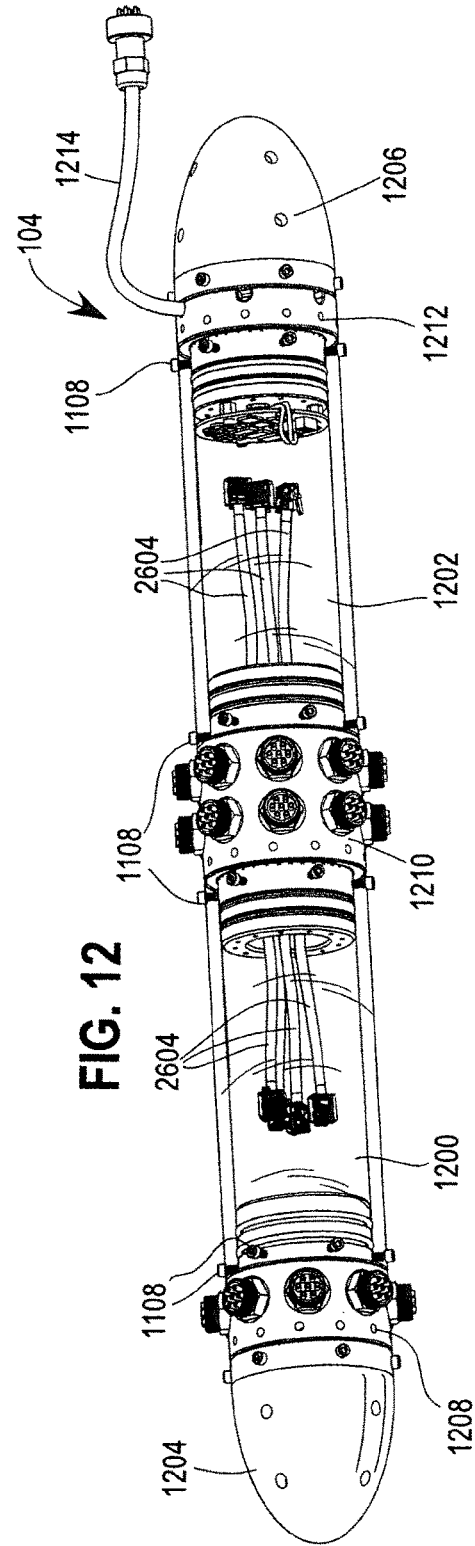
FIG. 12 is a perspective view of another exemplary pressure vessel in accordance with a further embodiment of the invention.

Referring next to FIG. 12, an exemplary pressure vessel in a more complex configuration is shown. Shown are a first tube 1200, a second tube 1202, a first wet nosecone 1204, a second wet nosecone 1206, a cable manifold dry end cap 1208, a cable manifold link 1210, a dry end cap 1212, the tube mounting screws 1108, a plurality of internal cables 2604 and an external cable 1214.

The pressure vessel 104 of FIG. 12 includes the first tube 1200 and the second tube 1202 interposed by the cable manifold link 1210. The cable manifold link 1214 includes the internal portion 1306 on each end similar to the internal portion 1306 of the dry nosecones described in FIG. 11. The tube 1100 ends are coupled to the cable manifold link 1214 similarly to the pressure vessel 104 of FIG. 11, utilizing the tube mounting screws 1108. The dry end cap 1212 is coupled to an end of the second tube 1202 distal to the cable manifold link 1210 with the same watertight seal as described in FIG. 11, and the second wet nosecone 1206 is coupled to the dry end cap 1212 with a non-watertight seal, hence the "wet" designation. The dry end cap 1212 may also be configured to allow the external cable 1214 to exit the dry end cap 1212, as described further below. The cable manifold dry end cap 1208 is coupled to an end of the first tube 1200 distal to the cable manifold link 1210, and the first wet nosecone 1204 is coupled to the cable manifold dry end cap 1208. As with the opposite end of the pressure vessel 104, the cable manifold dry end cap 1208 provides a watertight seal between the cable manifold dry end cap 1208 and the first tube 1200, and the first wet nosecone 1204 provides a non-watertight seal between the cable manifold dry end cap 1208 and the first wet nosecone 1204.

As shown in FIGS. 11 and 12, the two main elements of the pressure vessel 104 are the tubes 1100 and the modules configured to connect to the tube 1100 or another module. The modules may include the nosecones 2700 3200, end caps 3400 and cable manifold modules 1208 1210, as well as other types and configurations of modules as described below, each module configuration serving one or more other functions in another of the URVDS. Modules may be used to couple tubes 1100, terminate the pressure vessel 104 in a watertight seal, or connect to another module or peripheral module.

As will be appreciated by those skilled in the art, connections between the tube 1100 and the various modules (e.g. a dry nosecone 2700, the cable manifold link 1210, the cable manifold dry end cap 1208 and the dry end cap 1212) are standardized so that most modules are interchangeable, allowing a great degree of customization and reconfiguration of the pressure vessel 104.

Figure 13:
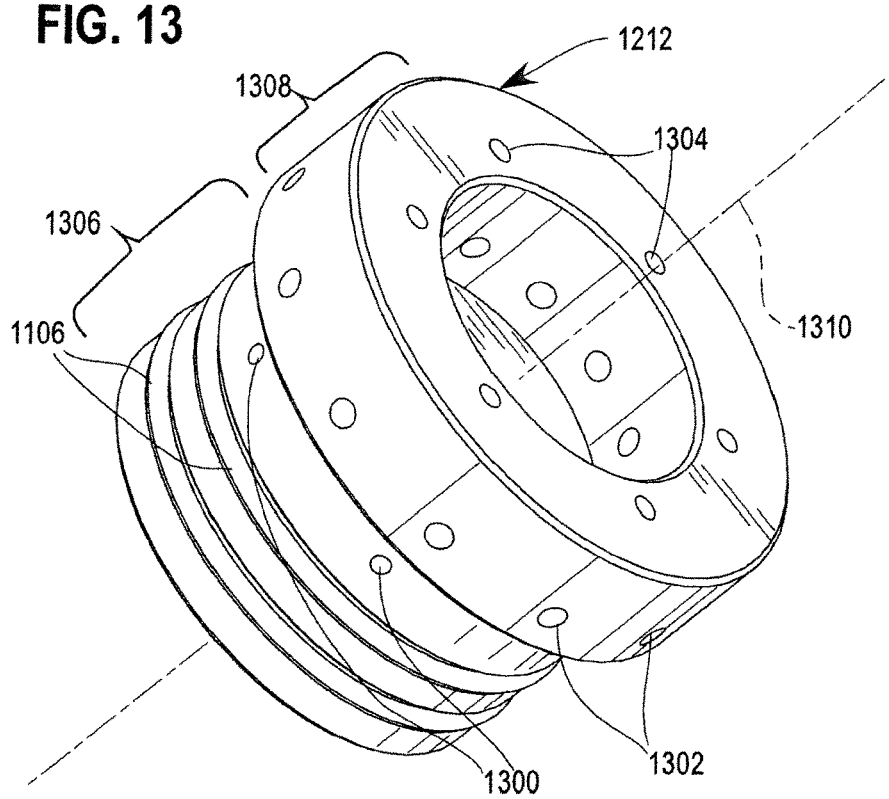
FIG. 13 is a perspective view of a side of the dry end cap.

Referring next to FIG. 13, the dry end cap 1212 including the standard module connection configuration is shown in one embodiment of the invention. Shown are a plurality of tube mounting holes 1300, the plurality of link strut mounting holes 1302, two o-ring seals 1106, and a plurality of rim mounting holes 1304.

The standard module connection hole configuration is shown on the dry end cap 1212, but it will be understood by those of ordinary skill in the art that the standard modules connection hole configuration is typically used for all modules in the URVDS, allowing modules to be interchangeable without additional modification.

The dry end cap 1212 includes the generally cylindrical internal portion 1306 and a generally cylindrical external portion 1308, wherein the internal portion 1306 and the external portion 1308 are concentric, i.e. share a longitudinal axis 1310. A diameter of the external portion 1308 is greater than a diameter of the internal portion 1306. In the embodiment shown in FIG. 13, the external portion 1308 includes a cylindrical depression such that the external portion 1308 is generally tubular.

The dry end cap 1212 includes the tube mounting holes 1300 evenly spaced around the internal portion 1306 of the dry end cap 1212 configured to slidably fit within the connecting tube 1100. The tube mounting holes 1300 are located proximate to the external portion 1308 of the dry end cap 1212 (approximately 0.25" from the external portion 1308 in the embodiment shown). A vertical plane is defined as a vertical plane that bisects the dry end cap 1212, pressure vessel 104, tube 1100 or other module. A first tube mounting hole is vertical and also located on the vertical plane. The other 5 mounting holes are spaced evenly around the perimeter of the internal portion (or other module portion). The tube mounting holes 1300 are configured to receive tube mounting fasteners for coupling the tube 1100 to the internal portion 1306 of the dry end cap 1212. In the present embodiment, the tube mounting holes 1300 comprise six threaded holes configured to receive 6-32 size screws. In some embodiments, the screw head may be configured to receive a magnetic switch sleeve 5300, as described further below. In another embodiment, the diameter of the tube mounting holes 1300 is configured to such that socket head screws fit slidably though, thus allowing the socket head screws to be screwed flush to the end cap surface and thereby still restrain the tube 1100 against rotational movement but not risk crushing the plastic tube 1100 wall.

Link strut mounting holes 1302 are provided on the perimeter of the external portion 1308 of the dry end cap 1212, i.e. a portion of the dry end cap 1212 not covered by the connecting tube 1100. In the present embodiment, the link strut mounting holes 1302 include twelve radially oriented threaded holes (i.e. oriented similarly to the tube mounting holes) equally spaced around the tubular section, allowing the link struts 500 to be screwed into the dry end cap to couple the pressure vessel 104 to the chassis 102. In the present embodiment, the link strut mounting holes 1302 are configured to receive 10-32 screws, with the holes approximately 0.52"-0.55" deep. In some module embodiments, the link strut mounting holes 1302 may be threaded through-holes, where a through-hole is defined as a hole passing through an object. While typically only two or four link strut mounting holes 1302 on the dry end cap 1212 are utilized at one time for coupling to link struts 500, having 12 holes allows the attached pressure vessels 104 to be rotated in 30 degree increments with respect to the chassis 102 or other pressure vessels 104. This ability to rotate the pressure vessel 104 is useful when the pressure vessel 104 contains components which are mounted at a particular angle or orientation, such as accelerometers, compasses, or cameras. In particular, lateral thrusters (as described below) are usually mounted in pairs rotated 90 degrees with respect to each other to provide maneuvering thrust both vertically and horizontally. In the present embodiment, the link strut mounting holes 1302 are 10-32 threaded holes.

Rim mounting holes 1304 are optionally included on the end of the external portion 1308. The rim mounting hole axes are parallel to the external portion longitudinal axis 1310. The rim mounting holes 1304 are located 1.0625" from an external portion 1308 center. The rim mounting holes 1304 are six threaded holes equally spaced around the end of the external portion 1308, and configured to receive fasteners for coupling the mounting rim 1900 to the dry end cap 1212 (as described further below). In the present embodiment, the rim mounting holes 1304 are configured to receive 6-32 size threaded fasteners and are approximately 0.377-00.38" deep. The rim mounting holes 1304 may be used to connect end caps or other modules back-to-back as is described further in the module descriptions below. The top rim mounting holes are offset 15 degrees counterclockwise from the tube mounting holes and the link strut holes.

A relationship between the tube mounting holes 1300 and the link strut mounting holes 1302 with respect to the perimeter of the dry end cap 1212 is held constant for all modules so that the attached link struts 500 may be attached in the same position on each end of the pressure vessel 104. The alignment of the tube mounting holes 1300 and the link strut mounting holes 1302 allows the link struts 500 or other elements attached to the link strut mounting holes 1302 on each end of the pressure vessel 104 to be attached at the same angle relative to the pressure vessel 104.

Figure 14:
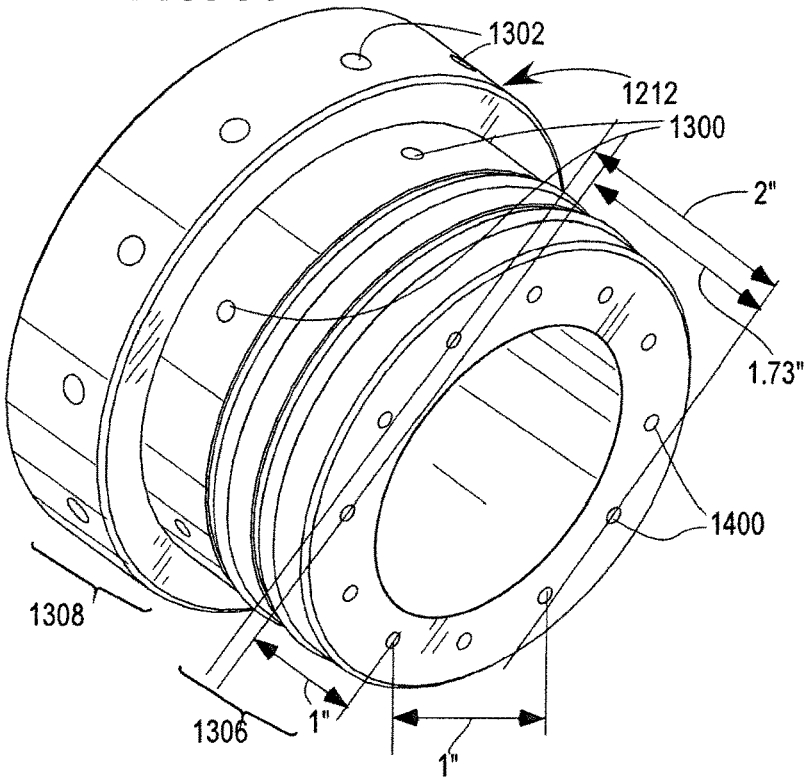
FIG. 14 is a perspective view of an internal end of the dry end cap.

Referring next to FIG. 14, an internal end of the dry end cap 1212 is shown. Shown are the internal portion 1306 of the dry end cap and a plurality of component mounting holes 1400.

Similarly to FIG. 13, the standard module connection hole configuration is shown on the dry end cap 1212, but it will be understood by those of ordinary skill in the art that the standard module connection hole configuration is typically used for all modules in the URVDS.

The end of the internal portion 1306 of the dry end cap 1212 configured to fit within the tube 1100 includes the component mounting holes 1400 configured to receive component mounting screws for coupling the dry end cap 1212 to internal components or mounting devices (as described further below). The component mounting holes 1400 are oriented parallel to the longitudinal axis 1310 of the dry end cap 1212 and are evenly spaced in a circular arrangement proximate to the perimeter of the end cap. The component mounting holes align with the locations of the link strut mounting holes and tube mounting holes, i.e. a top component mounting hole is aligned with the vertical plane. In the embodiment shown, twelve threaded mounting holes are included. In the present embodiment, the 12-hole configuration with a circular mounting hole diameter of 2" yields mounting hole spacings of 1.0", 2.0", 1.4142 (root 2) and 1.732 (root 3)". Having 12 mounting holes insures that internal components that require a specific orientation such as an inclinometer or compass can be aligned from vertical to horizontal in 30 degree increments. The component mounting holes 1400 may be configured to receive 4-40 size threaded fasteners, and are approximately 0.27-0.3" deep.

Figure 15:
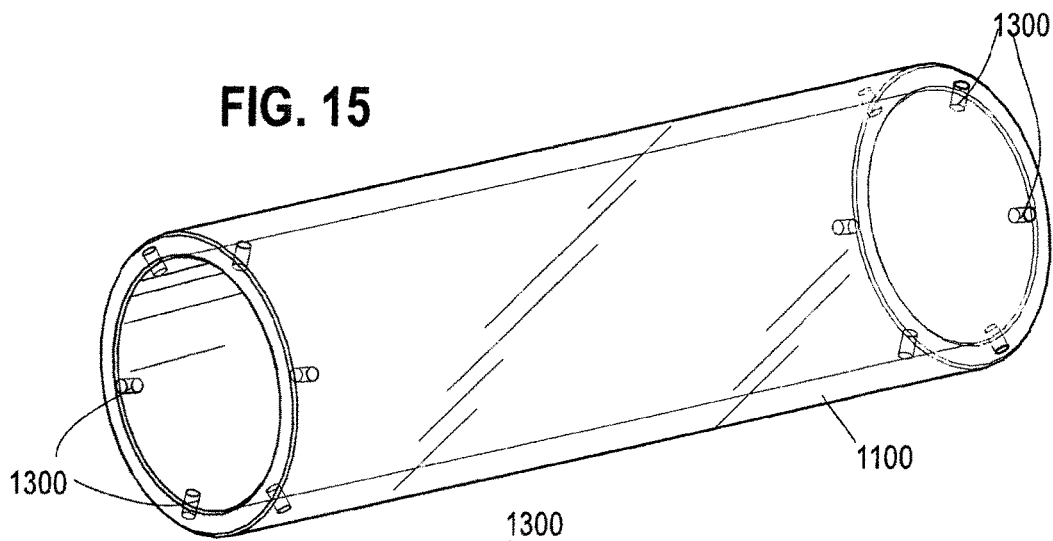
FIG. 15 is a perspective view of a pressure vessel tube in one embodiment of the present invention.

Referring next to FIG. 15, the pressure vessel tube 1100 is shown in one embodiment of the present invention. Shown are the tube 1100 and the plurality of tube mounting holes 1300.

In the present embodiment, the tube 1100 includes an outside diameter of 3 inches and an inside diameter of 2.5". Those skilled in the art will appreciate that the diameter and thickness of the tube 1100 may be any dimension compatible with the module geometry.

Tubes 1100 include the radial pattern of six tube mounting holes 1300 evenly spaced at 60 degree intervals at approximately 0.25" from each tube end, configured to match the tube mounting holes 1300 of the standard module connection. The tube mounting holes 1300 allow the tube 1100 to be screwed to the matching module mounting holes as shown in FIGS. 13 and 14.

While the screws hold the end cap onto the tube 1100 when not mounted on the chassis 102, once the pressure vessel 104 is mounted onto the chassis 102, the link struts 500 securely hold the end caps and tube 1100 together, and would do so even if all the mounting screws were removed, as the tube 1100 will be constrained between the fixed end caps. Similarly, at depth (as with any submerged pressure vessel 104) hydrostatic pressure will always press the dry end cap 1212 module and the tube 1100 together.

Tubes 1100 may be made of polycarbonate or acrylic plastic for low-pressure duty in shallow water (200 feet), or aluminum, stainless steel, or other metals for deeper water duty at higher hydrostatic pressures. The current prototype system uses 3" diameter acrylic pressure vessel tubes 1100 with ¼" thick walls, which will support rated depths of over 200 feet (100 psi). The URVDS supports both larger and smaller diameter pressure vessels 104 as explained previously in the chassis system section.

All four of these commercially available materials share a common system of sizing increments, with inside and outside diameters and wall thicknesses increasing in increments of 0.125" across the typical range of diameters of the URVDS (typically 2.0" to 6.0" diameters, and 0.25 to 0.5" wall thicknesses). Thus for any tube 1100 made of one material within that range of dimensions, tubes 1100 of the other materials will be readily commercially available and interchangeable tubes can be made and exchanged as the user requires, adjusting the wall thickness as the pressure rating for the new tube's diameter and material dictate.

As an example, the user might develop the URV 100 with low cost acrylic tubes and then exchange them for aluminum tubes to withstand deeper operating depths without having to re-design the URV 100. Similarly, if a transparent housing is required the user might exchange the acrylic tube for polycarbonate if the URV 100 is to be used in conditions of shallower depth but where more impacts to the pressure vessel 104 might occur, since polycarbonate is more impact resistant than acrylic but less pressure resistant. Within the URVDS ranges of temperatures, coefficients of expansion of the tube materials are similar enough to allow them to be interchanged without special considerations. Other materials can be used; this is not an exhaustive list. For instance PVC pipe can also be used, subject to conditions detailed later; titanium or ceramic tubes could be used for extreme depths.

Figure 16:
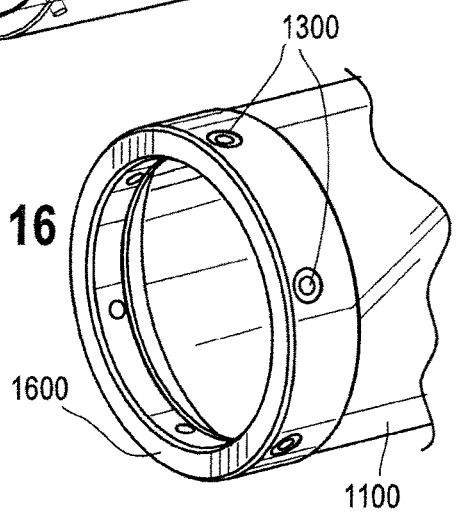
FIG. 16 is a perspective view of a reinforcement collar coupled to the tube.
Figure 17:
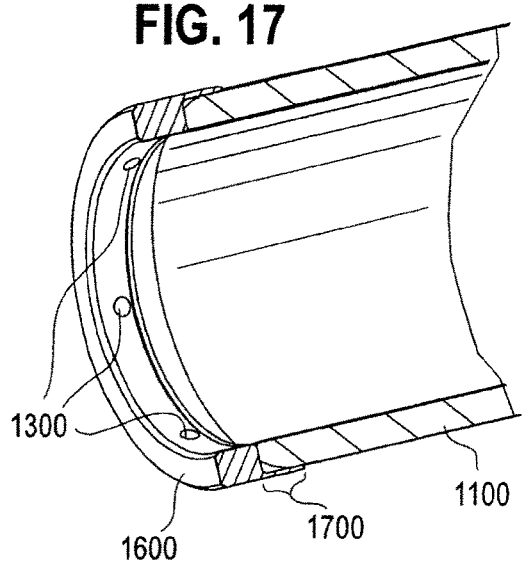
FIG. 17 is a cross-sectional view of a reinforcement collar coupled to the tube.

Referring next to FIGS. 16 and 17, a reinforcement collar 1600 coupled to the tube 1100 is shown. Shown are the tube 1100, the reinforcement collar 1600, the plurality of tube mounting holes 1300, a collar flange 1700.

The reinforcement collar 1600 is generally tubular, including a flange configured to slidably fit over the end of the tube 1100. The reinforcement collar 1600 comprises aluminum or other material suitable for greater resistance of torsional, tensile and bending loads than polycarbonate or acrylic. The end of the reinforcement collar 1600 distal to the tube end is configured to match the geometry of the tube end such that the reinforcement collar 1600 may couple with the module similarly to the coupling of the tube end to the module. In the present embodiment, the reinforcement collar flange 1700 is coupled to the tube 1100 with marine epoxy glue, silicone sealant, or glue or sealant suitable for watertight bonding to both the collar and the tube 1100 and including enough flexibility to accommodate different coefficients of expansion of the collar and the tube 1100. The reinforcement collar 1600 includes tube mounting holes 1300 in the size, number and configuration as for the tube 1100. The reinforcement collar 1600 extent is configured such that when the tube 1100 is coupled to the module using the tube mounting holes 1300, the tube 1100 portion contacts the o-ring seal 1106 included in the link. As a result, the o-ring seal 1106 is not compromised by any sealing flaws in the reinforcement collar 1600 glue joint.

On an exemplary simple URV 100 when rails 200 are not used as a supporting structure but pressure vessels 104 are linked end to end, the six screws that attach the tube 1100 to the module are the only fasteners. If the pressure vessel 104 is aluminum or stainless steel this should present no problem. But if a plastic housing is desired (lowest cost, leaks are immediately detectable in a transparent housing), tube mounting holes 1300 in the plastic pressure vessel tube 1100 might be too fragile, and the strain on the screw holes may cause them to crack if excessive bending forces are present at the joint. In such cases, the aluminum reinforcement collar 1600 can be bonded to the acrylic tube 1100 end to reinforce the connection with the more robust screw holes in aluminum supporting the tube 1100. The reinforcement collar 1600 strengthens the tube 1100 mounting holes 1300 when the tube mounting screws are the only fasteners on the long, jointed pressure vessel 104 without the supporting chassis 102.

Figure 18:
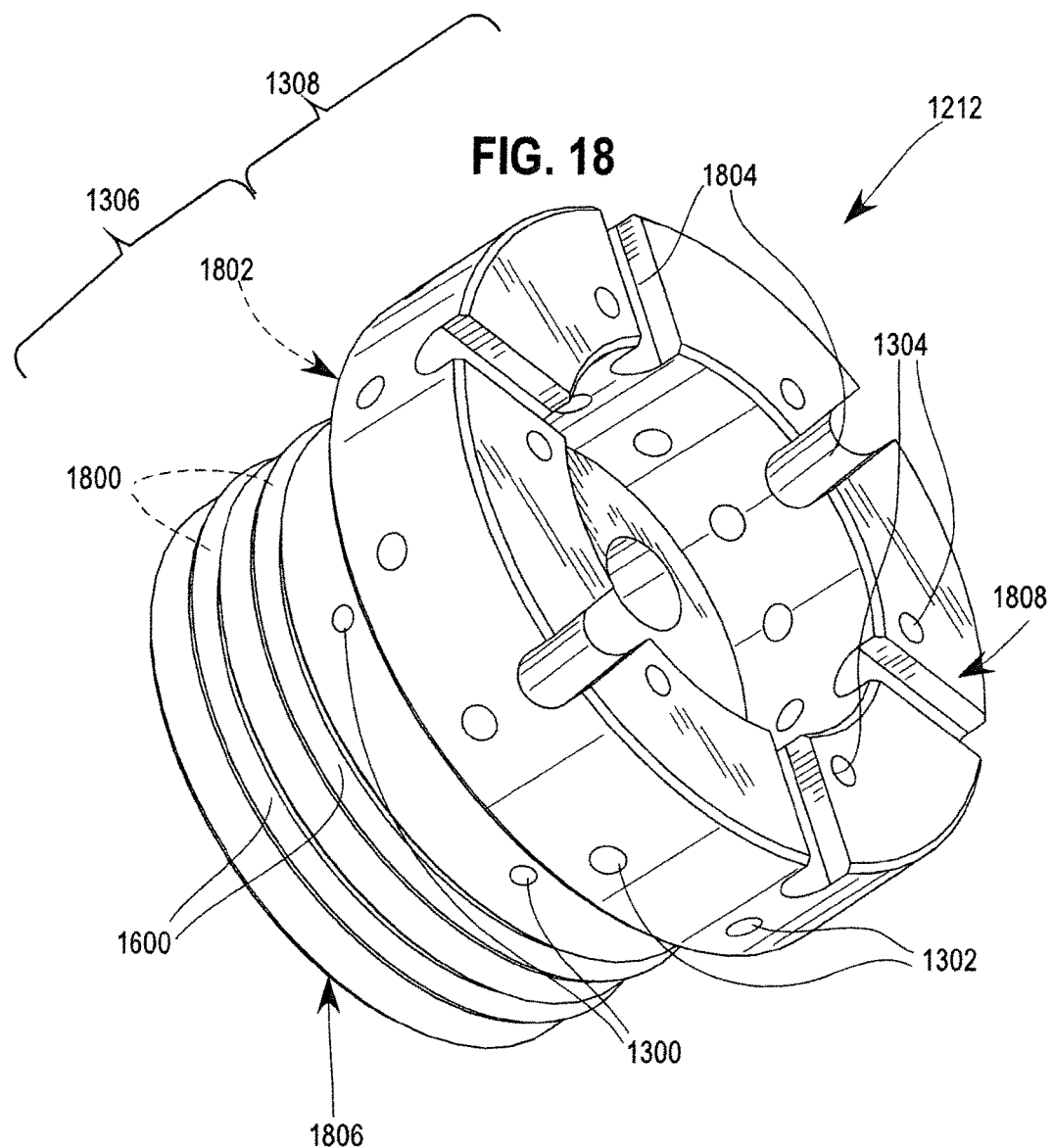
FIG. 18 is a perspective view of an external end of the dry end cap.

Referring next to FIG. 18, a perspective view of the external end of the dry end cap 1212 is shown. Shown are the internal portion 1306, the external portion 1308, two o-rings, two o-ring grooves 1800, the plurality of tube mounting holes 1300, the plurality of link strut mounting holes 1302, a shoulder 1802, a plurality of strain relief grooves 1804, and the plurality of rim mounting holes 1304.

The dry end cap 1212 is comprised of the internal portion 1306 integral with the concentric external portion 1308, where an external portion 1308 diameter is greater than an internal portion 1306 diameter. In the embodiment shown, the external portion 1308 diameter is approximately equal to the tube outside diameter, and the internal portion 1306 diameter is approximately equal to the tube inside diameter. A free end of the internal portion 1306 is a first end 1806 of the dry end cap 1212, and a free end of the external portion 1308 is a second end 1808 of the dry end cap 1212. In some embodiments, the external portion 1308, the internal portion 1306, or both, may include a cylindrical void such that the portion is tubular. In the embodiment shown in FIG. 18, the external portion 1308 includes the external void and is tubular. In some embodiments an internal and an external void will not connect, but in other embodiments the internal portion 1306 may contain a through-void or voids for passing cables 1214 or other elements longitudinally through the dry end cap 1212, in which case an additional waterproof seal would be provided. The external void also allows for clearance of underwater connector and cables 1214 within the external portion 1308. The internal portion 1306 is configured to slidably fit within the tube 1100 of the pressure vessel 104. The internal portion 1306 includes the standard tube mounting holes 1300 located proximate to the external portion 1308, as described above. The internal portion 1306 also includes the two circular o-ring grooves 1800 around an outer perimeter of the internal portion 1306 proximate to the first end 1806 for receiving, each o-ring groove 1800 configure for receiving the o-ring seal 1106. The o-ring seal 1106 is a rubber seal or other o-ring type seal suitable for sealing between the tube 1100 and the dry end cap 1212, and is present in all modules requiring a watertight seal between the module and the tube 1100. The height of the o-rings in the o-ring grooves 1800 are configured to compress and form a watertight seal when the internal portion 1306 is inserted into the tube 1100, forming the watertight seal between the floating pressure wall and the tube 1100.

The intersection between the internal portion 1306 and the external portion 1308 forms the shoulder 1802 for receiving the end of the tube 1100 and is configured such that the perimeter of the tube 1100 generally aligns with the perimeter of the external portion 1308. The external portion 1308 also may include at least one approximately semicircular strain relief groove 1804 in the second end 1808 of the dry end cap 1212. The strain relief groove 1804 is configured to allow the electrical cable 1214 to pass through the external portion 1308 when another module or component is mounted to the second end 1808. In the exemplary dry end cap 1212 shown in FIG. 18, the dry end cap 1212 includes six strain relief grooves 1804 equally spaced with respect to the perimeter of the dry end cap 1212. In an embodiment that includes rim mounting holes 1304, the strain relief grooves 1804 are located between rim mounting holes 1304. A top strain relief groove and a bottom strain relief groove are oriented vertically. The other 4 strain relief grooves 1804 are radially arrayed such that all strain relief grooves 1804 are evenly spaced. The strain relief grooves are 0.25" deep and 0.25" wide, where a base of the strain relief groove 1804 forms a D-shape. In other embodiments, if cable 1214 pass-through is not a requirement, the strain relief grooves 1804 may be eliminated from the external portion 1308. As previously described, as with all modules the dry end cap 1212 includes in the standard configuration the tube mounting holes 1300, component mounting holes 1400, and may optionally include rim mounting holes 1304.

Referring again to FIG. 18, the dry end cap 1212 typically provides a watertight seal for the end of the tube 1100, provides a connection point for the link struts 500 to couple to the chassis 102, and also provides connection points for connecting additional components to the external end of the pressure vessel 104 (i.e. the portion opposite to the tube 1100 end). The dry end cap 1212 may be configured to provide only a seal, or may be used with voids and notches for one or more cables to allow the interior cable 2604 to exit the pressure vessel 104. The dry end cap 1212 may also be used to connect two tubes 1100 end-to-end, when the mounting rim 1900 is coupled to the dry end cap 1212 as shown further below.

Referring next to FIG. 19, an exploded cross-sectional view of one embodiment of the dry end cap 1212 with the mounting rim 1900 is shown. Shown are the mounting rim

1900, a plurality of mounting rim screws 1902, the plurality of tube mounting holes 1300, a cable gland 1906, and the cable 1214.

The mounting rim 1900 is tubular in shape and configured to concentrically couple to the external end of the dry end cap 1212 or other end module configured for the standard end connection. A mounting rim 1900 outer diameter is equal to the dry end cap internal portion 1306 outer diameter, thus forming a shoulder. A mounting rim 1900 inner diameter approximately aligns with the inner diameter of the cylindrical void in the tubular external portion 1308 of the dry end cap 1212. The mounting rim 1900 includes rim mounting holes 1304 in the same configuration as the rim mounting holes 1304 of the standard connection configuration. The mounting rim 1900 also includes the plurality of tube mounting holes 1300 through the wall of the mounting rim 1900, configured to couple to an end cap collar 2000 shown in FIG. 20 or other component or module. The mounting rim 1900 is coupled to the end of the external portion 1308 using the mounting rim screws 1902.

The dry end cap external portion 1308 may be solid, as shown in FIG. 18, or may include at least one void/hole parallel to the longitudinal axis of the external portion 1308 configured to receive the cable 1214 and the cable gland 1906. The cable gland 1906 is coupled to an external portion of the void and provides a waterproof seal for the cable 1214. A portion or all of the void may be threaded. Also shown is the cable 1214 being received by the strain relief groove 1804 in the dry end cap 1212 and thus exiting the pressure vessel 104. After the cable 1214 is placed in the strain relief groove 1804, the mounting rim 1900 is screwed on, securing the cable 1214 in place.

The mounting rim 1900 may also be used in assembly to couple two modules together, for example, as shown below in FIG. 21, or to couple the tube 1100 to the dry end cap 1212 or other end cap module 3400 including rim mounting holes 1304.

Referring next to FIG. 20, the end cap collar 2000 in one embodiment of the present invention is shown. Shown are the plurality of tube mounting holes 1300, the plurality of mounting rim holes, and an end cap collar shoulder 2002.

The end cap collar 2000 is tubular with an interior shoulder 2002 (i.e. an outside diameter of the end cap collar 2000 is constant, while an interior thickness varies) and includes the standard tube mounting holes 1300 and rim mounting hole 1304 configurations. The radial tube mounting holes 1300 are located through a thinner wall portion of the end cap collar 2000. The thinner wall portion is configured to internally receive the mounting rim 1900. The longitudinal rim mounting holes 1300 are located in the inner shoulder 2002 area. The end cap collar 2000 is coupled to the end of the external portion 1308 of the dry end cap 1212 (or other similarly configured module) using axial screws, with the thicker portion of the end cap collar 2000 abutting the dry end cap 1212. An outer perimeter of the end cap collar 2000 generally aligns with the perimeter of the external portion 1308 (i.e. also aligning with the tube 1100 outside diameter) when the end cap collar 2000 is coupled to the dry end cap 1212.

The end cap collar 2000 and mounting rim 1900 may be used to connect two modules end-to-end, as illustrated below.

Figure 21:
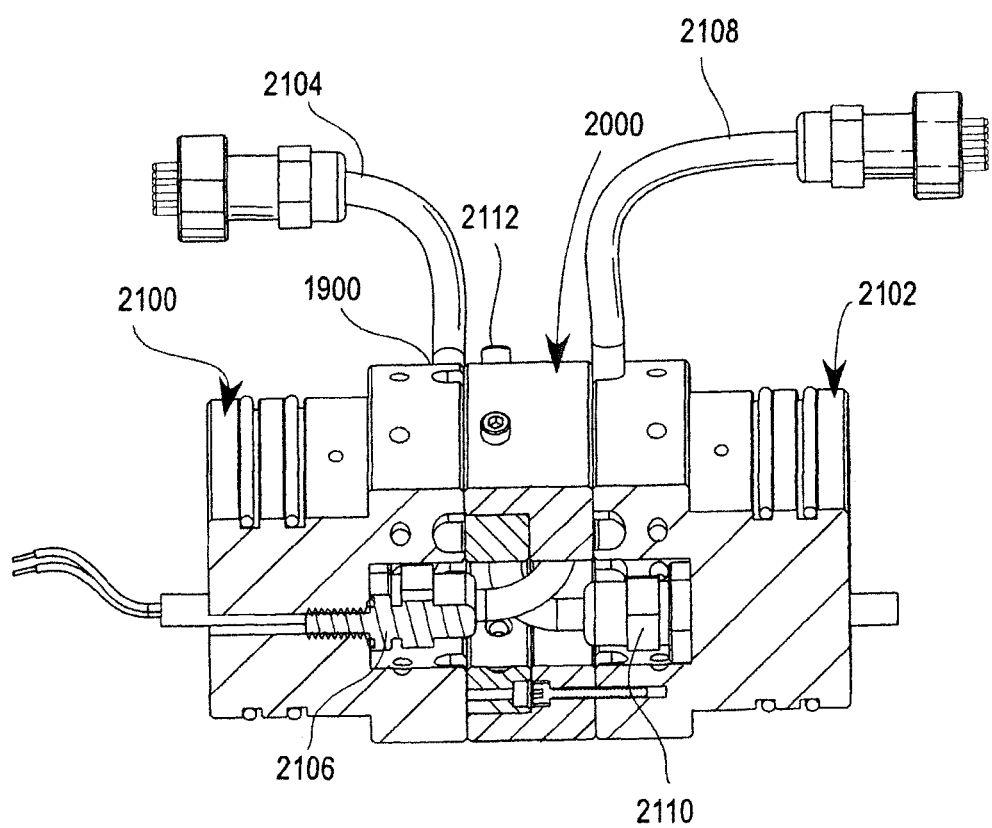
FIG. 21 is a cross-sectional view of a first dry end cap and a second dry end cap coupled together via the mounting rim and the end cap collar.

Referring next to FIG. 21, a cross-sectional view of a first dry end cap 2100 and a second dry end cap 2102 are shown coupled together via the mounting rim 1900 and the end cap collar 2000. Also shown are a first cable 2104, a first cable gland 2106, a second cable 2108, a tube mounting screw 2112 and a second cable gland 2110.

As previously described, the first dry end cap 2100 is coupled to the mounting rim 1900 with the mounting rim screws 1902, securing the cable 1214 in the strain relief groove 1804 and providing an exterior shoulder at the wet end of the first dry end cap 2100. The second dry end cap 2102 is coupled to the end cap collar 2000 such that the shoulder of the end cap collar 2000 faces outward from the second dry end cap 2102, securing the cable 1214 in the strain relief groove 1804 and providing an interior shoulder. The mounting rim 1900 and end collar diameters are chosen such that when mounting to the dry end caps 2100 2102 or other compatible modules, the mounting rim 1900 fits slidingly within the outer portion of the end cap collar 2000 since the mounting rim 1900 outside diameter and the end cap collar 2000 inside diameter are the same as the inside diameter of the tube 1100. The mounting rim 1900 is then coupled to the end cap collar 2000 using the radial tube mounting holes 1300 in each element and compatible fasteners 2112.

Two pressure vessels 104 that normally would be mechanically joined with the continuous dry link 2200 module or the cable manifold link module 1210 sometimes need to be separated into two independently sealed pressure vessels 104. For example, a sensor payload or battery pack might be frequently disconnected without compromising their seals each time as would happen with the dry link 2200 or the cable manifold link 1210. In those instances the mounting rim 1900 and the end cap collar 2000 may be used to couple two dry end caps 1212 back-to-back. The end cap collar 2000 and the mounting rim 1900 may also be used to connect two lateral thruster modules back to back, as discussed below in the thruster section.

Referring next to FIG. 22, a perspective view of the dry link 2200 module is shown. Shown are a first internal portion 2202, a second internal portion 2204, the external portion 1308, the link strut mounting holes 1302, the tube mounting holes 1300, and the component mounting holes 1400.

The exterior of the dry link 2200 is configured similarly to the dry end cap 1212, with the addition of the additional internal portion 2204 on the second end 1808 of the external portion 1308. The dry link 2200 comprises the first internal portion 2202 and the second internal portion 2204 interposed by the external portion 1308, forming a shoulder on each side of the external portion 1308. The internal portions 2202 2204 are configured similarly to the internal portion 1306 of the dry end cap 1212. As with the dry end cap 1212, the shoulder is configured such that the tube 1100 may slidably fit over each internal portion 2202 2204 of the link and abut the shoulder. The interior cavity of the dry link 2200 in one embodiment is a continuous bore to allow for internal cables 2604 to pass through unhindered between portions of the pressure vessel 104 separated by one or more modules. The external portion 1308 includes the radial link strut mounting holes 1302 in the standard configuration. The link strut mounting holes 1302 are blind holes, i.e. do not penetrate into the interior cavity of the dry link 2200 in order to preserve the watertightness of the interior of the pressure vessel 104.

The internal portions 2202 2204 of the dry link 2200 on each side of the external portion 1308 are configured similarly to the dry end cap 1212, including two o-ring seals 1106 around the perimeter at each end and the tube mounting holes 1300 and component mounting holes 1400 in each end of the dry link 2200. The tube 1100 and the links struts are fastened to the dry link 2200 similarly as to the dry end cap 1212, as previously described.

Referring again to FIG. 22, the dry link 2200 allows the mechanical integration of two pressure vessels 104 while preserving a high degree of the modularity. The dry link 2200 mechanically connects two pressure vessels 104, each of which is only sealed at one end, with the o-ring sealed watertight passage between them to form the single larger pressure vessel 104. The dry link 2200 is useful when a large number of internal wires or cables 2604 need to pass between the two separate sections but the single very long pressure vessel 104 would be impractical or if the pressure vessels 104 have logically different functions and are best managed as separate modular units or need to be occasionally separated (e.g., a sensor housing 4802 or a battery housing that might need to be exchanged regularly).

Referring next to FIG. 23, a perspective view of the cable manifold link 1210 is shown in one embodiment of the present invention. Shown are the central external portion 1308, a plurality of ports 2300, the plurality of tube mounting holes 1300, the plurality of link strut mounting holes 1302, a plurality of port inserts 2302, and the plurality of component mounting holes 1400.

The cable manifold link 1210 is similar in configuration to the dry link 2200, with the exception of the central external portion 1308. The central external portion 1308 of the cable manifold link 1210 is wider to accommodate a plurality of underwater electrical connection ports arrayed on the perimeter of central external portion 1308 of the cable manifold link 1210. In the version shown in FIG. 23, the cable manifold link 1210 includes two rows of eight ports evenly spaced around the external portion 1308 perimeter, and the row of link strut mounting holes 1302 in the standard configuration. Those skilled in the art will note that other numbers and configurations of ports are possible. As with the dry link 2200, the interior cavity of the cable manifold link 1210 is a continuous bore to allow internal cables 2604 and other components to pass through the cable manifold link 1210.

The ports comprise a plurality of port holes 2400, configured match the specifications of the port insert 2302 manufacturer (threaded being the most widely used), penetrating the link, as shown below in FIG. 24. The port holes 2400 are configured to receive the port insert 2302 configured to provide a watertight seal at the port 2300 location. In the embodiment shown in FIG. 23, the port insert 2302 comprises an electrical connector, e.g. those produced by Ikelite, Fischer, SeaCon and Impulse. In the exemplary link of FIG. 23, port holes 2400 configured for receiving Ikelite connectors are shown, although it will be appreciated that port holes 2400 in the same link may be configured for different types of connectors. In other embodiments the ports may comprise watertight cable glands from HexSeal and other companies. The port holes 2400 may be threaded as required to match the port insert 2302, typically M1x12 or ½"-20 threads. Custom manifolds can be made that handle more than one company's connectors, e.g., four Fischer connectors with M1x12 metric threads, and eight Ikelite connectors with ½"-20 UNRF threads, etc. This is useful when existing equipment with different plugs have to be mated to the single pressure vessel 104.

Examples of port inserts 2302 that may be used with the cable manifold ports 2300 include an Ikelite cable gland rated to 300 ft. depth, an Ikelite 5-wire socket and 5-wire plug rated to a 300 ft. depth, a Fischer 11-wire socket and plug rated to a 300 ft. depth, and a Teledyne Impulse 6 wire socket and plug rated to 20,000 ft. depth.

The cable manifold link 1210 may be used when a large number of electrical connections need to fan out from the single pressure vessel 104 to several additional pressure vessels 104. Like the dry link 2200, the cable manifold link 1210 incorporates two O-ring seals 1106 on each end to connect two pressure vessels 104 together and the continuous cavity which allows direct electrical wiring between the two sections. The cable manifold link 1210 also includes the standard connection configuration. The cable manifold link 1210 also includes four, eight, or sixteen threaded mounting port holes 2400 for commercially available waterproof electrical connectors. One pressure vessel 104 can thus have up to 16 easily maintained electrical cables 1214 passing from it to other vessels which can be disconnected at will. For example, the pressure vessel 104 containing a main computer could include various electrical connections terminating at the ports 2300, for example: one cable port 2300 to couple to the cable 1214 configured to pass commands and data to the user at the surface, six cable ports 2300 configured to connect to cables 1214 going to various sensors 4800 in other pressure vessels 104 and six cable ports 2300 configured to connect to cables 1214 extending to motor controllers in each of six thruster pressure vessels 106. If additional connections are required, more cable manifold links 1210 are easily added, or a custom cable manifold with the required number of connections is easily built.

The cable manifold link 1210 also allows underwater implementation of standard star-topology networks like UTP Ethernet or USB in connections between pressure vessels 104, as shown further below in the electrical distribution section.

Figure 24:
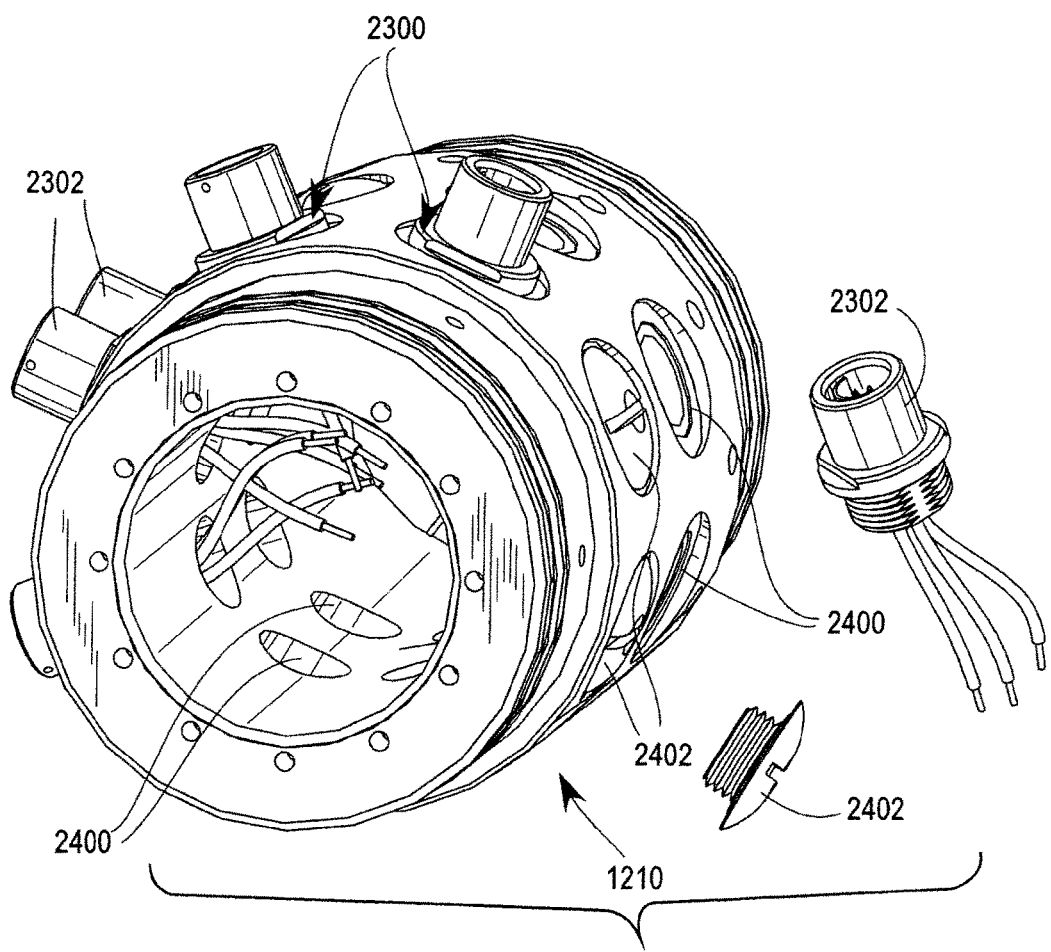
FIG. 24 is a perspective view of the cable manifold link showing an interior of the cable manifold link.

Referring next to FIG. 24, a perspective view of the cable manifold link 1210 showing the interior of the cable manifold link 1210 is shown. Shown are the port holes 2400, the ports 2300, a plurality of port caps 2402, and the port inserts 2302.

As previously described in FIG. 23, the cable manifold link 1210 includes the plurality of threaded port holes 2400 arrayed around the perimeter of the external portion 1308, configured to receive the port insert 2302 for connecting to the cable 1214 or other connection means. Also shown are the plurality of port caps 2402. The port caps 2402 include a threaded cylinder to fit the port 2300 and a top flange configured for unscrewing or alternate removal means from the port hole, and are typically provided by the manufacturer of the electrical connector. The port cap 2402 also includes an o-ring or other means to provide the watertight connection between the port cap 2402 and the cable manifold link 1210. The port hole may be recessed below the outer perimeter of the cable manifold link 1210 external portion 1308 to form a flat o-ring mating surface.

The port caps 2402 are plugs to seal the port holes 2400 when fewer ports 2300 are needed than the number of port holes 2400 provided. The port cap 2402 is typically available from the port insert 2302 manufacturer an attach to the port hole 2400 with the same watertight attachment.

Figure 25:
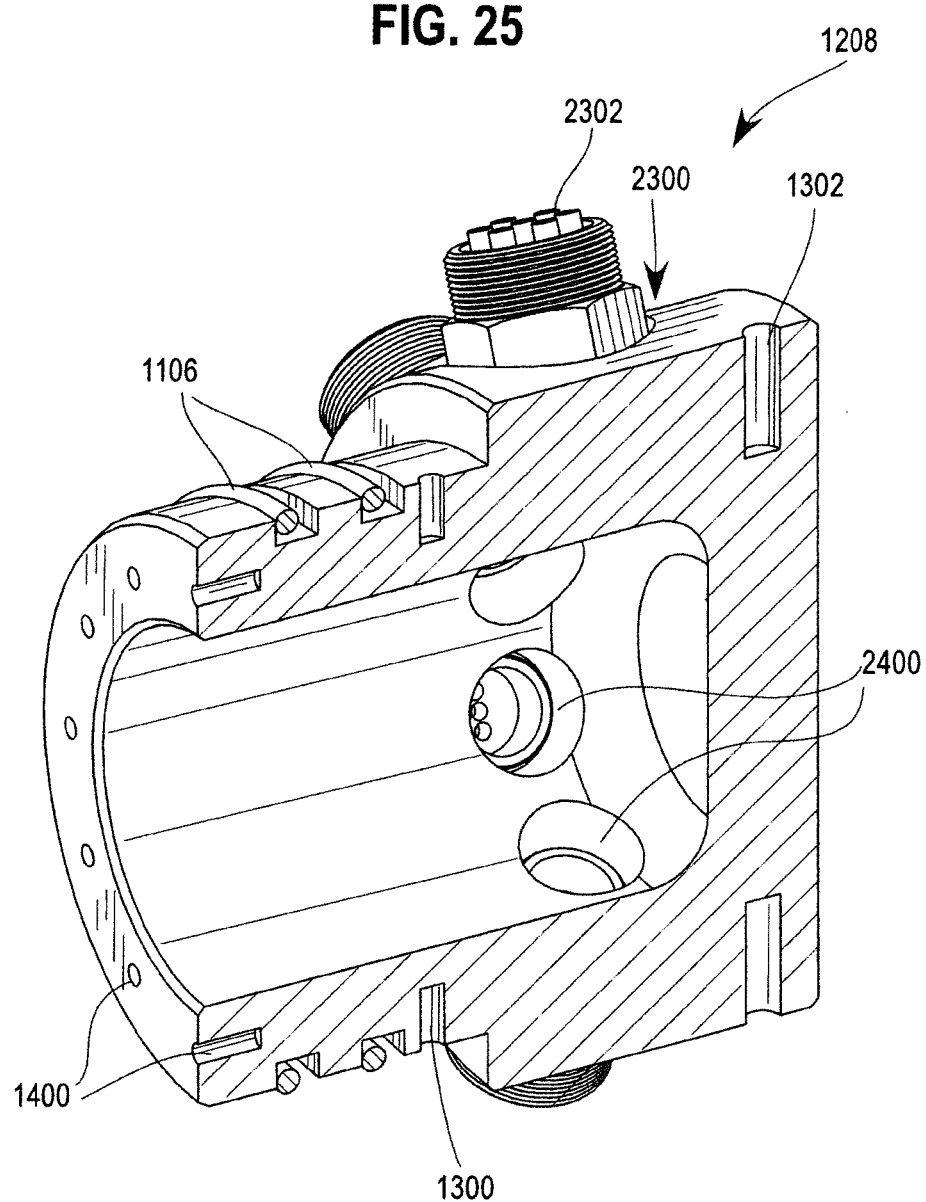
FIG. 25 is a cross-sectional view of a cable manifold dry end cap.

Referring next to FIG. 25, a cross-section of the cable manifold dry end cap 1208 is shown. Shown are the ports 2300, the port inserts 2302, the link strut mounting holes 1302, the component mounting holes 1400, the o-rings, and the tube mounting holes 1300.

In a variation of the dry end cap 1212, the external portion 1308 of the dry end cap 1212 may include the plurality of threaded port holes 2400 configured to receive the port insert 2302 for connecting to the cable 1214 or other connection means. The cable manifold dry end cap 1208 includes the internal cavity extending into the external portion 1308 to allow the port holes 2400 to connect to the internal cavity. The plurality of link strut mounting holes 1302 are also included in the external portion 1308. The embodiment shown in FIG. 25 terminates in a flat portion at the sealed end, and does not include the rim mounting holes 1304, but in other embodiments may include rim mounting holes 1304 and other end configurations of the dry end cap 1212.

Figure 26:
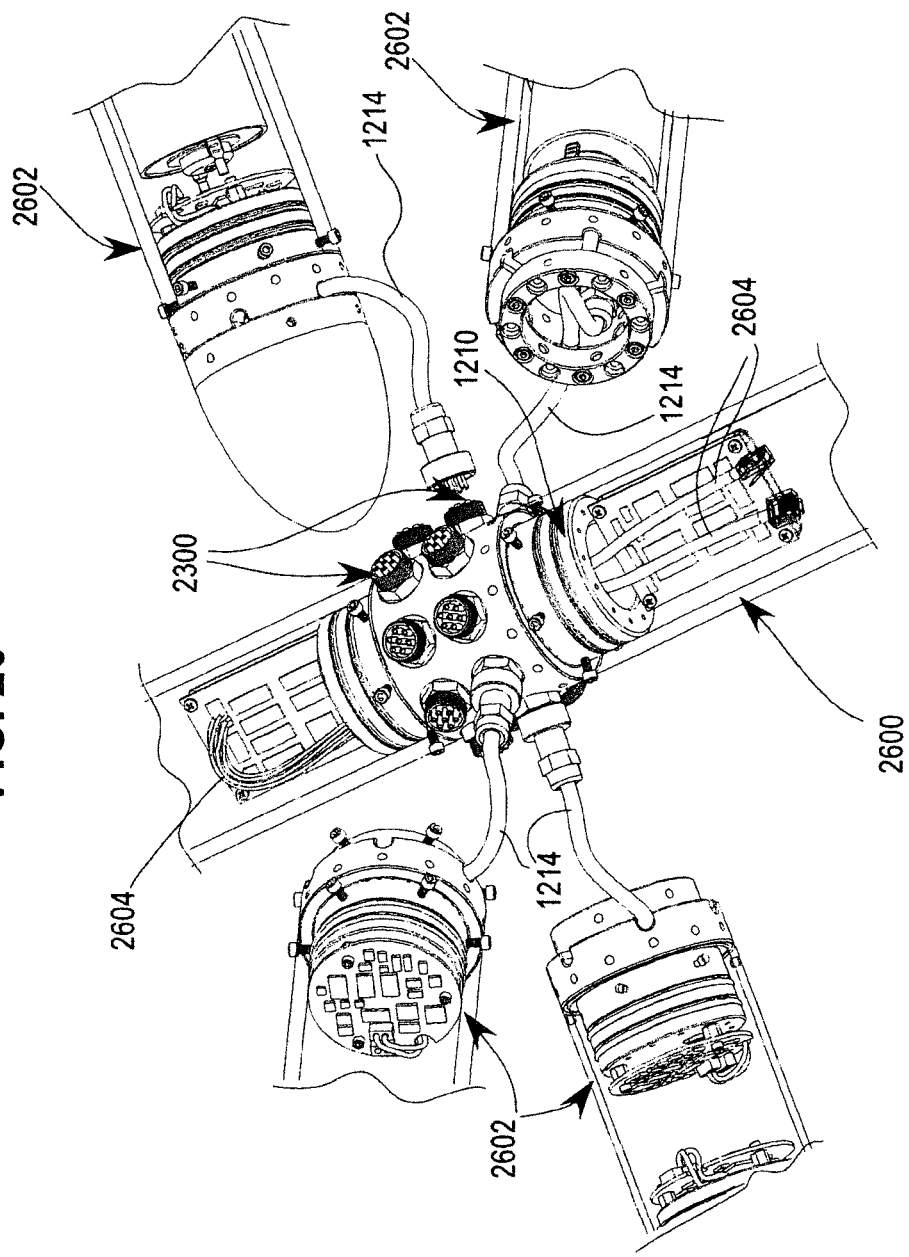
FIG. 26 is a perspective view of a central pressure vessel including the cable manifold link with attached auxiliary pressure vessels.

Referring next to FIG. 26, a perspective view of a central pressure vessel 2600 including the cable manifold link 1210 with attached auxiliary pressure vessels 2602 is shown. Shown are the central pressure vessel 2600, the plurality of auxiliary pressure vessel 2602, the cable manifold link 1210, the plurality of internal cables 2604, a plurality of external cables 1214, and the plurality of ports.

Components of the auxiliary pressure vessel 2602 are coupled to external cables 1214 fitted with mating connectors for electrical and/or communicative coupling with the matching port insert 2302 of the cable manifold link 1210. The port insert 2302 is coupled to the internal cable 2604 and thus to a component or components residing in the central pressure vessel 2600. The arrangement shown in FIG. 26 is a radial arrangement, but those of ordinary skill in the art will note that many other types of arrangements are possible, for example serial arrangements or a combination of both.

The radial configuration of the connecting ports on the cable manifold link 1210 allows for many different attachment points and configurations of peripheral equipment. Shown here is the cable manifold link 1210 electrically coupled to four peripheral pressure vessels 2602. The cables 1214 2604, port inserts 2302 and mating connectors may be configured to accommodate star-topology wiring schemes such as UTP Ethernet switches, Power-over-Ethernet, fiber optic Ethernet, USB hubs, and RS232 multiplexers.

Figure 27:
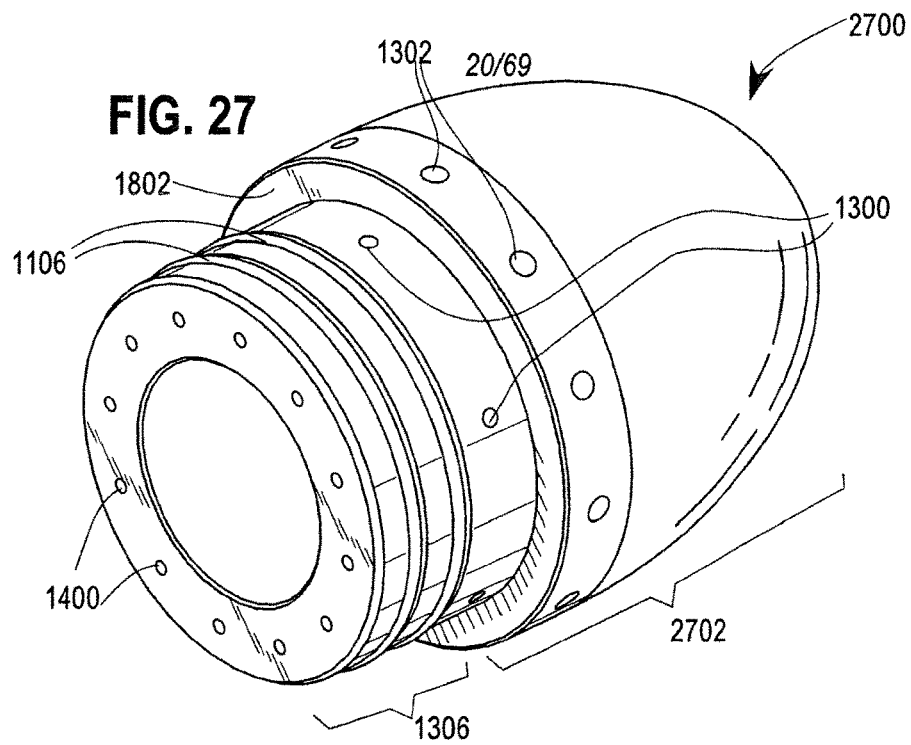
FIG. 27 is a perspective view of a dry nosecone in one embodiment of the present invention.

Referring next to FIG. 27, the dry nosecone 2700 in one embodiment of the present invention is shown. Shown are the tubular internal portion 1306, a parabolic external portion 2702, the two o-rings, the plurality of component mounting holes 1400, the plurality of link strut mounting holes 1302, the plurality of tube mounting holes 1300, and the shoulder 1802.

The internal portion 1306 of the dry nose cone is configured similarly to the internal portion 1306 of the dry end cap 1212, including the o-rings, component mounting holes 1400 and tube mounting holes 1300 in the standard configuration. The dry nosecone 2700 also includes the solid parabolic external portion 2702, which is integral to the internal portion 1306. The base of the parabolic external portion 2702 abuts the internal portion 1306, forming the shoulder 1802 for receiving the tube 1100, as previously shown with the dry end cap 1212. The end of the parabolic portion distal to the tube 1100 forms the tapered, streamlined parabolic nosecone.

The dry nosecone 2700 is similar to the dry end cap 1212, sealing the end of the pressure vessel 104 but also providing a low drag profile. An exemplary use of the dry nosecone 2700 is to lessen hydrodynamic drag along the URV's 100 main axis of travel, particularly on the URV 100 with a finite on-board power supply, as in FIG. 74. The dry nosecone 2700 comprises, ABS plastic, Delrin, acrylic, aluminum or other suitable material. Use of dry nosecones 2700 for buoyancy modules 108 is discussed further below in the buoyancy section.

Figure 28:
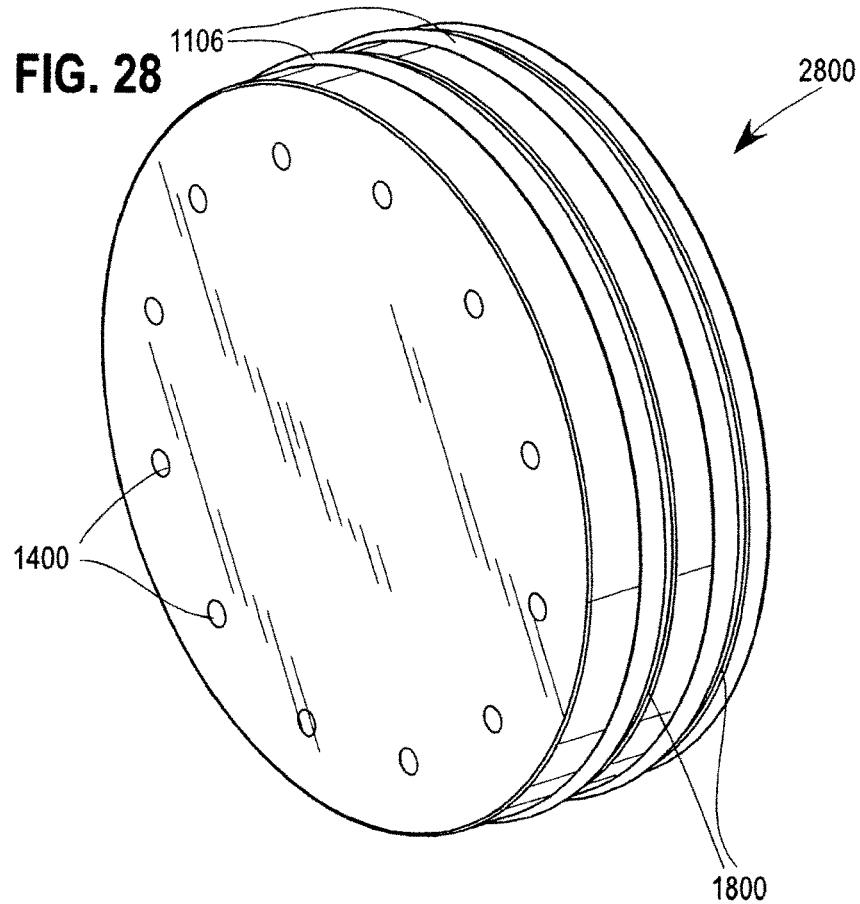
FIG. 28 is a perspective view of a floating pressure vessel wall.

Referring next to FIG. 28, a perspective view of a floating pressure vessel wall 2800 is shown. Shown are the o-ring seals 1106, the o-ring grooves 1800, and the component mounting holes 1400.

The floating pressure vessel wall 2800 comprises a generally solid cylinder configured to snugly fit within the tube 1100 forming a seal using the o-ring seals 1106, with the central axis of the floating pressure vessel wall 2800 aligned with the longitudinal axis of the tube 1100. In the example prototype system, the floating pressure vessel wall 2800 includes an outside diameter of 2.49" to fit inside the 2.50" inside diameter tube 1100. The height of the o-rings in the o-ring grooves 1800 will be greater than 0.01 inches, forming the watertight seal between the floating pressure vessel wall 2800 and the tube 1100.

Unlike the previously described modules, the floating pressure vessel wall 2800 is not configured to abut the end of the tube 1100, but instead is placed at a desired location inside the tube 1100 by another interior support, for example by the floating pressure vessel wall 2800 support column 2900, as described below. The floating pressure vessel wall 2800 can be positioned anywhere along the inside of the tube 1100. The floating pressure vessel wall 2800 includes the two o-ring grooves 1800 and two o-ring seals 1106 as previously described. Like other pressure vessel 104 modules, the floating pressure vessel wall 2800 includes the standard component mounting hole 1400 configuration. The component mounting holes 1400 are blind holes to maintain the waterproof seal. The floating pressure vessel wall 2800 may also include one or two axially-oriented through-holes for mounting sealed underwater connectors for routing the waterproof cable 1214 and the cable gland through the floating pressure vessel wall 2800. The through-hole may be threaded to match the thread of the connector, or the connector may be secured with a nut or other means.

The floating pressure vessel wall 2800 may comprise acrylic, polycarbonate, ABS, or another engineering plastic for shallower depths, but may be anodized aluminum, stainless steel, titanium, or ceramic (with matching tube material) to achieve greater depths.

Sealing the pressure vessel 104 with end caps that abut the ends of the pressure vessel tube 1100 is simple and effective, but the tube 1100 is exposed not only to the radial hydrostatic water pressure around the tube 1100, but to the axial water pressure pressing the end caps in as well. At a depth of 200 feet, the approx. 100 psi acting on the 4.9 sq inch area of the 2.5" inside diameter of the tube 1100 yields 490 lbs of purely axial load on the end caps, which the rims of the end caps transfer to the tube's 1100 2.16 sq inch cross section, for 227 additional psi of axial pressure. Relieving that pressure would allow the pressure vessel 104 to withstand more radial pressure and allow deeper depth.

A second concern with pressure vessels 104 sealed with end caps is that it is sometimes useful to have the dry pressure vessel 104 length be less than the length of the tube 1100 mounted on the chassis 102, so that the single pressure vessel tube 1100 can contain a dry space for electronics connected through the floating pressure vessel wall 2800 to instruments in an adjacent large freely flooded space within the tube 1100. As an example, delicate instruments such as pressure sensors, thermometers, or conductivity sensors might need to extend outside the pressure vessel 104, but be within the tube 1100 in a space flooded with water but protected from impacts or debris. Having the floating pressure vessel wall 2800 that can be in the middle of the tube 1100 provides this capability.

Another case where it would be useful to separate the pressure wall from one of the pressure vessel 104 end caps would be when an unusually large or long connector is used on one end, or if the cable 1214 connected to the connector is unable to bend in a tight enough radius to be fit in the small space between the connector and the strain relief groove 1804 in the dry end cap 1212. In such a case it would be useful to move the connection to which the connector is attached far enough away from the end of the tube 1100 to allow sufficient clearance. The floating pressure vessel wall 2800 will accomplish this.

The floating pressure vessel wall 2800 also supports pressure compensated housings as an alternate method of preventing water ingress. If the contents of the pressure vessel 104 are impervious to oil and to the pressure at the depth of operation (for example, if all capacitors on a circuit board are ceramic and there are no electrolytic capacitors that leak under high pressure) filling the interior volume with oil relieves both axial and radial pressure and renders the pressure vessel 104 incompressible and capable of deep descents if all pressure vessels 104 in the URV 100 were similarly treated. The pressure vessel 104 is then no longer a "pressure" vessel but simply a housing that prevents intrusion of damaging seawater past the o-ring seals 1106.

Figure 29:
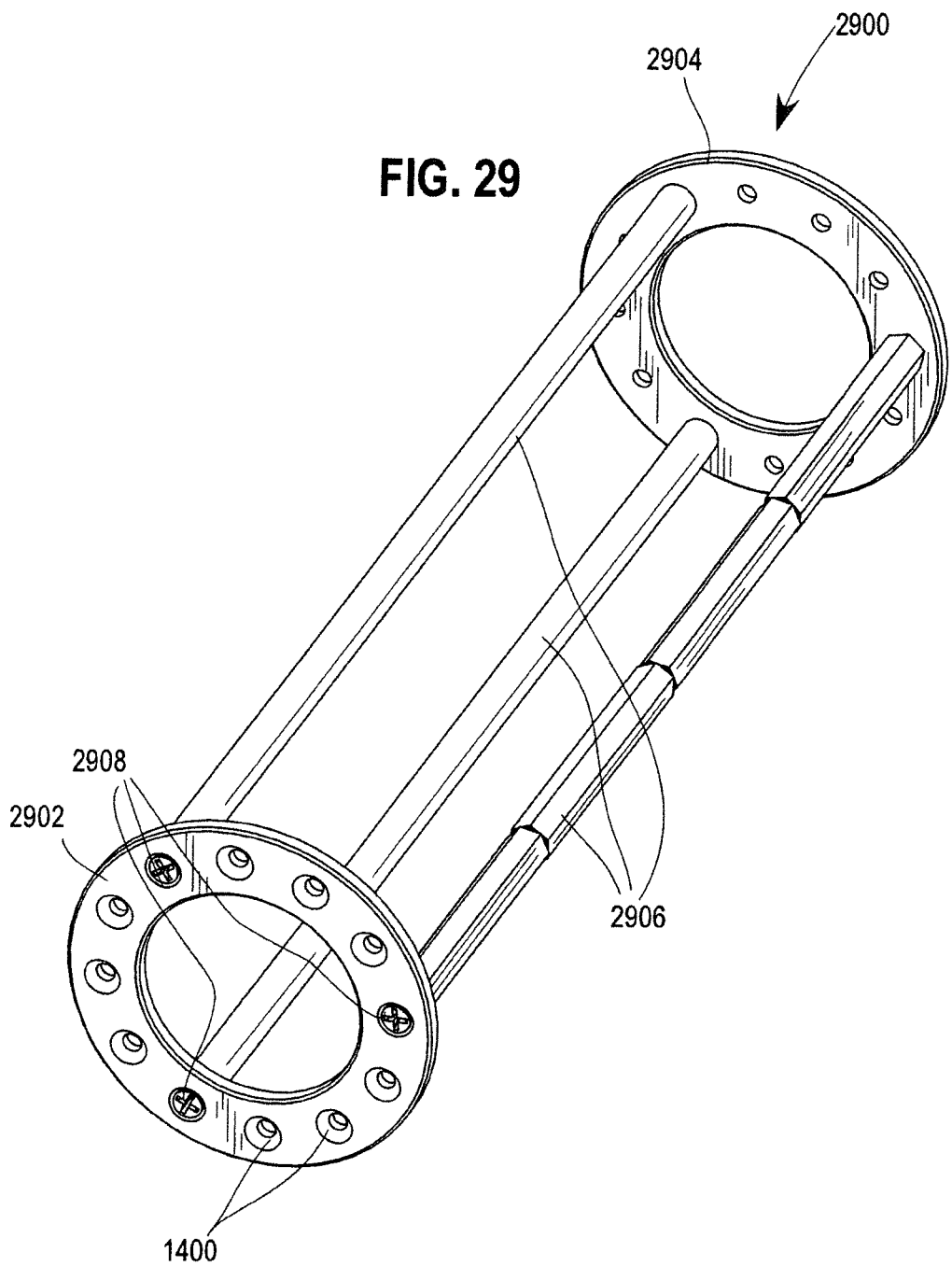
FIG. 29 is a perspective view of a pressure vessel wall support column in one embodiment of the present invention.

Referring next to FIG. 29, a perspective view of a floating pressure vessel wall support column 2900 in one embodiment of the present invention is shown. Shown are a first support column ring 2902, a second support column ring 2904, a plurality of support column rails 2906, a plurality of support column fasteners 2908, and the plurality of component mounting holes 1400.

The support column 2900 is comprised of the first support column ring 2902 and the second support column ring 2904 interposed by at least three support column rails 2906, thus forming a cylinder shape with mostly open sides. While three support column rails 2906, as shown in FIG. 29, are normally sufficient to insure mechanical stability, in cases where extreme pressure or other mechanical stress might be expected to apply loads onto the floating pressure vessel wall 2800, 4 or 6 support column rails 2906 can be used to distribute the load.

The support column rings 2902 2904 are toroidal in shape and oriented such that the first support column ring 2902 center and the second support column ring 2904 center align. Each support column ring 2902 2904 includes component mounting holes 1400 in the standard configuration. The component mounting holes 1400 receive the support column fastener 2908 that couples the support column rail 2906 to the ring, the support column rail 2906 being configured to receive the threaded fastener 2908. In some embodiments the component mounting holes 1400 may be countersunk so that support column fasteners 2908 that are flat-headed can be flush with an outer surface of the ring 2902 2904 such that the ring 2901 2904 rests flat against the floating pressure vessel wall 2800. The support column rails 2906 can be round 4-40 internally threaded standoffs custom made to length or made of multiple commercially available 4-40 threaded standoffs coupled together in series. Commercially available standoffs may be combined freely with custom standoffs to make support column rails 2906 of any required length. For example to adjust the lengths of 12" long support column rails 2906 to 12.75", standard 0.25" diameter standoffs could simply be added to support column rail 2906 ends without affecting performance. The standoffs may be either round or the common hexagonal type, but round standoffs will allow attachment of circuit board mounting clips 4200 and thus afford more options for mounting circuit boards as described later. In other embodiments, the standoffs may be male/female threaded.

In other embodiments, multiple sets of support column rings 2902 2904 and support column rails 2906 may be used, e.g. three support column rings 2902 2904 separated by two sets of support column rails 2904. In yet another embodiment, the support column 2900 may be fastened to an end cap in lieu of fastening to the support column ring 2902 2904. In that case, the standoffs 3702 would need to be threaded male on one end and female on the other to thread into the end cap and be secured by screws at the Mounting Plate end. Note that this type of support column 2900 cannot be formed between two link modules or end cap modules 3400 as there would be no way to either get the assembly inside the pressure vessel 104 once assembled, or to assemble it inside the pressure vessel 104.

Figure 30:
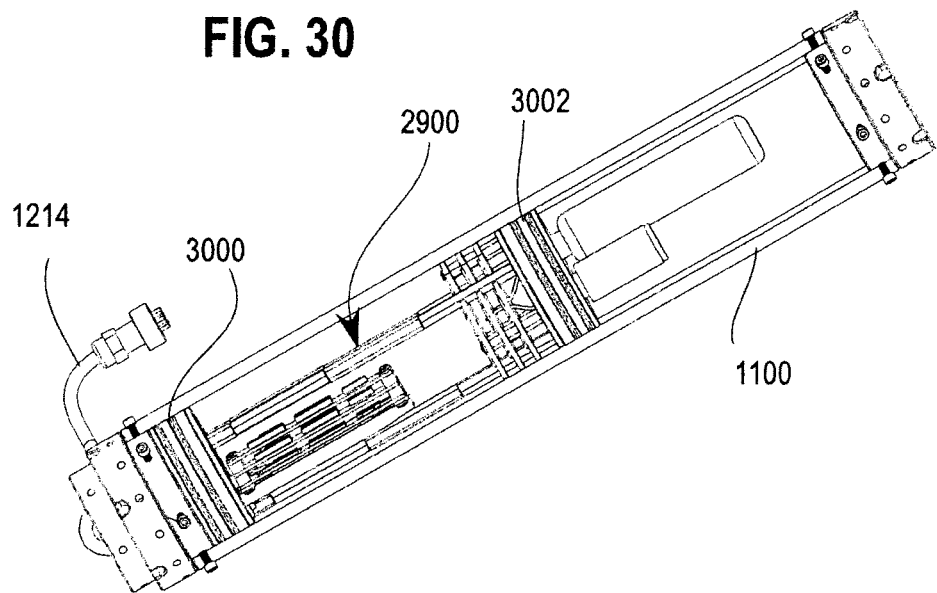
FIG. 30 is a perspective view of a tube portion of the pressure vessel including two floating pressure vessel walls and a support column.

Referring next to FIG. 30, a portion of the pressure vessel 104 including two floating pressure vessel walls 2800 and the support column 2900 is shown. Shown are the tube 1100, a first floating pressure vessel wall 3000, a second floating pressure vessel wall 3002, the support column 2900, and the cable 1214.

The support column 2900 in one embodiment is used interposed between the first floating pressure vessel wall 3000 and the second floating pressure vessel wall 3002, bracing the floating pressure vessel walls 3000 3002 against water pressure to define the interior volume of the pressure vessel 104. This is useful in cases where the user does not wish to use two dry end caps 1212 to seal the pressure vessel 104. Use of the support column 2900 also affords several circuit board mounting options discussed later.

Since the floating pressure vessel wall 2800 is not fastened to the tube 1100 or the end cap, using the floating pressure vessel wall 2800 to seal the pressure vessel 104 typically requires some means of preventing axial water pressure from forcing the floating pressure vessel wall 2800 inward and collapsing the interior volume until the air pressure within equals the water pressure without. The support column 2900 should be capable of withstanding at least the pressure at the required operating depth: for example, 2.5" diameter floating pressure vessel walls 2800 have a surface area of approximately 4.9 sq. in.×0.445 psi/foot, yielding 490 lbs pressing inward at 200 feet.

Another example of use of the support column 2900 would be when the user desires to avoid having the axial load of water pressure supported by the pressure vessel tube 1100, as is the case when the simplest arrangement of the tube 1100 with two dry end caps 1212 is used. With the floating pressure vessel wall 2800, the axial load is borne by the support column rails 2906 rather than the tube 1100, reducing the possibility of the axial water pressure causing buckling of the tube 1100.

Use of at least one floating pressure vessel wall 2800 is advised when operation near maximum depth is anticipated. If the URV 100 is operated at depths where the axial hydrostatic pressure and excessive length of the support column rails 2906 in the long pressure vessel 104 make buckling of the support column rails 2906 a concern, additional support column rings 2902 2904 can be added to control the buckling by reducing the length-to-cross-section ratio of the support column rails 2906.

Figure 31:
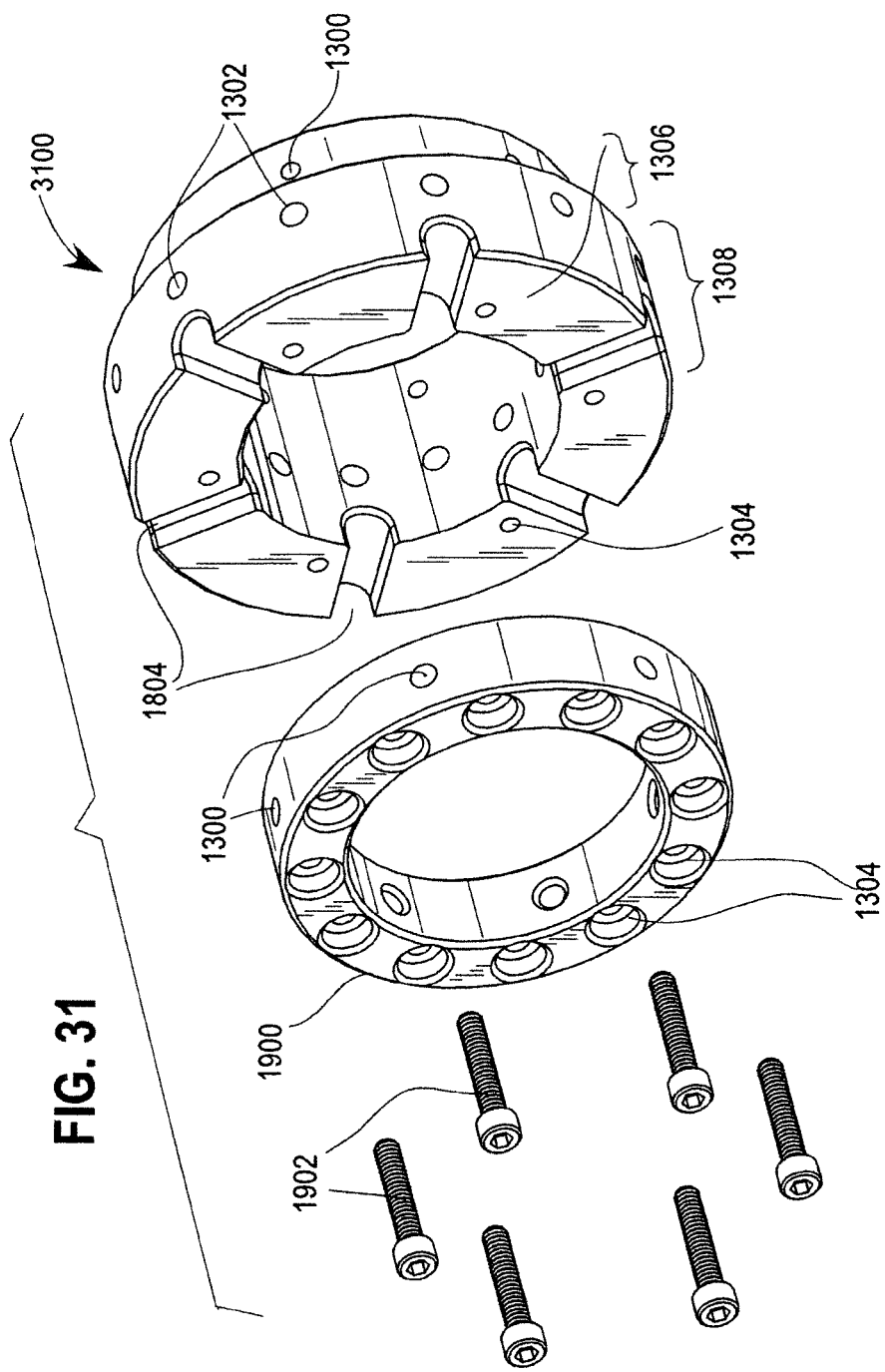
FIG. 31 is a perspective exploded view of a wet link and mounting rim in one embodiment of the present invention.

Referring next to FIG. 31, a wet link 3100 in one embodiment of the present invention is shown. Shown are the strain relief grooves 1804, the link strut mounting holes 1302, the tube mounting holes 1300, the mounting rim 1900, the mounting rim screws 1902 and the rim mounting holes 1304.

The wet link 3100 is tubular, with a generally constant inner diameter. A wet link 3100 outer diameter steps inward proximate to an end receiving the tube 1100, forming the shoulder for receiving the tube 1100. The tube 1100 end also includes the standard tube mounting holes 1300. The wet link 3100 end distal to the tube end includes the strain relief grooves 1804 as shown in FIG. 18. The wet link 3100 also includes the rim mounting holes 1304 and the link strut mounting holes 1302 on the wet end cap end distal to the tube end. The mounting rim 1900 as shown in FIG. 19 is typically coupled to the rim mounting holes 1304.

The holes and dimensions of the wet link 3100 also conform to the standard geometry and spacing for the link modules to facilitate interchangeability and recombinability.

Referring again to FIG. 31, the wet link 3100 may provide a free-flooding end to the pressure vessel 104, may mechanically connect two separate, fully enclosed pressure vessels 104 end to end and also provide attachment points for the link struts 500 that connect the pressure vessel 104 to the chassis 102. The wet link 3100 provides no sealing. The space between connected pressure vessels 104 is freely flooded with water (hence the term 'wet'). In one form, connecting pressure vessels 104 are sealed with floating pressure vessel walls 2800 where they join the wet link 3100, and any electrical connections between the connected pressure vessels 104 or to other pressure vessels 104 may be done through separate waterproof cables 1214 and connectors attached to the floating pressure vessel walls 2800. The cables are captured in one of the strain relief grooves 1804 when the wet end cap is coupled to the mounting rim 1900.

Figure 32:
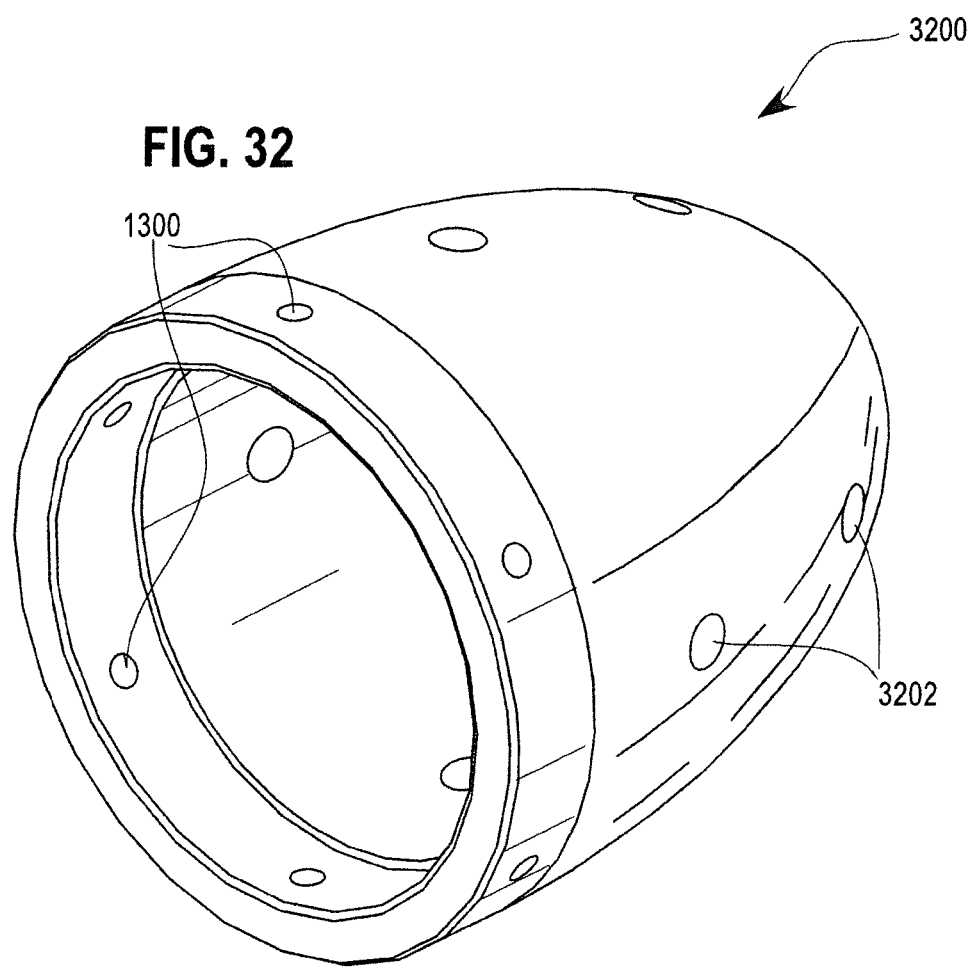
FIG. 32 is a perspective view of a wet nosecone in one embodiment of the present invention.

The wet link 3100 provides various functions: constraining the floating pressure vessel walls 2800 and support column; capturing and providing strain relief for the cable 1214 that penetrates the floating pressure vessel wall 2800, provide mounting points for the link struts 500. Additionally, the twelve rim mounting holes 1304 allow the mounting rim 1900 to be rotated in 30 degree increments, allowing modules in the single pressure vessel 104 to be rotated in 30 degree increments with respect to the chassis 102 and other pressure vessels 104. As an example, this allows lateral propeller 6302 modules to be mounted orthogonally from each other to provide both vertical and lateral thrust, Referring next to FIG. 32, a wet nosecone 3200 in one embodiment of the present invention is shown. Shown are the tube mounting holes 1300 and a plurality of flooding holes 3202.

The wet nosecone 3200 comprises a hollow parabolic cone shape with a nosecone base configured to slidably fit over the wet link 3100 (i.e. with a same outside diameter and inside diameter as the tube 1100 and including the tube mounting holes 1300), mounting rim 1900, or other module configured to receive the wet nosecone 3200. The wet nosecone 3200 is coupled to the receiving module using the tube mounting holes 1300 and associated fasteners. The wet nosecone 3200 also includes the plurality of flooding holes 3202 spaced over the nose portion of the wet nosecone 3200 and configured to allow water to easily flood the nosecone. In the present embodiment, the nosecone 3200 includes 8 holes approximately ⅜" in diameter, but any suitable number of holes may be used.

When the pressure vessel 104 is terminated with the wet end cap or the dry end cap 1212 with mounting rim 1900, the free flooding wet nosecone 3200 may be attached to the end cap for hydrodynamic streamlining or to protect the sensor 4800 that may be exposed to water. Although the lack of o-rings would itself cause the nosecone to eventually fill with water, the large flooding holes 3202 promote rapid, thorough flooding so the nosecone section won't trap air that leaks away slowly, thus preventing unpredictable, gradual altering the buoyancy of the URV 100.

Figure 33:
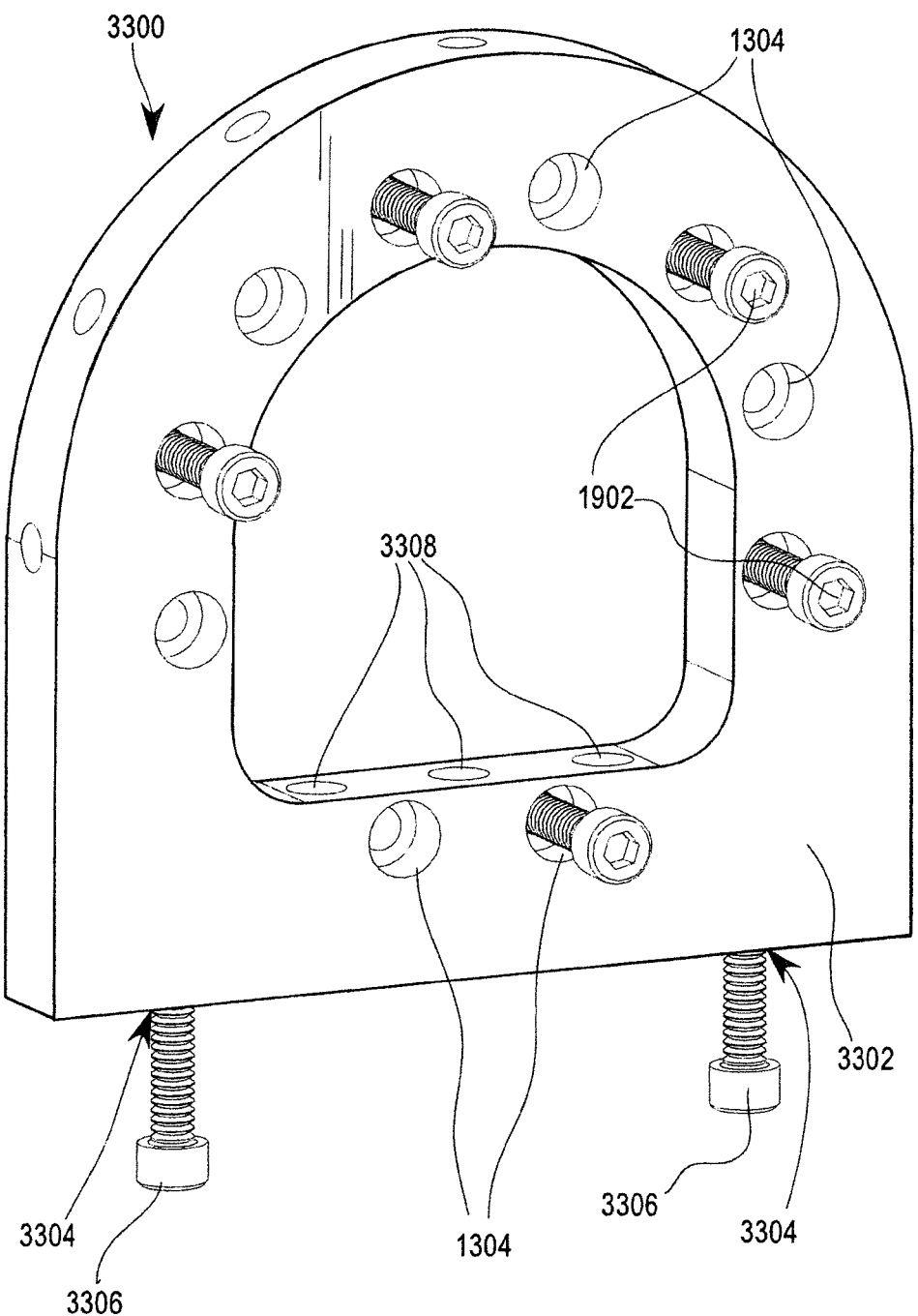
FIG. 33 is a perspective view of a deck mounting rim in one embodiment of the present invention.

Referring next to FIG. 33, a deck mounting rim 3300 is shown in one embodiment of the invention. Shown are a foot 3302, the plurality of rim mounting holes 1304, a plurality of mounting rim screws 1902, two lower deck mounting holes 3304, three upper deck mounting holes 3308 and two deck mounting screws 3306.

The deck mounting rim 3300 is approximately D-shaped, with the back of the D forming the foot 3302. The deck mounting rim 3300 may be made of ABS, polycarbonate, acrylic, or similar engineering plastic, or it may be anodized aluminum, as required by the user. The deck mounting rim 3300 is approximately 0.375" thick in the out-of-plane direction, but may vary depending as required to support the pressure vessel 104 as shown further below. The outside of a curved portion of the D-shape is generally semicircular and matches the outer perimeter of the end cap module 3400. The deck mounting rim 3300 includes the standard rim mounting hole configuration generally arrayed around the hole of the D-shape. In the embodiment shown, nine rim mounting holes 1304 are included: two in the foot 3302, and seven in the curved portion. The plurality of mounting rim screws 1902 are coupled to the deck mounting rim 3300 using the component mounting holes 1400.

The deck mounting rim 3300 also includes the two lower deck mounting holes 3304 located in outer portions of the foot 3302 of the D-shape where the curved portion of the deck mounting rim 3300 meets the foot 3302, and oriented in the plane of the deck mounting rim 3300. The lower deck mounting holes 3304 are blind holes. The deck mounting screws 3306 are coupled to the deck mounting holes.

The upper deck mounting holes 3308 are located in the center portion of the foot 3302, and pass through the width of the foot 3302. In the current embodiment, three upper deck mounting holes 3308 are shown.

Figure 36:
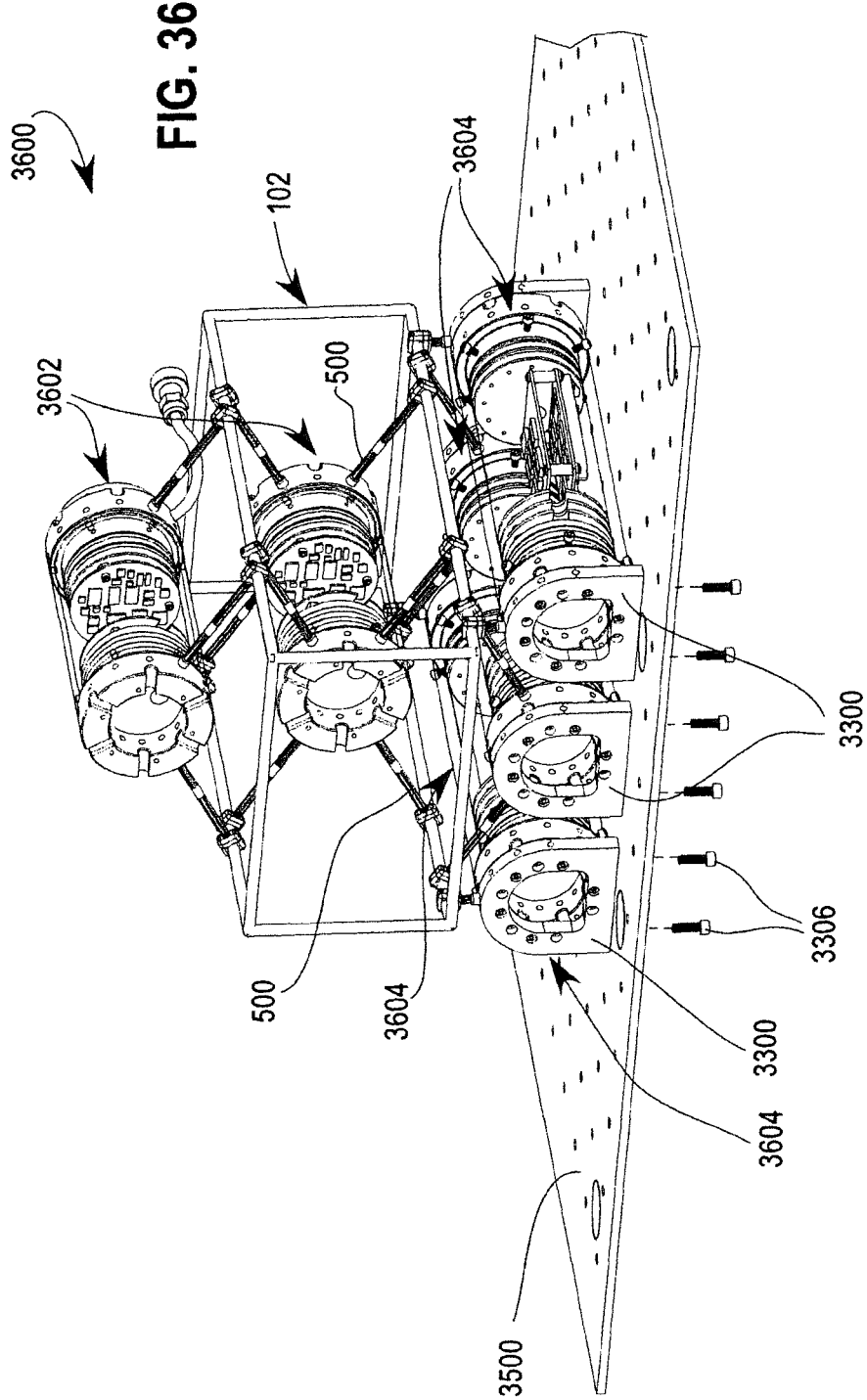
FIG. 36 is a perspective view of pressure vessels coupled to a deck using the deck mounting rims.

Optionally, the deck mounting rim 3300 may include the link strut mounting holes 1302 for coupling a chassis-mounted pressure vessel 104 to the deck mounting rim 3300, as illustrated in FIG. 36.

Figure 34:
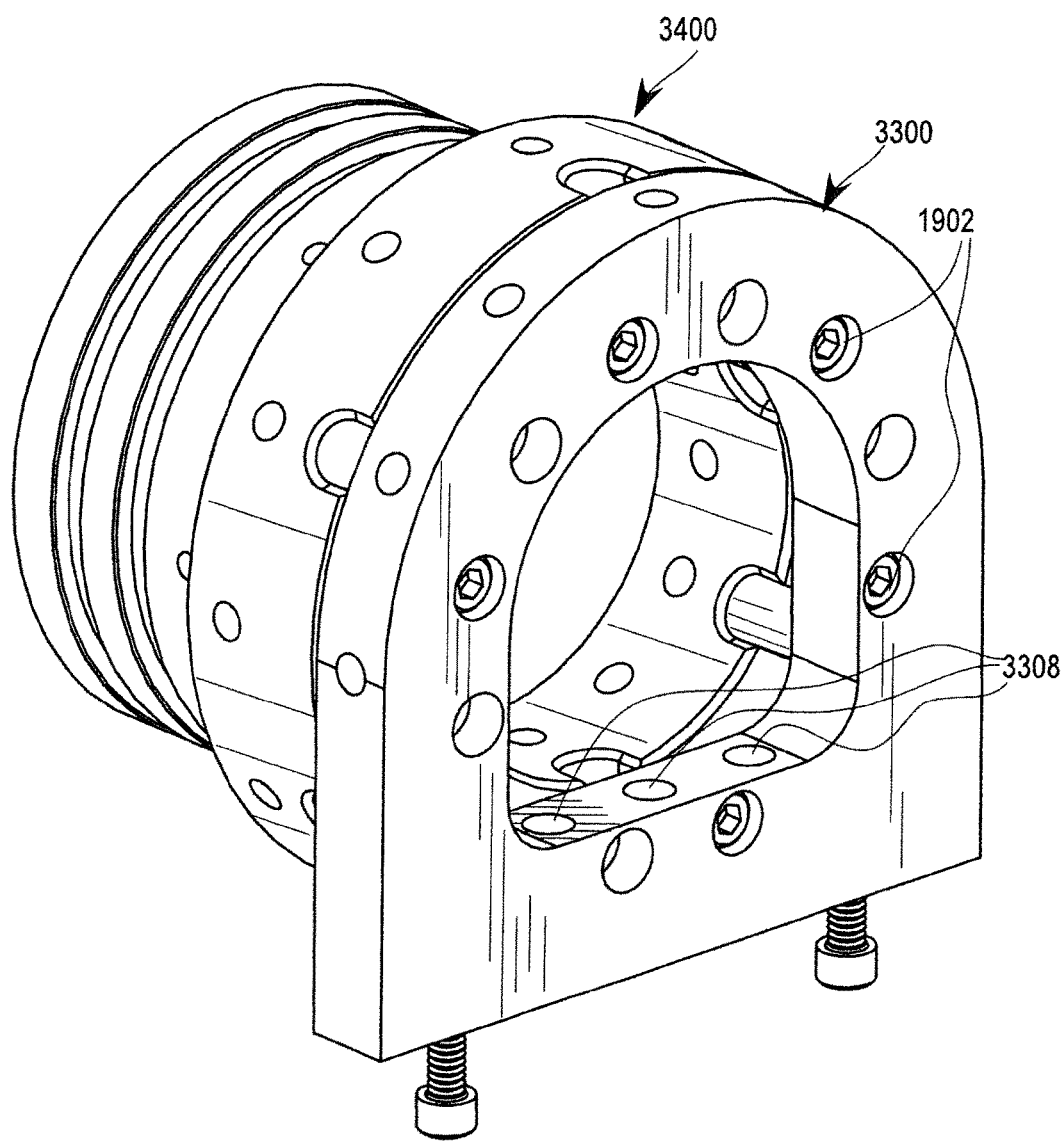
FIG. 34 is a perspective view of the deck mounting rim coupled to the dry end cap.

Referring next to FIG. 34, the deck mounting rim 3300 is shown coupled to the end cap module 3400 of the pressure vessel 104. Additionally shown are the mounting rim screws 1902.

The deck mounting rim 3300 is coupled to the component mounting holes 1400 of the pressure vessel end cap 3400 using the mounting rim screws 1902. When the end cap 3400 includes the external cavity, the interior void of the D-shape is generally configured to allow access to the external cavity. The foot 3302 of the D-shape extends beyond the outer perimeter of the end cap module 3400.

Figure 35:
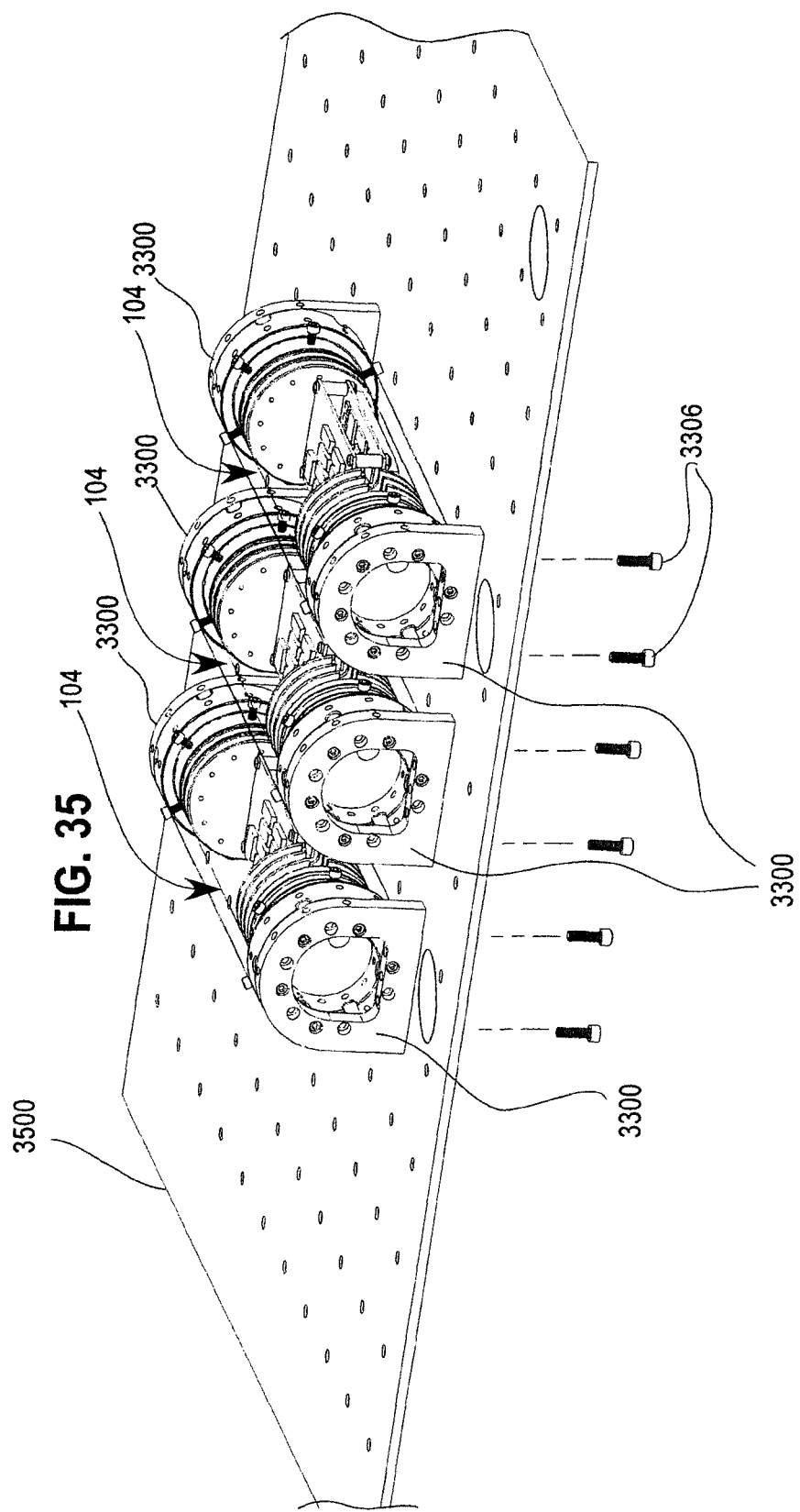
FIG. 35 is a perspective view of pressure vessels coupled to a deck using the deck mounting rims.

Referring next to FIG. 35, pressure vessels 104 are shown coupled to a deck 3500 using the deck mounting rims 3300. Additionally shown are the deck mounting screws 3306.

Each pressure vessel 104 includes the deck mounting rim 3300 coupled to the end cap module 3400 as shown in FIG. 34. For each 104, the deck mounting rims 3300 are oriented so that the foot 3302 of each deck mounting rim 3300 is aligned in plane. The pressure vessel 104 is then placed with the foot 3302 of each deck mounting rim 3300 seated on the deck 3500, i.e. the curved shape of the D-shape is pointing upward and the pressure vessel 104 is supported horizontally between the two deck mounting rims 3300. The deck 3500 includes a plurality of deck holes configured to match the spacing of the deck mounting holes 3304 in the deck mounting rim 3300. The pressure vessel 104 is then coupled to the deck 3500 using the deck mounting screws 3306 passing through the deck holes and into the deck mounting holes of the deck mounting rim 3300.

Referring again to FIGS. 33-35, using the deck mounting rim 3300, pressure vessels 104 can be securely attached to a two dimensional surface, such as an underwater structure to which robotic components must be added, such as the hull of a vessel or an underwater bottom crawling robot. The deck mounting rim 3300 attaches to the dry end cap 1212, the wet end cap, the cable manifold dry end cap 1208 or other module that includes the URVDS component mounting hole 1400 configuration, being screwed into place with its curved edge generally concentric with the external portion 1308 of the end cap. The foot 3302 includes two types of mounting holes: on the bottom are the lower deck mounting holes 3304, two threaded holes by which the deck mounting rim 3300 can be screwed to the deck 3500 or other surface from below. In addition the deck mounting rim 3300 includes the upper deck mounting holes 3308 with clearance for screws or fasteners (typically 10-32 screws) to pass through the upper deck mounting holes 3308 so that the deck mounting rim 3300 can be securely fastened to the flat deck 3500. With deck mounting rims 3300 attached to end caps 3400 at the two ends of the pressure vessel 104, the pressure vessel 104 can be secured to the flat surface.

Referring next to FIG. 36, a pressure vessel-chassis assembly 3600 is shown coupled to the deck 3500 using the deck mounting rims 3300. Shown are the deck 3500, two chassis-mounted pressure vessels 3602, the chassis 102, three deck-mounted pressure vessels 3604, the deck mounting rims 3300, the plurality of link struts 500, and the deck mounted screws.

The three deck-mounted pressure vessels 3604 are coupled to the deck 3500 as previously shown in FIG. 35. The chassis 102 is located above the deck-mounted pressure vessel 3604 and is coupled to and supported by the plurality of link struts 500. The chassis 102 is coupled to and supports the two chassis-mounted pressure vessel 3602.

Since the semicircular curved portion of the deck mounting rim 3300 is penetrated with the seven threaded holes in the same manner as the end cap's link strut mounting holes 1302, link struts 500 can be secured to the upper surface of the deck mounting rim 3300 as shown, so that if the deck mounting rims 3300 and their pressure vessels 3604 are properly spaced (the beam 204 width of the chassis system being used), rails 200 might be attached to the deck mounting rim 3300. Note that link struts 500 may also still be attached to the end caps 3400, so that their rail clamps 208 are staggered with respect to the rail clamps 208 attached to struts in the deck mounting rim 3300 so that when they are attached to the rail 200 they can both attach to the rail 200 without interfering with one another. This allows the chassis rail system with attached pressure vessels 104 to be secured to the flat surface and built up as needed by the user.

Printed Circuit Board Mounting System

Printed circuit boards (PCBs) are the predominant type of component housed in the pressure vessels 104. The PCB may be typically rectangular standard off-the-shelf PCBs, or user designed circular PCBs 3700 to pack more densely into the pressure vessels 104 to minimize its length. The URVDS has a flexible set of PCB mounting methods that work for rectangular or circular PCBs 3700, and which allow different board geometries to compatibly share the same pressure vessels 104 without interference.

These methods can be used with all of the types of pressure vessels 104 end caps and dry links 2200.

In the present embodiment, the components that comprise the Circuit Board Mounting System are:

1) Dry end caps 1212 or dry links; 2) Support Column Mounting Rings; 3) Support column rails 2906, 4) PCB Mounting Brackets 3800 and mounting plates 4002, 5) PCB Rail Mounting Clips 4200, 6) Commercially available 4-40 threaded standoffs 3702.

As previously described, a feature specified in the URVDS architecture and shared among all modules is the set of twelve 4-40 tapped axially-oriented component mounting holes 1400. In the present embodiment, the component mounting holes 1400 form a 2" diameter bolt circle axially aligned with the end cap axis.

Referring next to FIG. 37, an exploded view of the plurality of circular PCBs 3700 is shown for mounting to the dry end cap 1212. Shown are the dry end cap 1212, the circular PCBs 3700, the component mounting holes 1400, the standoffs 3702 and the standoff fasteners.

In one embodiment, circular PCBs 3700 may be mounted directly to the end of any end cap 3400, link or other module that includes the standard component mounting holes 1400 (for example, the support column 2900). The circular PCBs 3700 are configured to almost slidably fit within the interior of the tube 1100, with the center of the PCB aligned with the center of the tube 1100. The circular PCBs 3700 may have connectors that pass wiring through the board, or may require another technique such as notching the board to allow passage for wiring or cables 2604. The circular PCBs 3700 include perimeter holes located to match the component mounting hole configuration. One or more PCBs may be coupled to the module by interposing internally threaded standoffs 3702 between the circular PCBs 3700 and between the circular PCB 3700 and the link module. In the example shown, three standoffs 3702 are used between each element, for a total of 9 standoffs 3702 used to couple 3 circular PCBs 3700 to the dry end cap 1212. In one embodiment, male-to-female standoffs 3702 are used. In the exemplary URVDS, circular PCBs 3700 with diameters between 2.2" and 2.5", and holes for #4 screws on a 1" radius are mounted to a link using 4-40 standoffs 3702. It will be appreciated by those of ordinary skill in the art that a rectangular PCB 3900 may also be coupled to the link module as long as the rectangular PCB 3900 (or other shape PCB) fits within the tube 1100 and includes enough mounting holes in the configuration to match the component mounting holes 1400.

Referring next to FIG. 38, an exemplary rectangular PCB mounting bracket 3800 in one embodiment of the present invention is shown. Shown are component mounting holes 1400, a bracket notch 3802, two bracket legs 3804, a bracket base and four flanges 3808.

The rectangular PCB mounting bracket 3800 is a general U-shape comprised of flat plates and configured such that the bracket base 3806 of the U mounts to the standard component mounting holes 1400 of the module and the bracket legs 3804 of the U-shape are generally parallel to the longitudinal axis of the tube 1100. The bracket legs 3804 are generally perpendicular to the bracket base 3806 and extending outward from the module. The bracket base 3806 includes two holes configured to match the standard component mounting hole spacing with one hole skipped (such that the component mounting holes 1400 are aligned horizontally with respect to the bracket base 3806). The semicircular bracket notch 3802 in the midpoint of the U-shaped bracket base 3806, on the bottom side, allows for access of the component mounting hole 1400 of the module located between the component mounting holes 1400 of the bracket 3800 when the bracket 3800 is coupled to the module. Each leg of the U-shape includes two flanges 3808, each flange 3808 including a hole configured to receive a fastener for mounting the rectangular PCB 3900 to the rectangular PCB mounting bracket 3800. The flange 3808 is oriented perpendicularly to the plane of the leg and extends outward (relative to the U-shape) from a top of the leg in the embodiment shown. The flange 3808 may alternately extend inward as required to match the location of the mounting holes of the PCB. The dimensions of the rectangular PBC mounting bracket 3800 are configure such that the flange holes match the mounting hole locations and dimensions of the commercially available rectangular PCB 3900. The rectangular mounting bracket 3800 may comprise a bent sheet metal such as aluminum, or may comprise cast plastic or other suitable material.

For typical commercially available rectangular PCBs 3900, e.g. a BeagleBoard Linux Board or a Raspberry Pi™ Linux Board, the rectangular PCB mounting bracket 3800 matches the standard rectangular PCB mounting holes, allowing the standard rectangular PCB 3900 to be used in the URVDS. The mounting bracket 3800 is coupled to the standard component mounting holes 1400, allowing it to be coupled to any module including the component mounting holes 1400. The semicircular bracket notch 3802 allows the mounting bracket 3800 to clear any support column rail 2906 that might be present.

Referring next to FIG. 39, a perspective view of the plurality of rectangular PCBs 3900 mounted to the dry end cap 1212 is shown. Shown are the rectangular PCB mounting bracket 3800, the dry end cap 1212, the flanges 3808, the standoffs 3702, and the fasteners.

The rectangular PCB mounting bracket 3800 is coupled to the dry end cap 1212 or other suitably configured module with the compatible threaded fasteners inserted into the component mounting holes 1400 located in the bracket base 3806 and into the component mounting holes 1400 of the dry end cap 1212. The semicircular bracket notch 3802 faces towards the perimeter of the dry end cap 1212 and clears the component mounting hole located between the component mounting hole 1400 locations, as previously described. Similarly to the mounting of the circular PCBs 3700, the rectangular PCBs 3900 are spaced using the standoffs 3702. The standoffs 3702 are located at each corner of the rectangular PCB 3900, aligning with holes located in corners of the rectangular PCB 3900 and the flanges 3808 of the rectangular PCB mounting bracket 3800. The standoffs 3702 are some combination of male-to-female or female threaded standoffs 3702 such that the board stack is fastened together as a unit and mounted to the rectangular PCB mounting bracket 3800 with screws in female standoffs 3702. In some embodiments, insulated washers are included between the mounting bracket 3800 and the board. The mounting bracket legs 3804 are generally oriented in the strong direction relative to a weight of the rectangular PCBs 3900.

In some embodiments, rectangular and circular PCBs 3900 3700 may be mounted in the same tube 1100 when circular PCBs 3700 are mounted to one end cap and the rectangular PCBs 3900 are mounted to the opposite cap.

Referring next to FIG. 40, an exploded view of an exemplary rectangular PCB mounting shelf 4000 and a mounting plate 4002 is shown. Shown are the rectangular PCB mounting shelf 4000, the rectangular PCB mounting plate 4002, a plurality of mounting plate fasteners 4004, the first mounting shelf leg 4006, a second mounting shelf leg 4008, and a plurality of shelf nuts 4010.

The mounting shelf 4000 is L-shaped, with the first leg 4006 of the L similar in configuration to the bracket base 3806, i.e. including the two component mounting holes 1400 for coupling the shelf to the dry end cap 1212 or other suitable link and the semicircular bracket notch 3802 for clearing the component mounting hole 1400 of the module. The second leg 4008 of the L extends outward generally perpendicular to the first leg 4006 and includes at least three holes for coupling the mounting plate 4002 to the mounting shelf 4000. The mounting plate 4002 is of similar dimension to the rectangular PCB 3900 and includes corner holes for receiving threaded fasteners at locations analogous to the flange holes of the rectangular PCB mounting bracket 3800. The mounting plate 4002 also includes three holes configured to align with the holes in the second leg 4008 of the mounting shelf 4000, and is coupled to the mounting shelf 4000 with the mounting plate fasteners 4004 and shelf nuts 4010. The mounting plate 4002 coupled to the mounting shelf 4000 forms the horizontal support for coupling the rectangular PCBs 3900 and standoffs 3702 to the dry end cap 1212 or other suitable module.

The mounting shelf 4000 and the mounting plate 4002 can be made so that users need only make the flat mounting plate 4002 drilled out with holes to screw it to the mounting shelf 4000 and mounting holes for whatever rectangular PCB 3900 they have. This relieves the user of needing to have sheet metal bending skill and equipment.

Referring next to FIG. 41, a perspective view of rectangular PCBs 3900 coupled to the dry nosecone 2700 using the mounting shelf 4000 and the mounting plate 4002 are shown. Shown are the dry nosecone 2700, the mounting plate 4002, the mounting shelf 4000, the plurality of mounting plate fasteners 4004, the plurality of rectangular PCBs 3900, the plurality of component mounting holes 1400, and the plurality of standoffs 3702.

The mounting shelf 4000 and the mounting plate 4002 are shown coupled together with the mounting plate fasteners 4004 and the mounting shelf 4000 is coupled to the internal portion 1306 of the dry nosecone 2700 using the standard component mounting holes 1400 and accompanying fasteners. As previously described, the alternating rectangular PCBs 3900 and standoffs 3702 are coupled to the mounting plate 4002 using the standoffs 3702.

Figure 42:
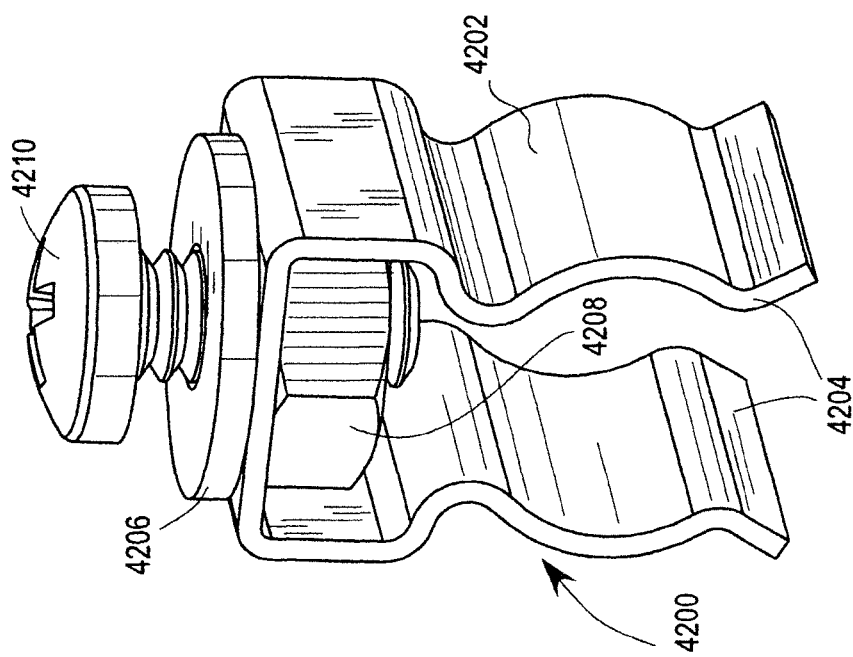
FIG. 42 is a perspective view of a mounting clip in a first embodiment.

Referring next to FIG. 42, the mounting clip 4200 in a first embodiment is shown. Shown are a clip U-shaped portion 4202, two prongs 4204, a washer 4206, a nut 4208, and a clip threaded fastener 4210.

The mounting clip 4200 comprises the generally U-shaped portion 4202 (with the prongs 4204 of the U-shape oriented downward) including two rounded prongs 4204 configured to snap around the support column rail 2906 (or other longitudinal rod member), coupling the mounting clip 4200 to the support column rail 2906. A base of the U-shape is configured to allow for the nut 4208 to fit between the prongs 4204 at the base of the U-shaped portion 4202. The optional insulated washer 4206 is located on the outside face of the base of the U-shaped portion 4202. The base of the U-shaped portion 4202 includes a hole for the clip threaded fastener 4210, which passes through the washer 4206, base of the U-shaped portion 4202 and the nut 4208, thus coupling the clip assembly together. In use, the PCB is coupled to the mounting clip 4200 between the head of the threaded fastener and the washer 4206, thus coupling the PCB to the support column 2900 of the pressure vessel 104, as described further below.

In order to clip the PCB to the support column rails 2906 using the mounting clips 4200, the spacing between the mounting clips 4200 must match the distance between the support column rails 2906.

Figure 43:
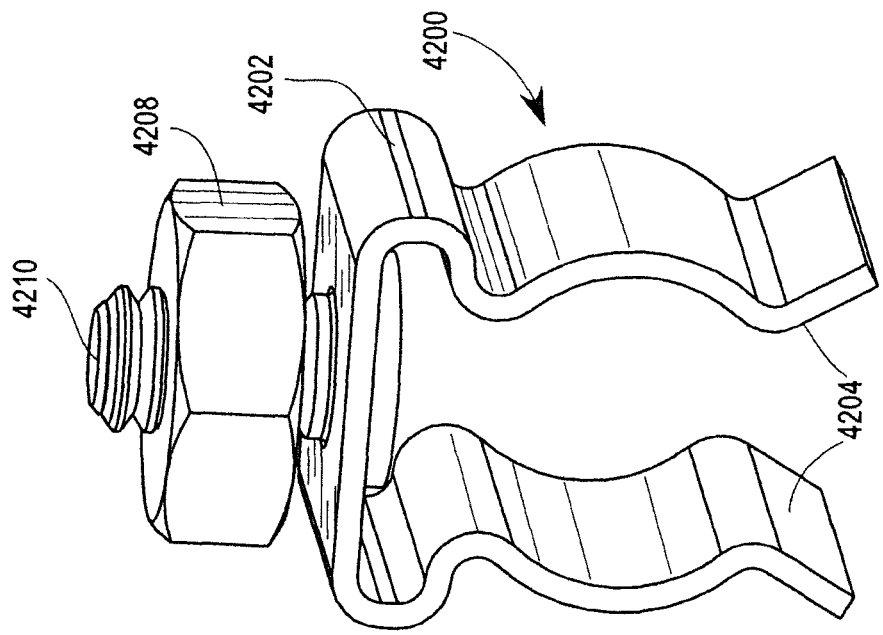
FIG. 43 is a perspective view of the mounting clip in a second embodiment.

Referring next to FIG. 43, a second embodiment of the mounting clip 4200 is shown. Shown are the U-shaped portion 4202, the clip threaded fastener 4210, the nut 4208, and the prongs 4204.

In the embodiment shown in FIG. 43, a head of the clip threaded fastener 4210 is located between the prongs 4204 of the u-shape, with a shaft of the clip threaded fastener 4210 oriented in the upward direction. The nut 4208 is coupled to the clip threaded fastener 4210 above the base of the U-shape. The base of the U-shape is configured to accommodate the head of the clip threaded fastener 4210 between the prongs 4204 instead of the nut 4208 as shown in FIG. 43. The prongs 4204 are shaped similarly the embodiment shown in FIG. 42, being configured to snap onto the support column rail 2906. As with the embodiment shown in FIG. 42, in use the prongs 4204 are snapped onto the support column rail 2906, and the rectangular PCB 3900 is coupled to the mounting clip 4200 using the clip threaded fastener 4210 and the nut 4208. The embodiment shown in FIG. 43 may also include the optional insulated washer 4206.

Referring next to FIG. 44, a generic mounting plate 4400 with mounting clips 4200 is shown. Shown are the generic mounting plate 4400, four mounting clips 4200, and a plurality of PCB mounting holes 4402.

The generic mounting plate 4400 including a grid of PCB mounting holes 4402 may be used instead of coupling the rectangular PCB 3900 directly to the mounting clips 4200 as shown below in FIG. 45. The mounting clips 4200 are coupled to the generic mounting plate 4400 in locations to allow them to couple to the support column rails 2906. The rectangular PCB 3900 is then coupled to the generic mounting board holes using standoffs 3702 and threaded fasteners. The mounting clip 4200 hole spacings of the generic mounting plate 4400 match the component mounting holes 1400 spacings, i.e., 1", 1.414", 1.732", and 2.0", or may be custom hole spacings.

Figure 45:
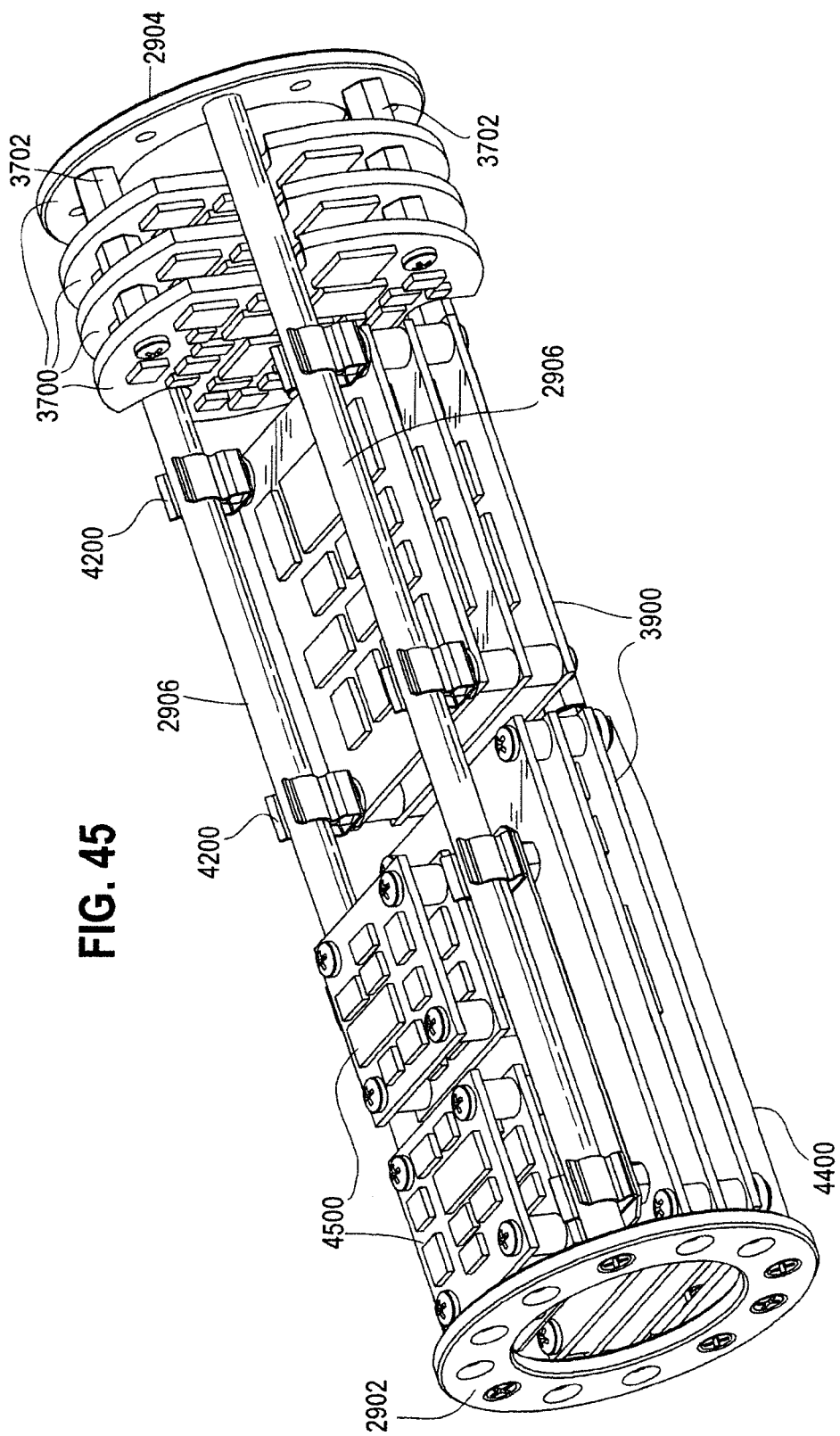
FIG. 45 is a perspective view of an exemplary coupling of rectangular PCBs to the support column using the mounting clips.

Referring next to FIG. 45, an exemplary perspective view of coupling of rectangular PCBs 3900 to the support column using the mounting clips 4200 is shown. Shown are the support column rails 2906, the support column rings, the plurality of rectangular PCBs 3900, the plurality of circular PCBs 3700, the generic mounting plate 4400, the plurality of standoffs 3702, and the plurality of mounting clips 4200.

In one embodiment, one mounting clip 4200 is fastened to each corner of the rectangular PCB 3900 and each mounting clip 4200 is then snapped onto the appropriately spaced support column rail 2906. Multiple rectangular PCBs 3900 may be stacked using standoffs 3702 as previously described, with the suitable fastener length. This embodiment is possible with off-the-shelf rectangular PCBs 3900 if the PCB mounting holes 4402 match one of the standard interior support column rail 2906 spacings of 1.0", 1.414", 1.732", or 2.0", or may be custom hole spacings.

In another embodiment, the generic mounting plate 4400 is coupled to the support column rails 2906 using the mounting clips 4200, and a plurality of square PCBs 4500 are coupled to the generic mounting plate 4400 using the threaded fasteners and standoffs 3702.

The exemplary view shown in FIG. 45 also includes rectangular PCBs 3900 coupled to the mounting bracket 3800, which is in turn coupled to the support column ring. Also shown are the plurality of circular PCBs 3700 directly coupled to the opposite support column ring using standoffs 3702, as previously described. The PCBs include notches as required to accommodate the support column rails 2906.

Electrical Distribution System

Unlike land-based WiFi, networking of electronic components in underwater robotic vehicles is handled almost exclusively by using copper wire (or fiber) as transmission medium. Almost all such networks use standard off-the-shelf components and data communications protocols commonly used on land: UTP Ethernet, RS-232, RS-422 or RS-485 serial, USB, SPI, I2C, or similar protocols that exist at the Data Link and higher layers. These in turn use the standard star, bus, or (occasionally) ring ISO/OSI Physical Layer network cabling topologies in common use. A means of implementing those physical layer wiring schemes between separate pressure vessels 104 is important to maintaining the modularity and usefulness that those proven ISO/OSI protocols offer. In the URVDS, the cable manifold system is used to provide connections between pressure vessels 104 that are adaptable to accommodate varied electrical and communication components, major topologies, power systems, and data communication protocols.

Figure 46:
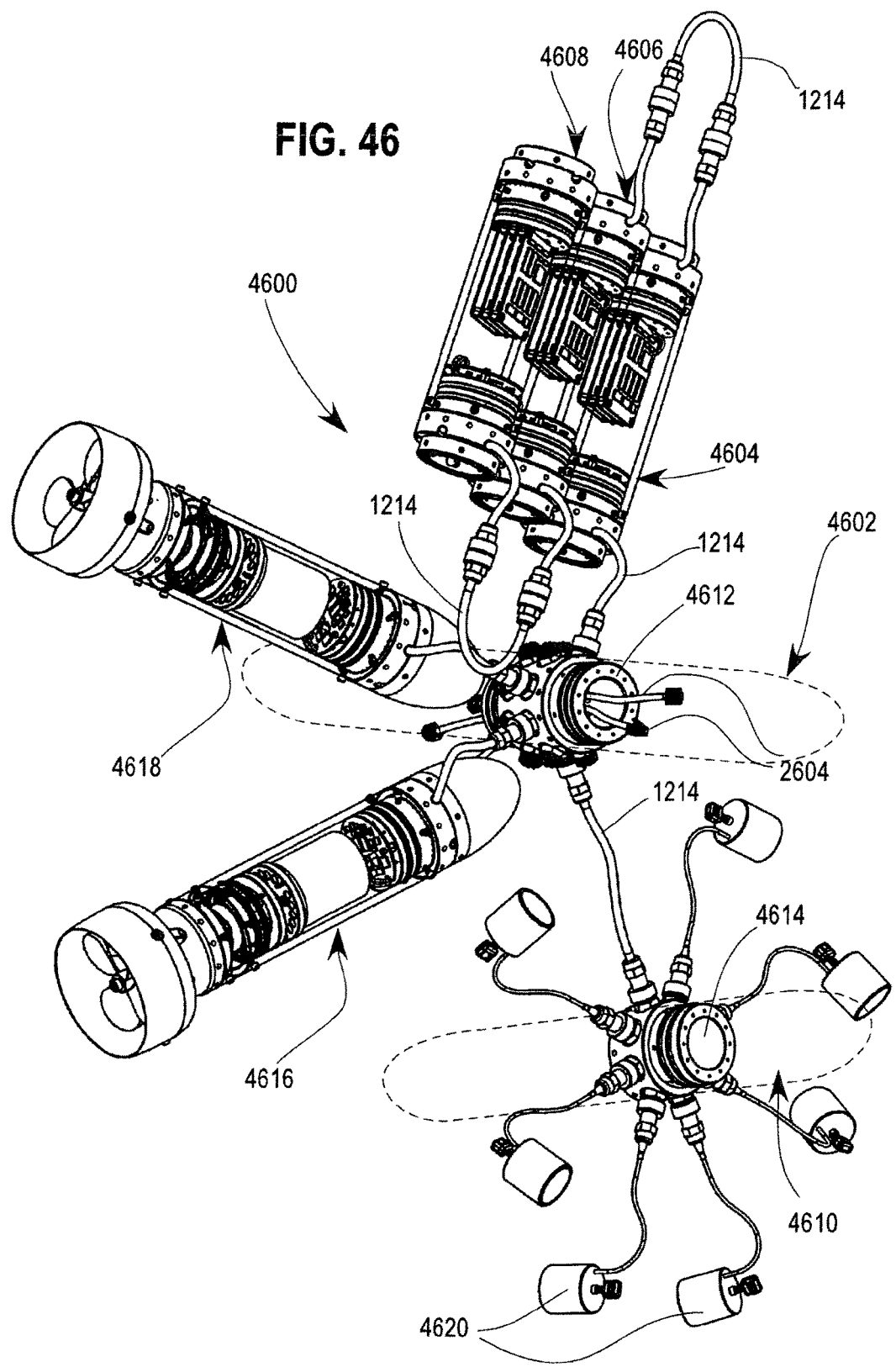
FIG. 46 is a perspective view of an exemplary pressure vessel system in accordance to one embodiment of the invention.

Referring next to FIG. 46, an exemplary pressure vessel system 4600 is shown. Shown are a portion of a main computer pressure vessel 4602, a pressure vessel 0 4604, a pressure vessel 1 4606, a pressure vessel 2 4608, a sonar transducer pressure vessel 4610, a cable manifold link 1 4612, a cable manifold link 2 4614, a thruster pressure vessel 0 4616, a thruster pressure vessel 1 4618, a plurality of electrical cables, a plurality of interior cables, and a plurality of sonar transducers 4620.

For clarity, the pressure vessel and other elements are shown independent of the chassis 102 and are not meant to represent an operable pressure vessel orientation. Additionally, only the cable manifold portion of the main computer pressure vessel 4602 and the sonar controller pressure vessel are shown for clarity, omitting the tube 1100, end cap 3400, PCBs 3700 3900 4500 and other elements that are necessary for operation of the URV 100.

In the exemplary pressure vessel system 4600 shown, the main computer pressure vessel 4602 includes a main computer system for controlling the URV 100. The main computer system is electrically coupled to peripheral systems (such as a sonar controller system) through the cable manifold link 1 4612 of the main computer pressure vessel 4602. The plurality of cables 1214 coupled to the cable manifold link 1 4612 couple the main computer system to the thruster pressure vessel 0 4616, the thruster pressure vessel 1 4618, the cable manifold link 2 4614, and the pressure vessel 0 4604. Additional cables 1214 couple pressure vessel 1 4606 and pressure vessel 2 4608 to pressure vessel 0 4604 in series. Ports on the cable manifold link 2 4614 couple the sonar transducers 4620 to the plurality of cable manifold 2 ports, with external cables 1214 interposed between the sonar transducers 4620 and the cable manifold 2 ports.

As previously described, the pressure vessel can accommodate waterproof outlets for electrical and/or communication cables 1214 at each end cap, and may also include the cable manifold link 1210 or end cap, where multiple electrical/communication/power connection ports are arrayed around the module. As shown in FIG. 46, the main computer pressure vessel 4602 includes the cable manifold link 1 4612, which connects to four separate pressure vessel via cables 1214 coupled to the connection ports: pressure vessel 0 4604, thruster pressure vessel 0 4616, thruster pressure vessel 1 4618, and the sonar transducer pressure vessel 4610. The interior cables 2604 are coupled to the connection ports on an interior side of the main computer pressure vessel 4602, and are coupled to electrical, power and communication components as required (not shown).

The Sonar transducer pressure vessel 4610 also includes the cable manifold link 1210, which receives the cable 1214 from the main computer pressure vessel 4602. The sonar transducer pressure 4610 vessel also uses the connection ports 2300 to provide necessary connections for the plurality of sonar transducers 4620.

The pressure vessel 0 4604 is coupled in series to the pressure vessel 1 4606, which is turn is coupled to the pressure vessel 2 4608, via cables 1214 exiting at the end caps of the pressure vessel. In addition to star topologies implemented with the cable manifold, bus or ring topologies are easily implemented between pressure vessels 104 using two end caps 3400 with cable glands and connectors to daisy-chain multiple pressure vessels 104 for implementing bussed networks such as I2C, or RS-422.

Cable manifold links 1210 and cable manifold dry end caps 1208 are preferably used for implementing star wiring when a large number of electrical connections need to fan out from the single pressure vessel 104 to several pressure vessels 104. As previously described, the cable manifold module 1210 1208 incorporates two o-ring seals 1106 to connect two pressure vessels 104 together and an opening which allows direct electrical wiring between pressure vessel 104 sections. It also has the twelve link strut mounting holes 1302 for receiving link struts 500 used to mount the pressure vessel 104 to the chassis 102. But it also includes four, eight, or sixteen threaded port holes 2400 for commercially available waterproof electrical connectors. One pressure vessel 104 can thus have up to 16 easily maintained electrical cables 1214 passing from it to other vessels 104 which can be disconnected at will.

The port inserts 2302 are not function specific. They simply attach the internal cable's 2604 wires, pin for pin, to the external electrical connection and the mating port insert 2302 connector. Thus the ports 2300 can be wired independently, all having the same wiring pinout or having different pinouts. For example, the main computer pressure vessel 4602 could terminate with the cable manifold link 1 4612 and have one cable 1214 wired for UTP Ethernet to pass commands and data to the user's computer at the surface, six cables wired for USB, I2C, SPI, or analog signals going to various sensors 4800 in other pressure vessels 104 and six cables wired for RS-232 extending to motor controllers in each of six thrusters.

If additional connections are required, more cable manifolds 1210 1208 are easily added, or a custom manifold with the required number of ports 2300 is easily built.

The cable manifold 1208 1210 is manufactured with the threaded holes 2400 and O-ring mating surfaces machined to fit the particular brand of commercially available underwater port insert 2302, such as those produced by Ikelite, Fischer, SeaCon, Impulse, or watertight cable glands from HexSeal and other companies. Custom cable manifolds can be made that handle more than one company's port inserts 2302, e.g., four Fischer port inserts 2302 with M1x12 metric threads, and eight Ikelite port inserts 2302 with ½"-20 UNRF threads, etc. This is useful when existing equipment with different port inserts 2302 have to be mated to the single pressure vessel 104.

The electrical, communication and power systems may be controlled by any system desired by the user, as the URVDS accommodates a variety of options for mounting various circuit boards and as shown, accommodates a large variety of electrical/power/communication connections between components. Control systems may be centralized, as shown in FIG. 47, with high-level system control residing in the controller in the main computer pressure vessel 4602, or system control may be decentralized, with control residing in various auxiliary pressure vessels 2602.

One implementation can support in-situ programming access to every microcontroller in the URV 100 via a multiplexed UART and multiplexed SPI bus, so low level controllers can be reprogrammed and improved without removing them from the URV system. It is important in the URVDS to avoid unnecessarily taking the URV 100 apart or breaking the integrity of URV watertight seals. Typical land-based practices for reprogramming microcontrollers in a distributed control architecture is to open the URV 100 up, connect a programming component to programming port on the microcontroller in question, reprogram it, then re-seal the robot. In an underwater system, sealing the URV 100 is a painstaking process and each time the URV 100 is opened is an opportunity for a sealing error leading to the pressure vessel 104 flooded with seawater and a catastrophic failure requiring replacement of all the exposed electronics. But in any development system, re-programming is a frequent task, one to be encouraged if the system is to be improved. The URVDS fully supports in-situ programming access to every computer and microcontroller in the system without opening up the URV 100.

Figure 47:
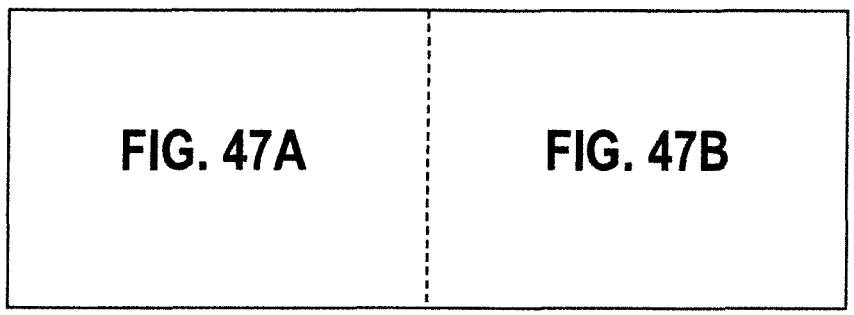
FIG. 47 is a schematic diagram of an exemplary electrical and communication system for the URVDS.
Figure 47B:
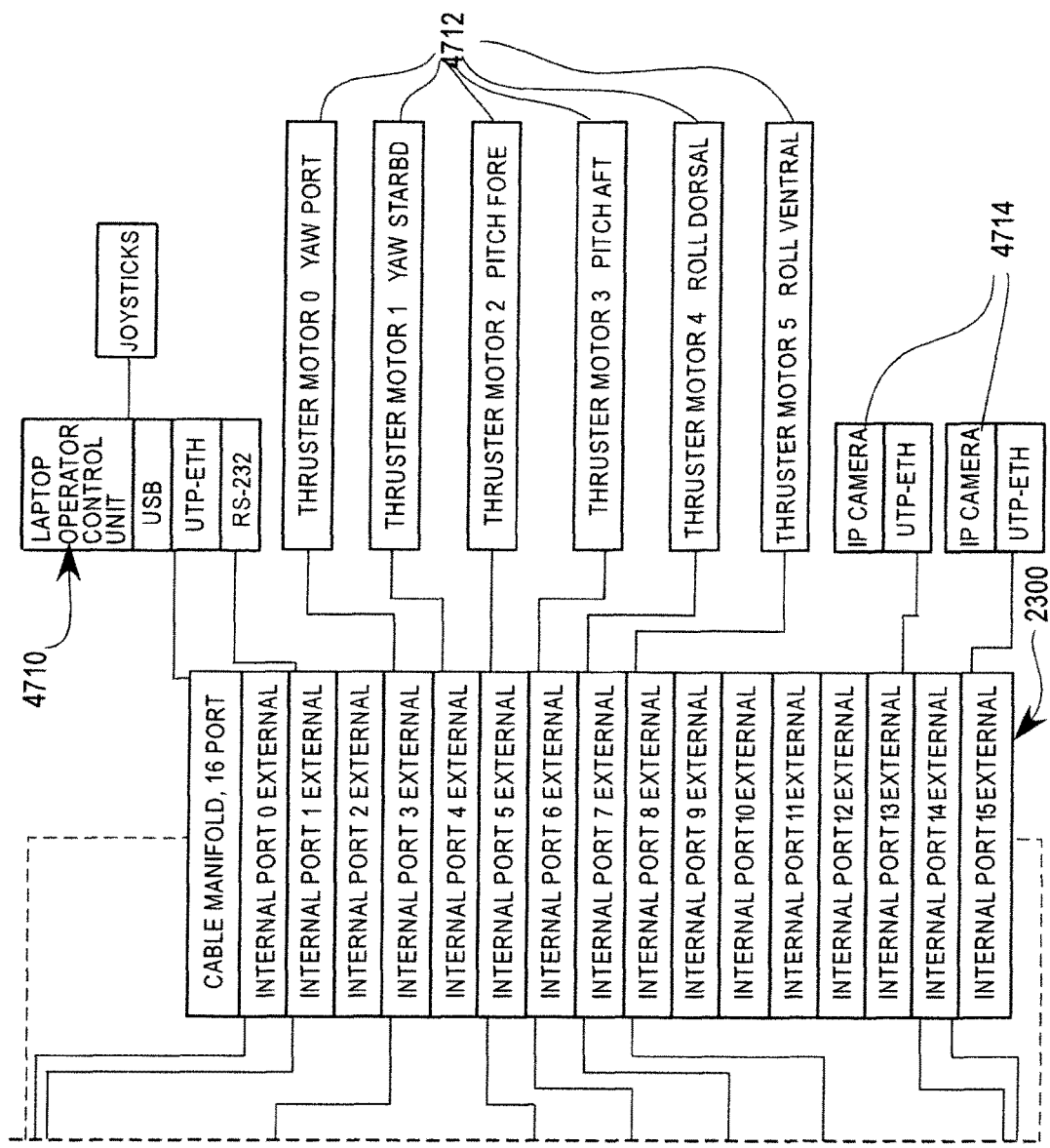

Referring next to FIG. 47, an exemplary centralized electrical control system is shown. Shown the main computer pressure vessel 4602 including the plurality of ports 2300, a main controller system 4702, a UTP-ethernet system 4704, a motor controller system 4706, a battery system 4708, a user control system 4710, a plurality of thruster motors 4712, two cameras 4714, an interface system 4716, a voltage regulator system 4718, and a plurality of motor amplifiers 4020.

In the centralized control system, the main computer pressure vessel 4602 includes the computer, electrical, power and communication systems required to operate components and/or modules external to the main computer pressure vessel 4602, for example the motors in thruster pressure vessel 0 4616 and thruster pressure vessel 1 4618 shown in FIG. 46.

The main computer vessel includes the main controller system 4702, the UTP-ethernet system 4704, the motor controller system 4706, the battery system 4708, the interface system 4716, and the voltage regulator system 4710. The main controller system 4702, the motor controller system 4706, the interface system 4716 and the UTP-ethernet system are communicatively and/or electrically coupled to the plurality of ports 2300 included in the main computer pressure vessel 4602.

The user control system 4710, the thruster motors 4712, and the cameras 4714 are located outside of the main computer pressure vessel. These external components 4710 4712 4714 are electrically and/or communicatively coupled to the systems in the main computer pressure vessel 4602 through the ports 2300.

The main controller system, in conjunction with the UTP-Ethernet system, is coupled to and in communication with the internal interface system 4716, the user control system 4710, and the cameras 4714. The interface system 4716 communicates with and controls the motor controller system 4706. The motor controller system 4706 then communicates with and controls the external thruster motors 4712.

Referring again to FIG. 47, a 6-DOF URV system centralizes high-level control in an on-board embedded controller system. The centralized controller system scheme distributes low level control of sensors and actuators (motor control, etc.) among subordinate controller systems, each dedicated to a particular control task for modularity and ease of development. An on-board Ethernet switch provides UTP-Ethernet access from the user control system 4710 to all Linux computers, and a serial port mux scheme provides UART access to the main controller system 4702 and all subordinate control systems. This scheme allows a large degree of software transparency: full access to every controller system and for in situ programming and diagnostics through either Ethernet, UART, or a controller system's SPI bus.

One example of a main controller system 4702 includes six microcontrollers, one for each of six thrusters needed for a true 6-DOF URV. Each one supplies PWM pulses to the motor controller system 4706 including 6 motor amplifiers 4020 to control the thruster motors 4712.

The interface system 4716 is the interface between the main controller system 4702 and the motor controller system 4706. A Gumstix Controller plugs into this board, and its communication ports and general purpose I/O lines are buffered and routed to the appropriate motor control lines (SPI port and UART, and mux control lines) on the motor controller system 4706.

Another important feature of the interface system 4716 is a serial switch which is the key to easy management of control over controller systems throughout the entire network of current and future devices.

Referring next to FIG. 48, the cable manifold with directly connecting sensors 4800 is shown. Shown are the cable manifold link 1210, the tube 1100, the plurality of sensors 4800, a plurality of cable manifold ports, and a plurality of sensor housings 4802.

In lieu of the cable-connection system shown in FIG. 46 for coupling sensors 4800 to the URV 100, the cable manifold port 2300 may be used to directly mount sensors 4800 or other peripherals. The sensor 4800 may be fitted to and electrically coupled to the sensor housing 4802 that has been configured to plug into and couple with the cable manifold port. This allows easy mounting and easy access to their wiring through a pressure vessel wall 2800. It will be appreciated that other types of links may be fitted with and configured to receive the sensors 4800 or peripherals. In the embodiment shown, the electrical connectors are Ikelite connectors. The mating peripheral housing 4802 is configured to electrically couple with the electrical connector of the cable manifold link 1210. As an example, the housing 4802 shown in FIG. 49 includes a pocket for the pressure sensor 4800 (Measurement Specialties Corp. part number 86-015G-C). The sensor housing 4802 can be fabricated with the same interface as a standard connector such as the Ikelite connector, allowing it to be mounted to the cable manifold port 2300. The sensor 4800 may be secured to the sensor housing 4802 by inserting a c-ring 5002 into a groove in the top of the housing 4802 after the sensor 4800 is placed in the sensor housing 4802 (similarly to the dry end cap 1212 implementation shown in FIG. 49).

Referring next to FIG. 49, a sensor cable port 4900 installed in the dry end cap 1212 is shown. Shown are the dry end cap 1212, the sensor cable port 4900, the sensor housing 4802, and the sensor 4800.

In yet another embodiment, the tubular portion of the dry end cap 1212 may include the sensor cable port 4900 installed in a base of the tubular portion. The sensor cable port 4900 is configured to interface with the sensor 4800 similarly to the cable manifold ports 2300. The sensor housing 4802 is then coupled to the sensor cable port 4900 in the dry end cap 1212. In this configuration, the wet nosecone 3200 may also be coupled to the dry end cap 1212, enclosing the sensor 4800, to allow for exposure of the sensor 4800 to ambient water but still protect the sensor 4800 from impact.

Referring next to FIG. 50, an exploded view of the dry end cap 1212 including an end cap hole 5000 in one embodiment of the invention is shown. Shown are the dry end cap 1212, the sensor 4800, the tube 1100, and the end cap hole 5000.

The internal portion 1306 of the dry end cap 1212 distal to the tube 1100 may include the end cap hole 5000 configured to receive the sensor 4800 and c-ring 5002 without use of the sensor housing 4802 as shown in FIGS. 48 and 49. In the embodiment shown in FIG. 50, the dry end cap 1212 is configured with the end cap hole 5000 to receive a Measurement Specialties 86-015G-C Pressure Sensor and the sensor 4800 also includes a groove configured to receive the retaining C-clip. If required, signal conditioning circuitry can be mounted on the dry end cap 1212 (as discussed above) and the end cap 1212 becomes a dedicated sensor module.

Referring next to FIG. 51, a power management system 5100 coupled to the dry end cap 1212 is shown in one embodiment of the present invention. Shown are the dry end cap 1212, a power management circuit board 5102, the power management system 5100, a fuse 5104, a DPDT relay 5106, a reed switch 5108, an external power connector 5200, a system power bus connector 5112, and a battery connector 5114.

The power management system 5100 comprises the power management circuit board 5102 including the magnetically operated reed switch 5108, the fuse 5104, the DPDT electromechanical relay, and the connectors 5112 5200 to form the system to perform common power related functions. The power management system 5100 is also coupled to an internal battery 5208 (not shown, in one embodiment the battery 5208 may be 2-4 nickel metal hydride 7.2V battery packs in series for 28.8V) via the battery connector 5114. The power management circuit board 5102 is coupled to the dry end cap 1212 using the standard connection configuration. A longitudinal axis of the reed switch 5108 is oriented parallel to the longitudinal axis of the pressure vessel 104.

The power related functions performed by the power management system 5100 may include an On-Off Switch function, connecting the on-board battery 5208 to a power bus of the URV 100 when power is switched on, charging the battery 5208 from an external power source, or powering the URV 100 while simultaneously charging the battery 5208. The operation of the reed switch 5108 is described further below in FIGS. 53-55.

When switched on, the on-board battery 5208 is connected to the power bus of the URV 100. When switched off, the battery 5208 is connected to pin 1 of the three-pin connector for charging and the URV power bus is connected to pin 2 of the three-pin connector for attachment to a separate external power source such as a lab power supply to allow current limited testing.

Figure 52:
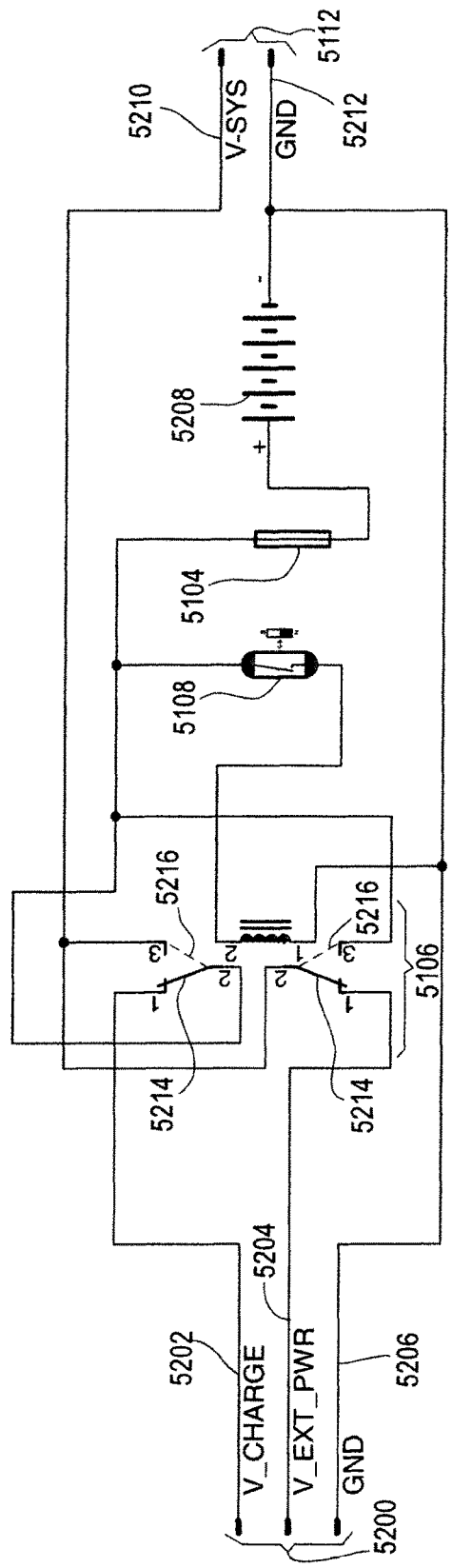
FIG. 52 is a schematic electrical circuit diagram for the power management system.

Referring next to FIG. 52, a schematic diagram for the power management system 5100 as shown in FIG. 51 is shown. Shown are the external power connector 5200, a v_charge pin connection 5202, v_ext_power pin connection 5204, a first ground pin connection 5206, the DPDT relay 5106, the reed switch 5108, the fuse 5104, the battery 5208, the system power bus connector 5112, a v_sys pin connection 5210 and a second ground pin connection 5212, a DPDT switch off position 5214, and a DPDT switch on position 5216.

The exemplary power management system 5100 manages On/OFF switching and the interface to on-board batteries. When the reed switch 5108 is unactivated, the DPDT relay 5106 is in the off position 5214. When no external power is connected, this results in the v_ext_power pin connection 5204 being connected to the v_sys pin connection 5210. The v_ext_power pin connection 5204 is the connection to an external power source, and the v_sys pin connection 5210 supplies power to the URV 100. Since there is no external power, no power is transferred to the system and the URV 100 is off.

When an external power source is connected to the circuit via both the v_charge and the v_ext_power pins 5202 5204, but the reed switch 5108 remains unactivated, the DPDT relay 5106 remains in the same off position 5214. The circuit then connects v_charge 5202 to the battery 5208, charging the battery 5208, and connects v_ext_power 5204 to v_sys 5210, powering the URV 100 while the battery 5208 is being charged.

When the reed switch 5108 is activated, it activates a magnetic coil proximate to the DPDT relay 5106, throwing both DPDT switches to the on position 5216. As a result, v_charge 5202 and v_ext_power 5204 are disconnected from the circuit, and the battery 5208 is connected to v_sys 5210, thus powering the system from the battery 5208 and disconnecting from the external power source.

In operation, the power management system 5100 utilizes the reed switch 5108 triggered by a switch magnet 5302 housed in the magnetic switch sleeve 5300 on the outside of the pressure vessel 104 without using conventional switches which penetrate the pressure vessel 104. The magnetic sleeve 5300 and activation of the reed switch 5108 is described below in FIGS. 53-55.

Figure 55:
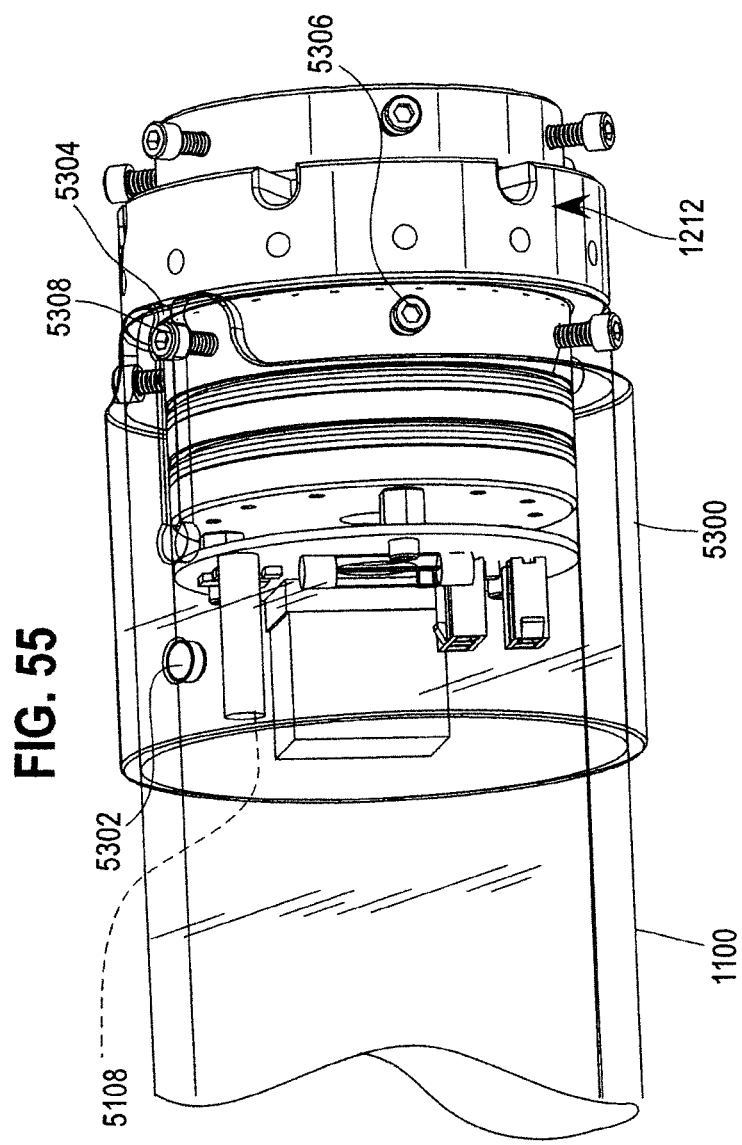
FIG. 55 is a perspective view of the pressure vessel including the magnetic switch sleeve in a third location.

Referring next to FIGS. 53-55, the magnetic switch sleeve 5300 for the power management system 5100 is shown in one embodiment of the present invention. Shown are the switch magnet 5302, a screw notch 5304, the reed switch 5108, the dry end cap 1212, a first tube mounting screw 5306, a second tube mounting screw 5308, and the tube 1100.

The power management circuit board 5102 is shown coupled to the dry end cap 1212 and the tube 1100 is coupled to the dry end cap 1212 using tube mounting screws 1108 as previously described. In this embodiment, tube mounting screw 1108 heads protrude past the perimeter of the tube 1100. The power management system 5100 includes the magnetically operated reed switch 5108, located proximate to a side of the tube 1100. The magnetic switch sleeve 5300 comprises a plastic cylinder configured to slidably fit around the tube 1100. The magnetic switch sleeve 5300 includes the screw notch 5304 in the longitudinal direction of the magnetic switch sleeve 5300 which extends from the end of the magnetic switch sleeve 5300 proximate to the power management system 5100 to a location near the midpoint of a magnetic switch sleeve length. The screw notch 5304 includes a round portion near the end of the magnetic switch sleeve 5300 proximate to the power management system 5100, the screw notch 5304 being configured to snap-fit onto one tube mounting screw 1108 head, thus coupling the magnetic switch sleeve 5300 to the dry end cap 1212. The screw notch 5304 may terminate in another rounded portion to alleviate stress in the plastic.

The magnetic switch sleeve 5300 also includes the switch magnet 5302 embedded in the magnetic switch sleeve 5300 in the location such that the switch magnet 5302 may align with the reed switch 5108 below when the sleeve is snapped to one of the tube mounting screws 1108. The switch magnet 5302 may be a rare earth magnet or any other type of magnet capable of triggering the reed switch 5108. In FIG. 53, the magnetic switch sleeve 5300 is shown slid onto the tube 1100 but not yet snapped onto one of the tube mounting screws 1108.

In the position shown in FIG. 54, the magnetic switch sleeve 5300 has been slid upward towards the dry end cap 1212 and snapped to and thereby coupled to the first tube mounting screw 5306. The position of the first tube mounting screw 5306 is such that the reed switch 5108 is not directly below the switch magnet 5302 when the magnetic switch sleeve 5300 is snapped to the first tube mounting screw 5306. The reed switch 5108 thereby remains open and in the off configuration.

As shown in FIG. 55, the magnetic switch sleeve 5300 has been snapped to and coupled to the second tube mounting screw 5308. In that position, the switch magnet 5302 is aligned with and above the reed switch 5108, closing the reed switch 5108 to the on configuration.

Since the placement of the circuit board mounting holes on the dry end cap 1212 are specified per the standard connection configuration (as previously described in the pressure vessel section) as always aligned with the tube mounting holes 1300, it is possible to design circuit boards whose components align with other mechanical features, such as the reed switch 5108.

Figure 56:
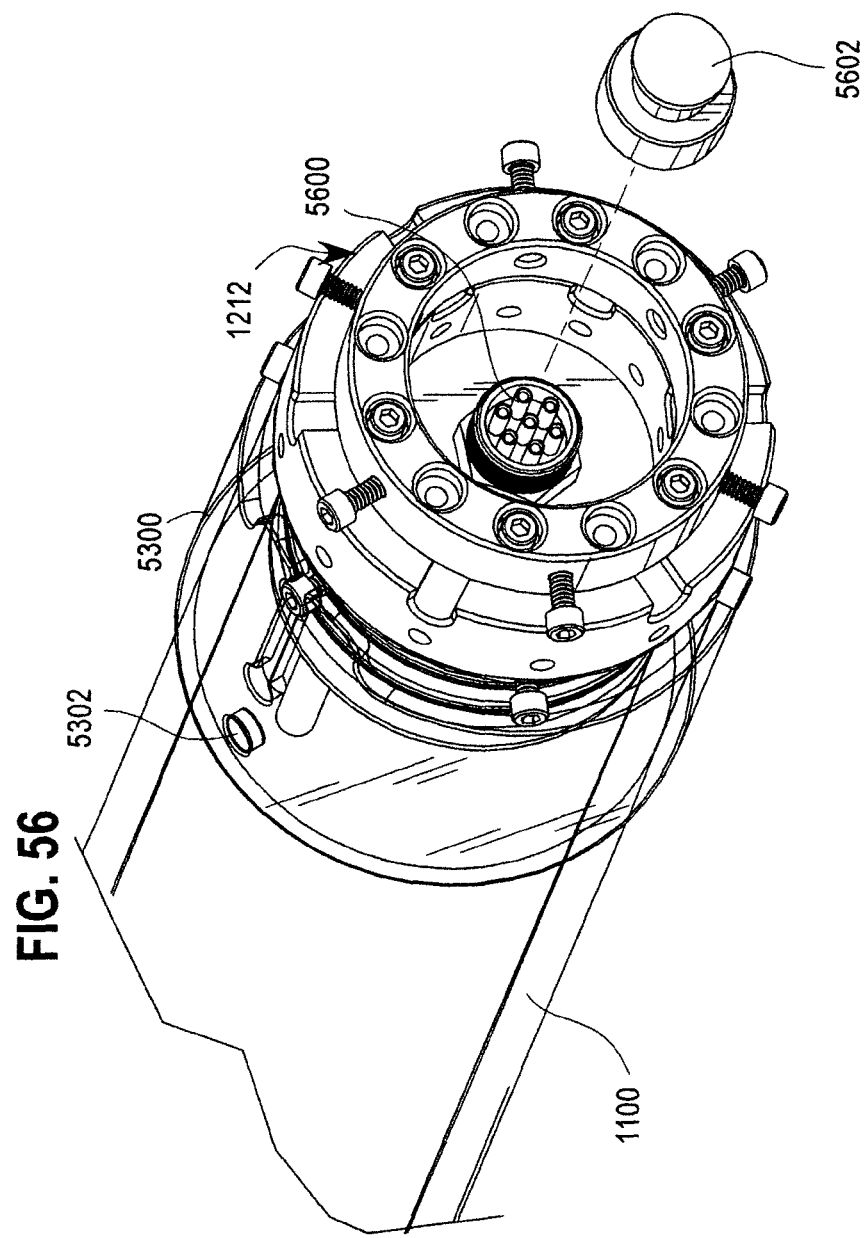
FIG. 56 is a perspective view of the pressure vessel including an external power and charging port.

Referring next to FIG. 56, the dry end cap 1212 including an external power and charging port 5600 is shown. Shown are the dry end cap 1212, the tube 1100, the magnetic switch sleeve 5300, the switch magnet 5302, the external power and charging port 5600 and a water-tight cap 5602.

The external power and charging port 5600 is mounted to the exterior base of the tubular portion of the dry end cap 1212 or other compatible link end. The external power and charging port 5600 is electrically coupled to the external power connector 5200 of the power management system 5100. The external power and charging port 5600 is configured to externally couple to a charging cable for charging the internal battery 5208 and/or operation from an external test bench supply. When the charging port is not in use, the water-tight cap 5602 including at least one o-ring seal 1106 is coupled to and seals the charging port against water intrusion.

Propulsion System

Figure 57:
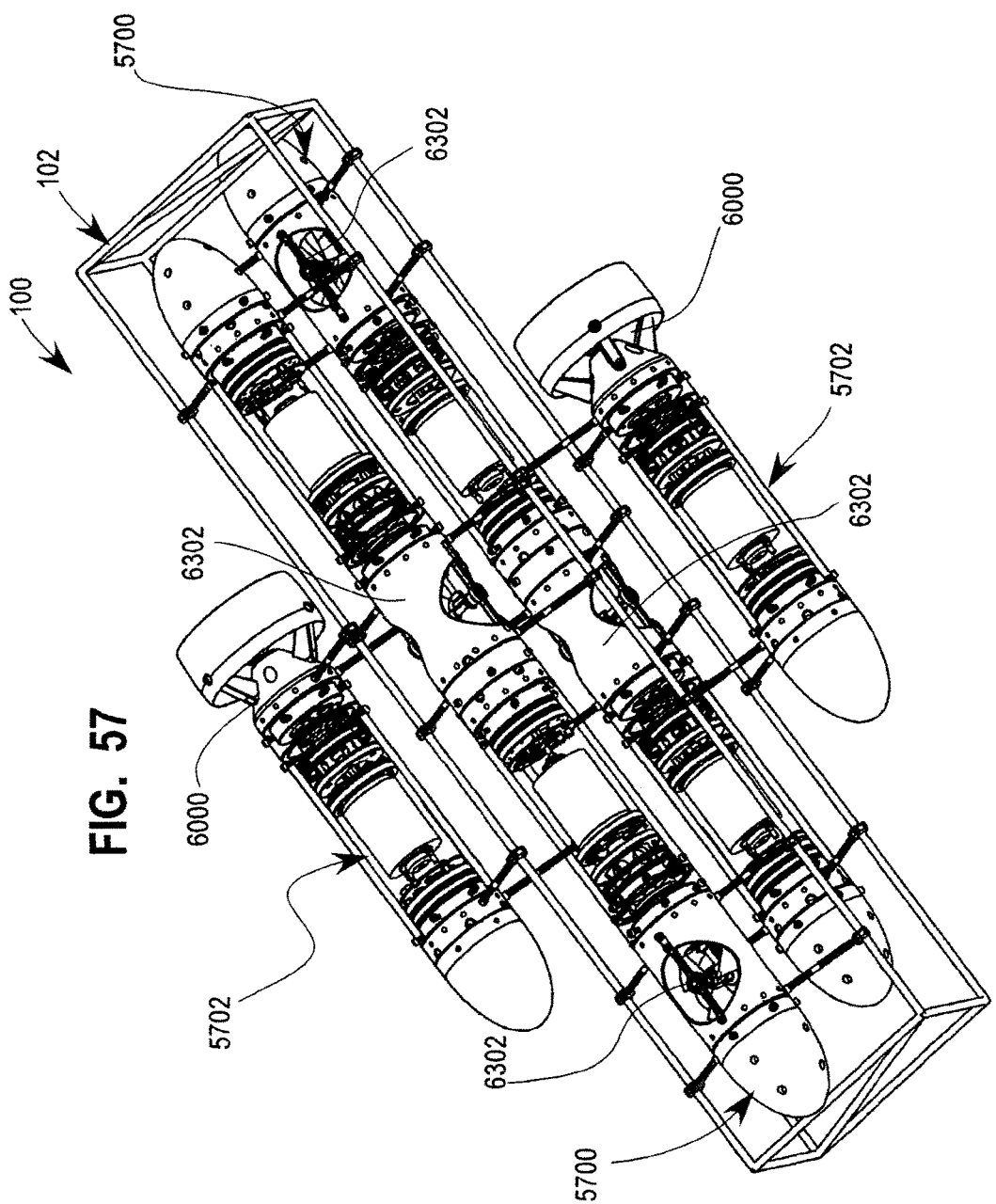
FIG. 57 is a perspective view of an exemplary URV including a six degree-of-freedom propulsion system.

Referring next to FIG. 57, an exemplary URV 100 with a six degree-of-freedom (DOF) propulsion system is shown. Shown are the chassis 102, two auxiliary thruster pressure vessels 5702, two central thruster pressure vessels 5700, a plurality of inline propeller modules 6000, and a plurality of lateral propeller modules 6302.

The URVDS propulsion system provides modules which can be used to build at least three types of thruster pressure vessels 106: an inline thruster pressure vessel 6100, a lateral thruster pressure vessel 6300, and an inline rudder thruster pressure vessel 6500 which provide, respectively, axial thrust (relative to the longitudinal or y-direction of the URV 100), lateral thrust, or axial thrust with pitch, yaw and limited roll steering. As with all other end caps in the URVDS, pressure vessels 104 including propulsion modules may be coupled to the chassis 102 using the link strut system previously discussed.

The exemplary propulsion system shown in FIG. 57 includes two central thruster pressure vessels 5700 each central thruster pressure vessel 5700 including two lateral propeller modules 6302 configured to provide thrust and/or rotation in a direction in the x-z plane, i.e. orthogonal to the longitudinal axis of the pressure vessel. Two auxiliary thruster pressure vessels 5702 each include the inline propeller module 6000 for providing thrust in the y-direction, i.e. in the direction of the longitudinal axis of the pressure vessel. The inline rudder thruster pressure vessel 6500 (not shown) may additionally include a rudder system as described further below.

Referring again to FIG. 57, the inline and lateral propeller modules 6000 6302 are typically used in orthogonal pairs to provide up to six degrees of freedom for high three-axis maneuverability for applications like precise station keeping or obstacle avoidance in chaotic water conditions such as surge and surf. This capability is useful for both human controlled tele-operated systems or for URVs 100 under autonomous control.

The URVDS demonstrates the ability to integrate into URV 100 thruster systems built from opportunistically obtained DC motors 5800. This allows the user to tailor the thruster system's speed and torque to the demands of the mission, and also allows the user to effect field repair of the propeller module 6000 6302 by replacing the motor 5800 with one that is similar but not an exact replacement. This makes field repairs in places far away from well stocked supply depots easier.

Figure 58:
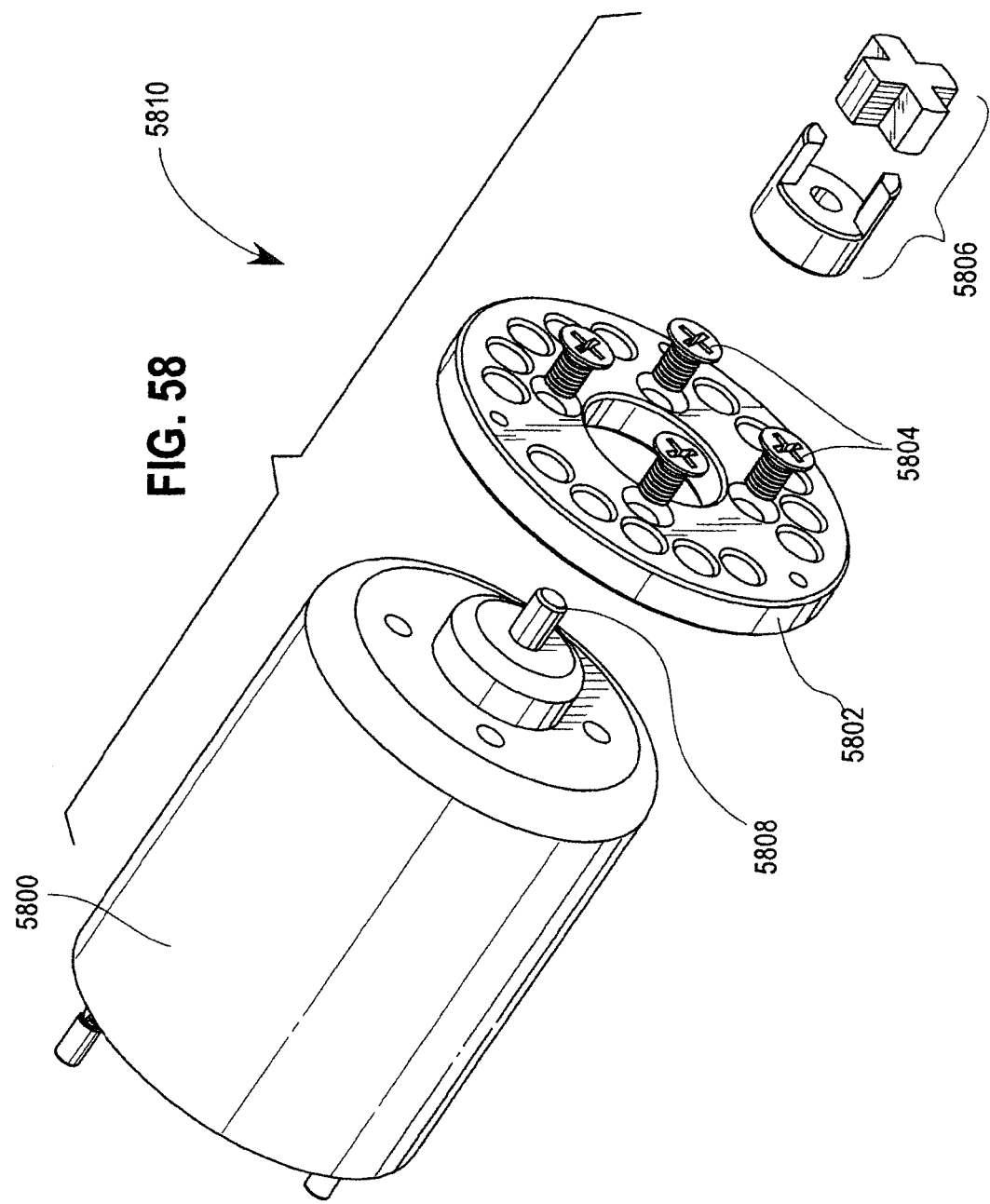
FIG. 58 is an exploded perspective view of an exemplary thruster motor and coupling.

Referring next to FIG. 58, an exemplary motor assembly 5810 is shown in exploded view. Shown are the motor 5800, a bulkhead disk 5802, a plurality of bulkhead screws 5804, a motor shaft 5808, and a motor coupling 5806.

The generally cylindrical motor 5800 is coupled to the bulkhead disk 5802 using the plurality of bulkhead screws 5804 such that the axis of the motor 5800 and a center of the bulkhead disk 5802 align, centering the motor 5800 in the housing such that the motor shaft 5808 can engage a magnetic clutch (as described further below). DC motors 5800, brushed or brushless (with appropriate controllers), can be fitted to the bulkhead disk 5802 and motor coupling 5806 to standardize the interface to the magnetic clutch. The bulkhead disk 5802 is configured to couple to the motor 5800 and a magnetic clutch end cap 5900. The motor coupling 5806 may be a standard ½" or ⅝" Lovejoy coupling for use with the exemplary magnetic clutch, or any other suitable type of motor coupling 5806, for example a Oldham coupling.

Motors 5800 of varying dimensions may be coupled to the magnetic clutch end cap 5900 by varying the configuration of the bulkhead disk 5802. This makes motors 5800 with a much larger range of sizes, voltages and performance specs (often from the surplus market at very low cost) available to users to tailor their thrusters to their mission requirements.

Figure 59:
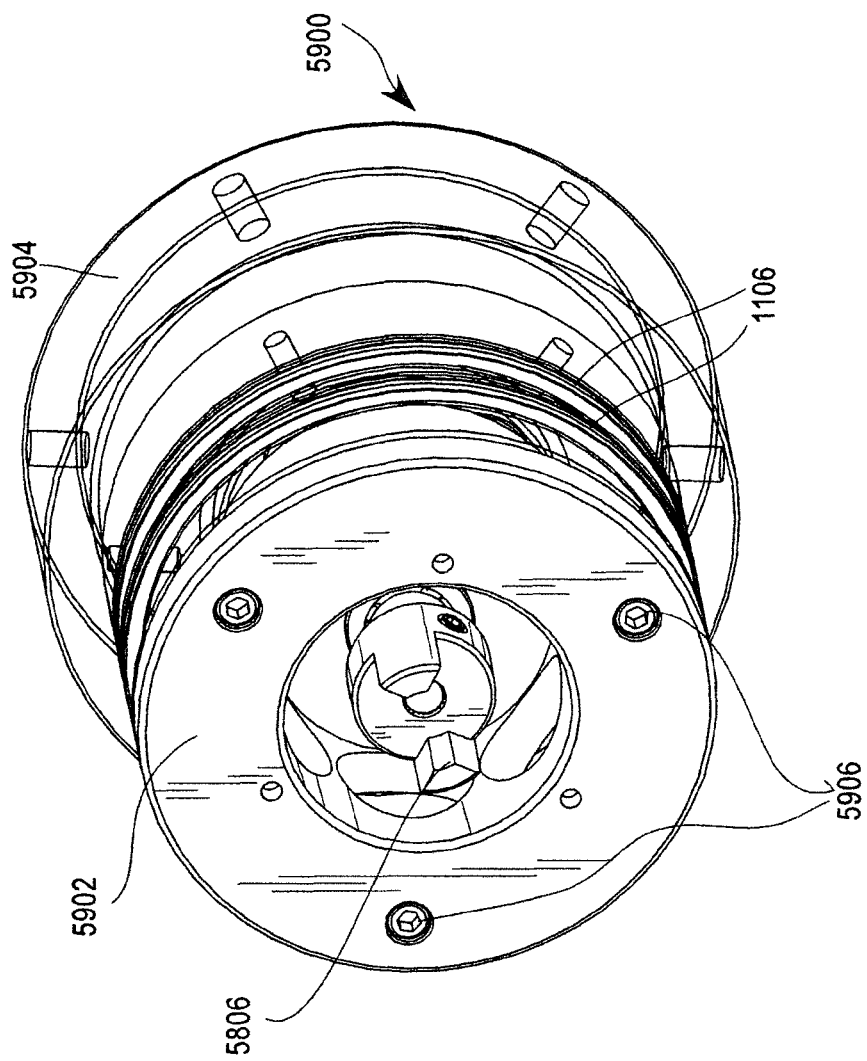
FIG. 59 is a perspective view of a magnetic clutch end cap.

Referring next to FIG. 59, the magnetic clutch end cap 5900 is shown in one embodiment of the invention. The magnetic clutch end cap 5900 is shown looking towards the end of the pressure vessel. Shown are a clutch housing 5902, a clutch end cap housing 5904, two o-rings, a plurality of housing screws 5906, and the motor coupling 5806.

At the proximate end of the magnetic clutch end cap 5900 (i.e. the end located inside the tube 1100) the Motor coupling 5806 is coupled to the motor coupling 5806 portion shown previously in FIG. 58, rotationally coupling the motor shaft 5808 with a clutch shaft, which will be described further in FIG. 60. The clutch housing 5902 is coupled to the bulkhead disk 5802 using suitable fasteners. The distal end of the magnetic end cap is coupled to the propeller module, as described further below.

Figure 60:
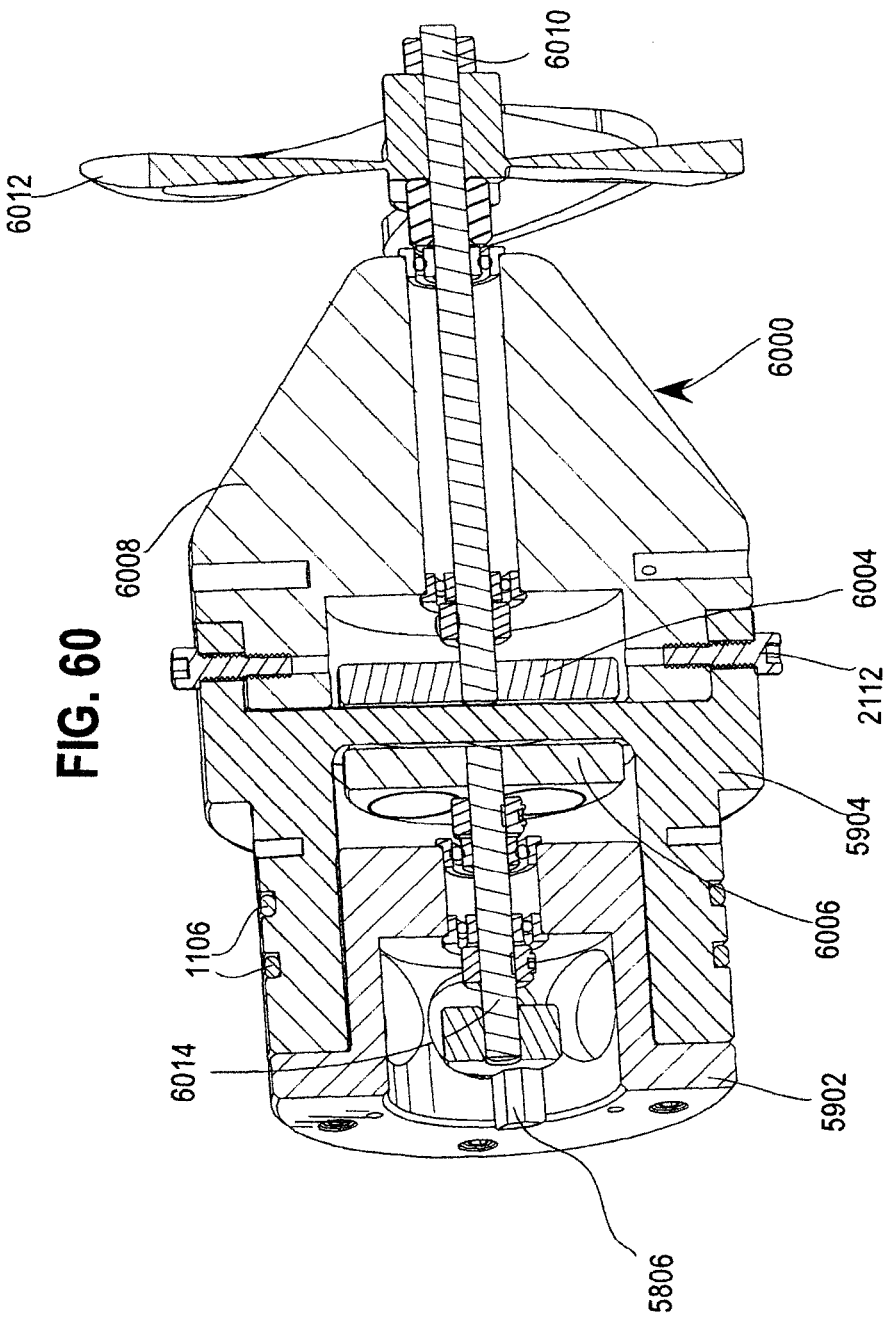
FIG. 60 is a cross-sectional view of the magnetic clutch end cap coupled to a propeller module.

Referring next to FIG. 60, a longitudinal cross-section of the magnetic clutch end cap 5900 coupled to a propeller housing is shown. Shown are the clutch housing 5902, the clutch end cap housing 5904, the Motor coupling 5806, a clutch magnetic disk 6006, an external magnetic disk 6004, the inline propeller housing 6008, an end cap shaft 6014, an external shaft 6010, and a propeller.

The clutch housing 5902 is a generally tubular shape including a radially outward-facing flange at an end of the clutch housing 5902 distal to the propeller housing. An interior space of the clutch housing 5902 is configured to receive the end cap shaft 6014, which runs through the center of the clutch housing 5902 and is coupled to the Motor coupling 5806 at the clutch housing 5902 end distal to the propeller housing 6008 and coupled to the clutch magnetic disk 6006 at an end proximate to the propeller housing 6008. The end cap shaft 6014 is coupled to the clutch housing 5902 to allow for rotational freedom but is fixed against translation.

The clutch magnetic disk 6006 is a disk shape and is coupled to the end cap shaft 6014 such that a center of the disk 6006 aligns with the axis of the end cap shaft 6014. The clutch magnetic disk 6006 includes four magnets embedded in the clutch magnetic disk 6006 proximate to the perimeter of the magnetic clutch end cap 5900 and with a uniform angle between each magnet. In one embodiment, the magnets are "rare earth" Neodymiun magnets. Two magnets are aligned with the north pole facing upwards, and two magnets are aligned with the south pole facing upwards, with similarly oriented magnets alternating around the perimeter. In other embodiments 6 magnets, 8 magnets, or other multiples of two may be used. In yet another embodiment, the magnetic disk 6006 comprises a single magnet with each hemisphere comprising north and south poles manufactured into the magnet.

The clutch end cap housing 5904 is a cylinder shape with a central cylindrical void located in the end of clutch end cap housing 5904 proximate to the clutch housing 5902 and configured to receive the tubular portion of the clutch housing 5902. The housing screws 5906 couple the clutch housing flange to a wall of the tubular portion of the clutch end cap housing 5904. When the clutch housing 5902 is coupled to the clutch end cap housing 5904, the clutch magnetic disk 6006 is located close enough to the exterior face of the clutch end cap housing 5904 proximate to the inline propeller housing 6008 such that the clutch magnetic disk 6006 is sufficiently attractive to the external magnetic disk 6004.

The clutch end cap housing 5904 also includes an exterior shoulder configured to receive the pressure vessel tube 1100, and two o-rings in the configuration as shown previously for the dry end cap 1212.

An end cap housing end proximate to the propeller housing includes a cylindrical void configured to receive the propeller housing and align the external shaft 6010 and the external magnetic disk 6004 with the clutch magnetic shaft and end cap shaft 6014.

The propeller housing is configured for the specific propeller type, which in FIG. 60 is the inline propeller 6012. The propeller housing includes a central approximately cylindrical cavity for receiving the external magnetic disk 6004 and the external shaft 6010. As with the clutch housing 5902, the external magnetic disk 6004 is coupled to the external shaft 6010, and the external shaft 6010 is coupled to the propeller housing to provide rotational, but not translational, movement.

The external magnetic disk 6004 is configured similarly to the clutch magnetic disk 6006. The propeller housing is coupled to the end cap housing using end cap mounting holes and screws as previously described for typical end cap connections. When the propeller housing is coupled to the end cap housing, the magnets of the external magnetic disk 6004 and the clutch magnetic disk 6006 attract, coupling the end cap shaft 6014 to the external shaft 6010 for rotational movement. Thus, when the motor shaft 5808 rotates, the rotation is transferred to the end cap shaft 6014 via the Motor coupling 5806, and rotation of the end cap shaft 6014 is transferred to the external shaft 6010 via the magnetic coupling of the clutch magnetic disk 6006 and the external magnetic disk 6004. The strength of the magnets and the distance between the disks must be configured to provide enough magnetic attraction to allow the shafts to rotate at the desired speed without breaking the magnetic attraction between the magnetic disks.

Referring again to FIGS. 59 and 60, the magnetic clutch system transmits torque from the motor 5800 to the propeller via the magnetic clutch comprised of the clutch magnetic disk 6006 and the external magnetic disk 6004, instead of using a shaft which penetrates the pressure vessel 104 and is sealed with shaft seals. Shaft seals all wear over time and require continuous vigilance to avoid leaks that are major sources of failure, particularly in seawater, where contact with electronics may result in catastrophic failure. The magnetic clutch allows the interior of the pressure vessel 104 to remain sealed, and allows for changing of thruster end caps without affecting the interior portion of the pressure vessel 104.

Additionally, the magnetic clutch system provides additional safety for the user. While providing sufficient torque to drive the propeller through water, the magnetic clutch will slip should the propeller become entangled or strike a carelessly placed hand. Thus, even at full speed, the user can grab the propeller and it will slip rather than cut the user.

All propeller modules of the URVDS are configured to mate with the magnetic clutch end cap 5900.

Figure 61:
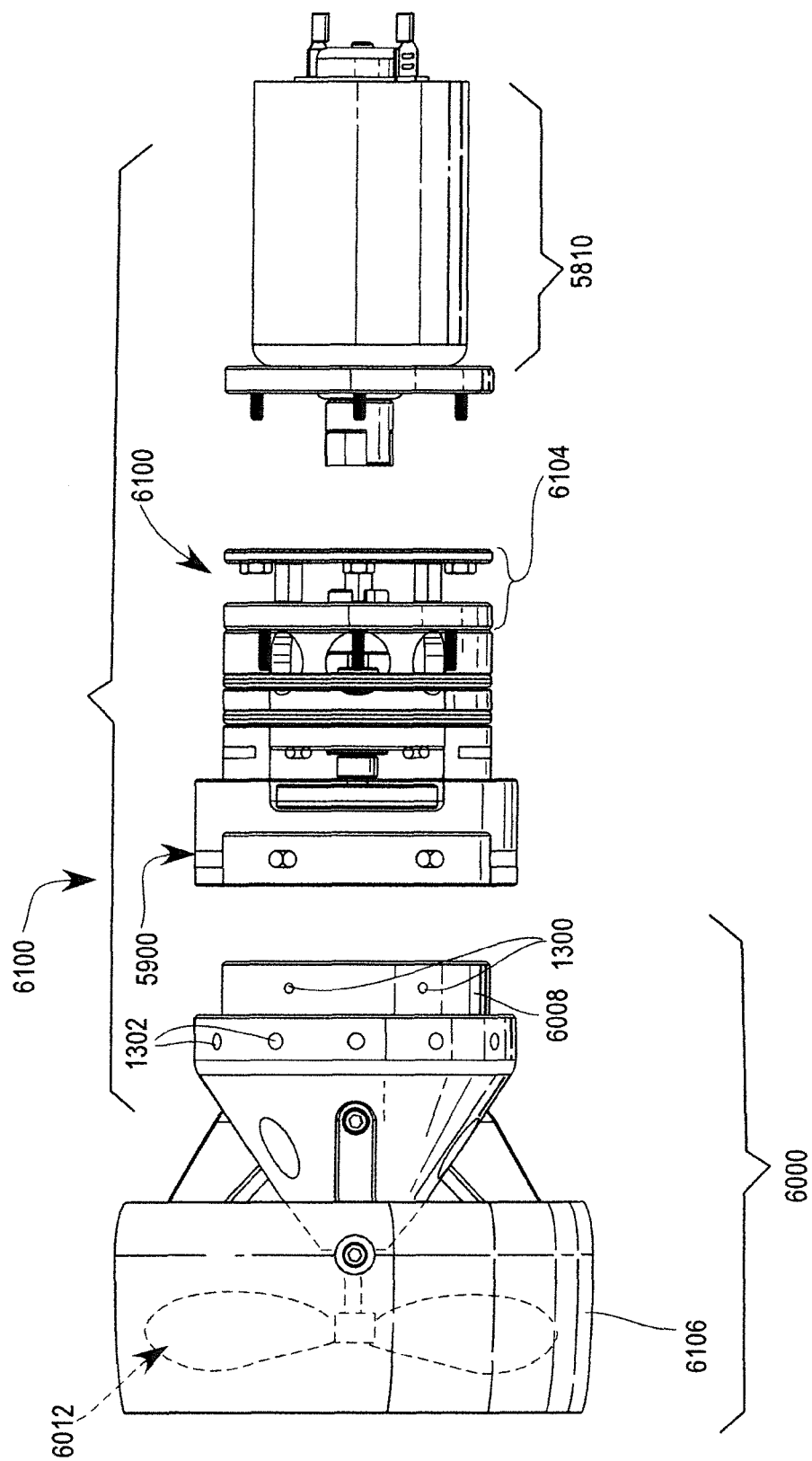
FIG. 61 is an exploded view of a portion of an inline thruster pressure vessel.

Referring next to FIG. 61, an exploded view of a portion of the inline thruster pressure vessel 6100 is shown. Shown are the motor assembly 5810, the inline propeller module 6000, the magnetic clutch end cap 5900, the propeller housing 6008, a motor mounting plate 6104, the inline propeller 6012, and a propeller shroud 6106.

The motor assembly 5810 includes the motor 5800, the bulkhead and the motor coupling 5806, as previously described. The motor mounting plate 6104 is coupled to the end of the magnetic clutch end cap 5900 proximate to the motor assembly 5810. The inline propeller 6012 is rotationally coupled to the external shaft 6010 (not shown) such that the axis of the propeller is aligned with the longitudinal axis of the thruster pressure vessel, providing force along the longitudinal axis. The toroidal propeller shroud 6106 is coupled to the propeller housing such that the protector ring encases the propeller edge perimeter.

Figure 62:
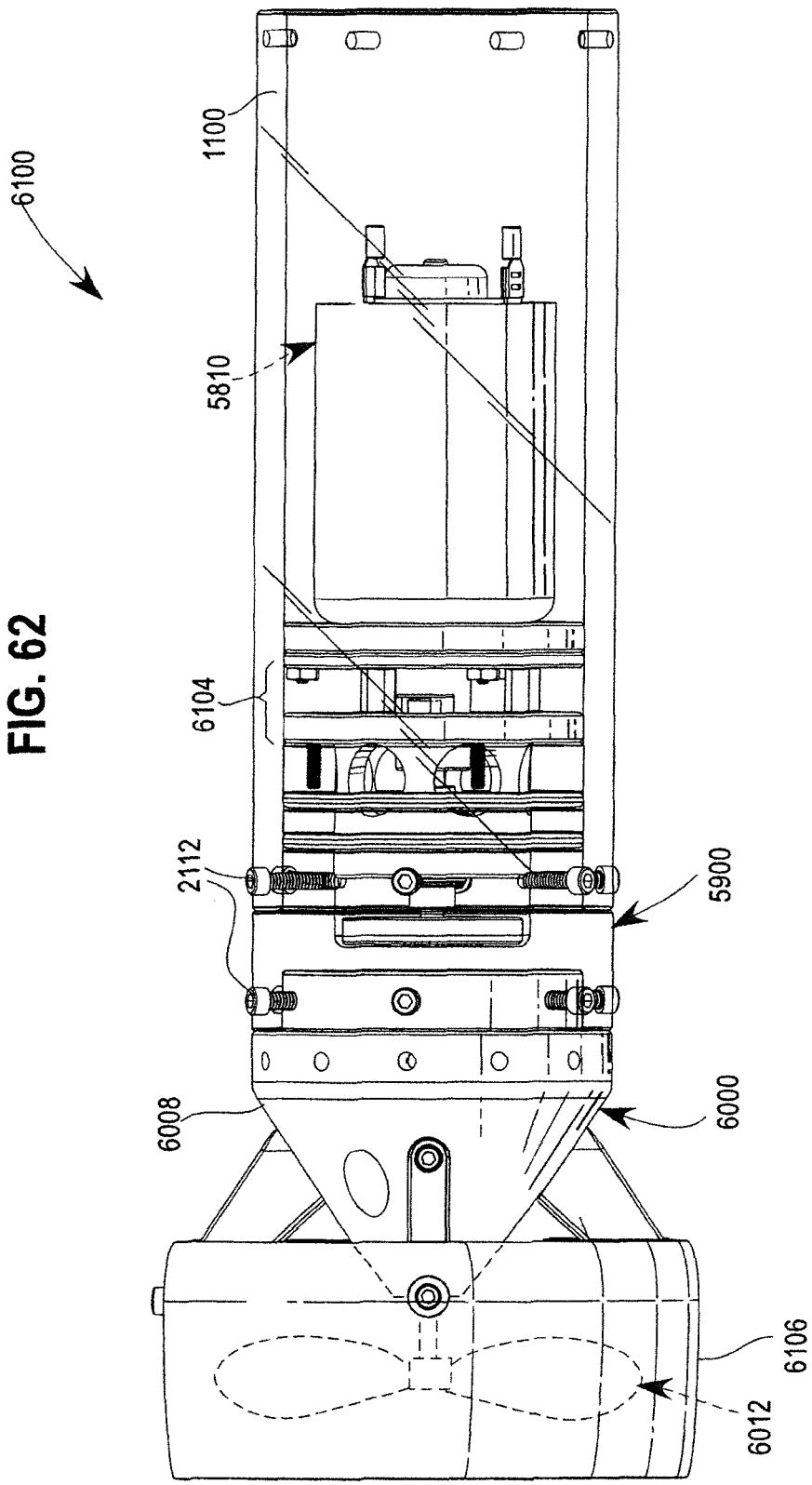
FIG. 62 is an elevational view of the portion of the inline thruster pressure vessel.

Referring next to FIG. 62, a portion of the assembled inline thruster pressure vessel 6100 is shown. Shown are the motor assembly 5810, the inline propeller module 6000, the magnetic clutch end cap 5900, an inline propeller housing 6008, the motor mounting plate 6104, the tube 1100, the inline propeller 6012, and the inline propeller shroud 6106.

As assembled, the motor mounting plate 6104 is coupled to the bulkhead of the motor assembly 5810 using screws or other suitable fastener. As previously described, the propeller housing is coupled to the magnetic clutch end cap 5900, which also brings the magnetic disks into proximity and magnetically couples the magnetic disks of the magnetic clutch, providing continuous torque along the shafts and turning the inline propeller 6012. The tube 1100 is coupled to the magnetic end cap as previously described for the typical end cap, and is coupled to another dry end cap-type module on the other tube 1100 end (not shown).

In use, the inline thruster pressure vessel 6100 produces thrust along the axis of the propeller housing, as is commonly practiced. In most circumstances the inline thruster pressure vessel 6100 will provide the thrust along the URV's 100 primary direction of travel.

Figure 63:
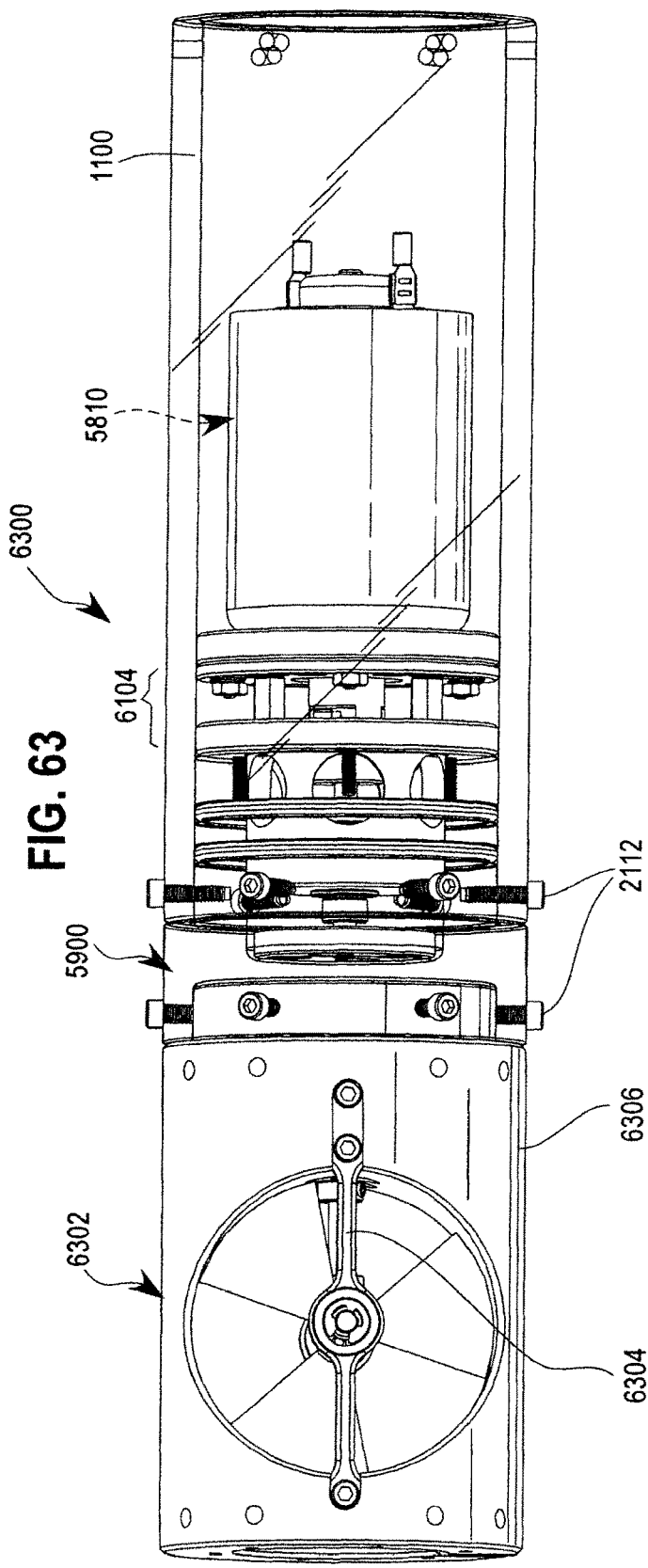
FIG. 63 is an elevational view of a portion of a lateral thruster pressure vessel.

Referring next to FIG. 63, a portion of the assembled lateral thruster pressure vessel 6300 is shown. Shown are the motor assembly 5810, the lateral propeller module 6302, the magnetic clutch end cap 5900, a lateral propeller housing 6306, the motor mounting plate 6104, a lateral propeller 6304 and the tube 1100.

The lateral thruster pressure vessel 6300 is assembled similarly to the inline thruster pressure vessel 6100, with the substitution of the lateral propeller module 6302 for the inline propeller module 6000. The lateral propeller housing 6306 comprises a cylindrical shape including a cylindrical penetration perpendicular to the axis of the cylinder, located near a midpoint of the lateral propeller housing 6306. The end of the lateral propeller housing 6306 proximate to and coupling to the magnetic clutch end cap 5900 is configured to mate with the magnetic clutch end cap 5900 similarly to the inline propeller housing 6008. The portion of the lateral propeller housing 6306 proximate to the to the magnetic clutch end cap 5900 also includes voids for accommodating the external magnetic disk 6004 and the external shaft 6010. The lateral propeller 6304 is rotationally coupled to the housing such that the propeller is located inside the lateral propeller housing 6306 with the axis of the lateral propeller 6304 aligned with the centers of the penetration, i.e. perpendicular to the longitudinal axis of the lateral thruster pressure vessel 6300. The lateral propeller 6304 is coupled to the external shaft 6010 such that the rotation of the external shaft 6010 rotates the lateral propeller 6304.

The lateral thruster pressure vessel 6300 provides maneuvering thrust that is perpendicular to the longitudinal axis of the lateral thruster pressure vessel 6300. By mounting the propeller rotated around the longitudinal axis, thrust can be directed vertically, horizontally, or any angle in 30 degree increments, while still presenting a drag profile in the URV's primary direction of travel that is only a fraction of that obtained by simply mounting conventional in-line thrusters orthogonally to the main axis of travel.

It will be appreciated that the modules of the inline thruster pressure vessel 6100 and the lateral thruster vessel are identical, with the exception of the propeller module. The inline thruster pressure vessel 6100 may be changed to the lateral thruster pressure vessel 6300 simply by removing the inline propeller housing 6008 and replacing it with the lateral propeller housing 6306, and vice versa. Other housings including the standard connection configuration and the magnetic clutch may alternately be coupled to the thruster pressure vessel 106.

Figure 64:
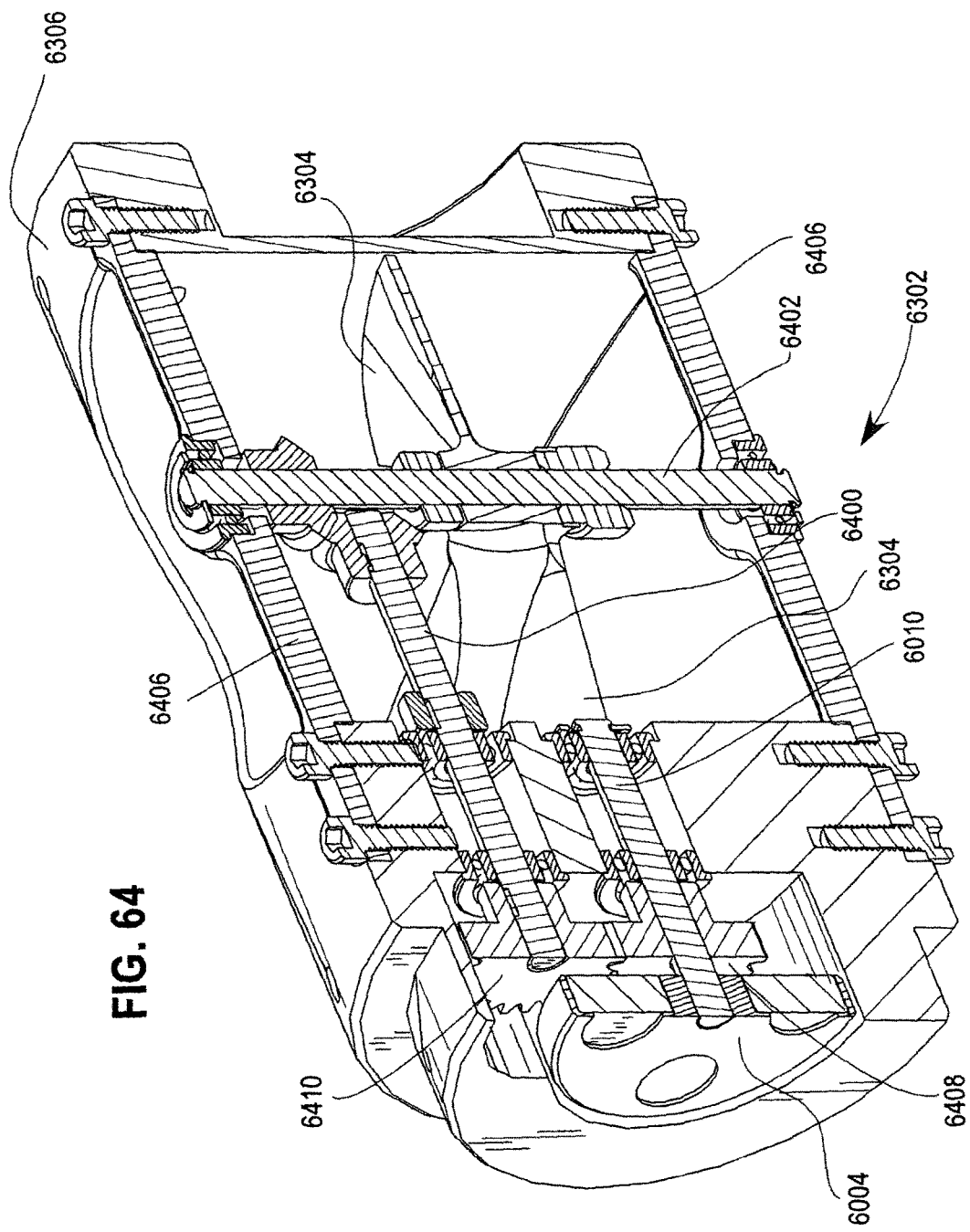
FIG. 64 is a cross-sectional view of a lateral propeller module.

Referring next to FIG. 64, a cross-sectional view of the lateral propeller module 6302 is shown. Shown are the external magnetic disk 6004, a bevel gear shaft 6400, a propeller shaft 6402, the lateral propeller 6304, a bevel gear, two lateral propeller shaft support rods 6406, a driving spur gear 6408, a driven spur gear 6410, and the external shaft 6010.

The external shaft 6010 includes the driving spur gear 6408, which is meshed with the driven spur gear 6410. The driven spur gear 6410 is aligned with and coupled to the bevel gear shaft 6400. The bevel gear shaft 6400 terminates in the bevel gear. The bevel gear is coupled to the propeller shaft 6402.

In one embodiment of the present invention, the propeller shaft 6402 is supported by lateral propeller shaft support rods 6406 spanning across the cylindrical penetration at the exterior of the lateral propeller housing 6306. The lateral propeller 6304 is coupled to the propeller shaft 6402 at approximately the midpoint of the penetration.

In operation, the magnetic clutch rotates the magnetic shaft and the driving spur gear 6408. The driving gear rotates the driven spur gear 6410, transferring the rotation to the bevel gear shaft 6400.

The bevel gear shaft 6400 is coupled to the propeller shaft 6402 via the bevel gear, which translates the rotational axis from a longitudinal axis to the radial axis required by the later propeller orientation.

Figure 65:
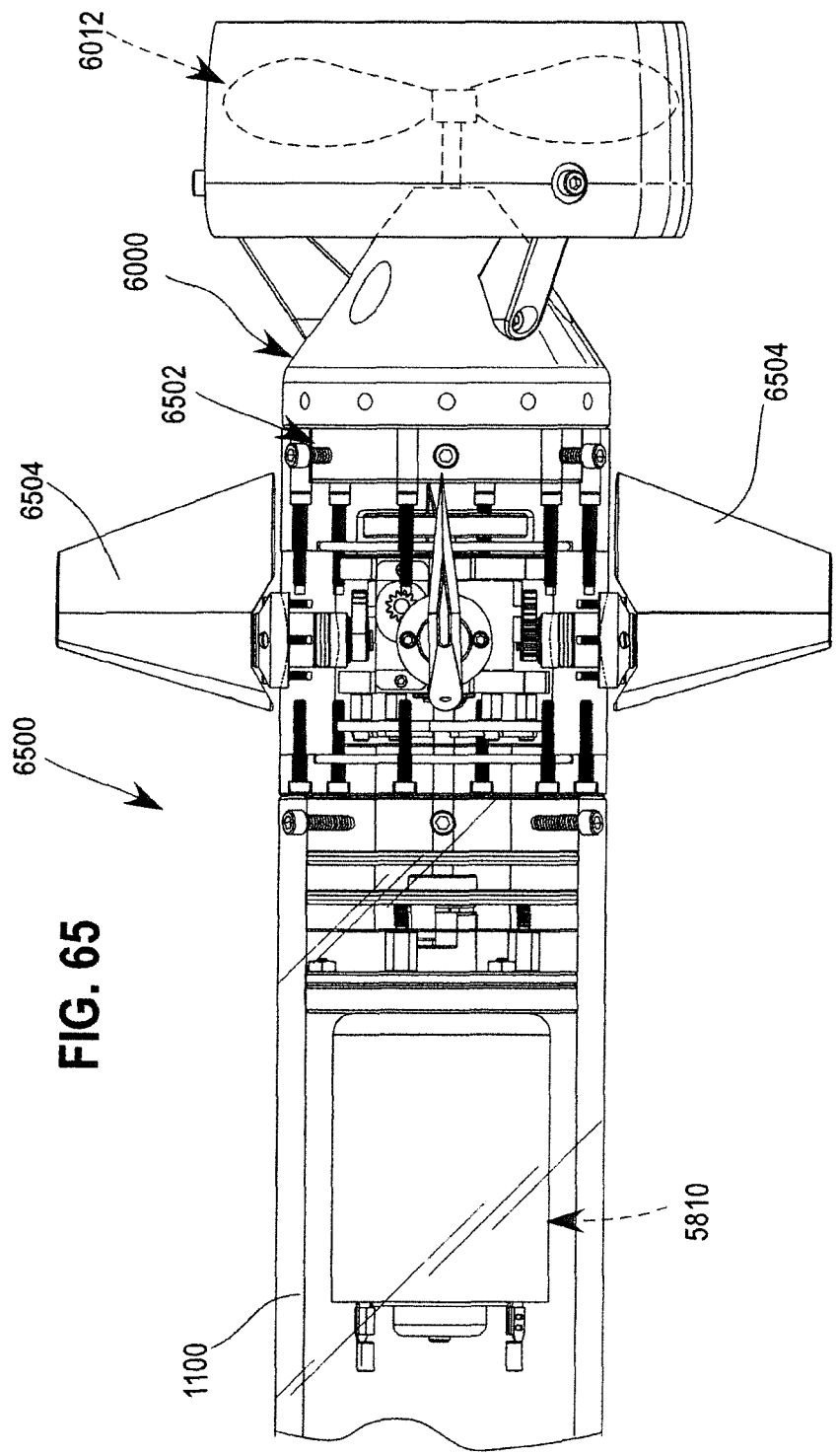
FIG. 65 is an elevational view of a portion of an inline rudder thruster pressure vessel.
Figure 66:
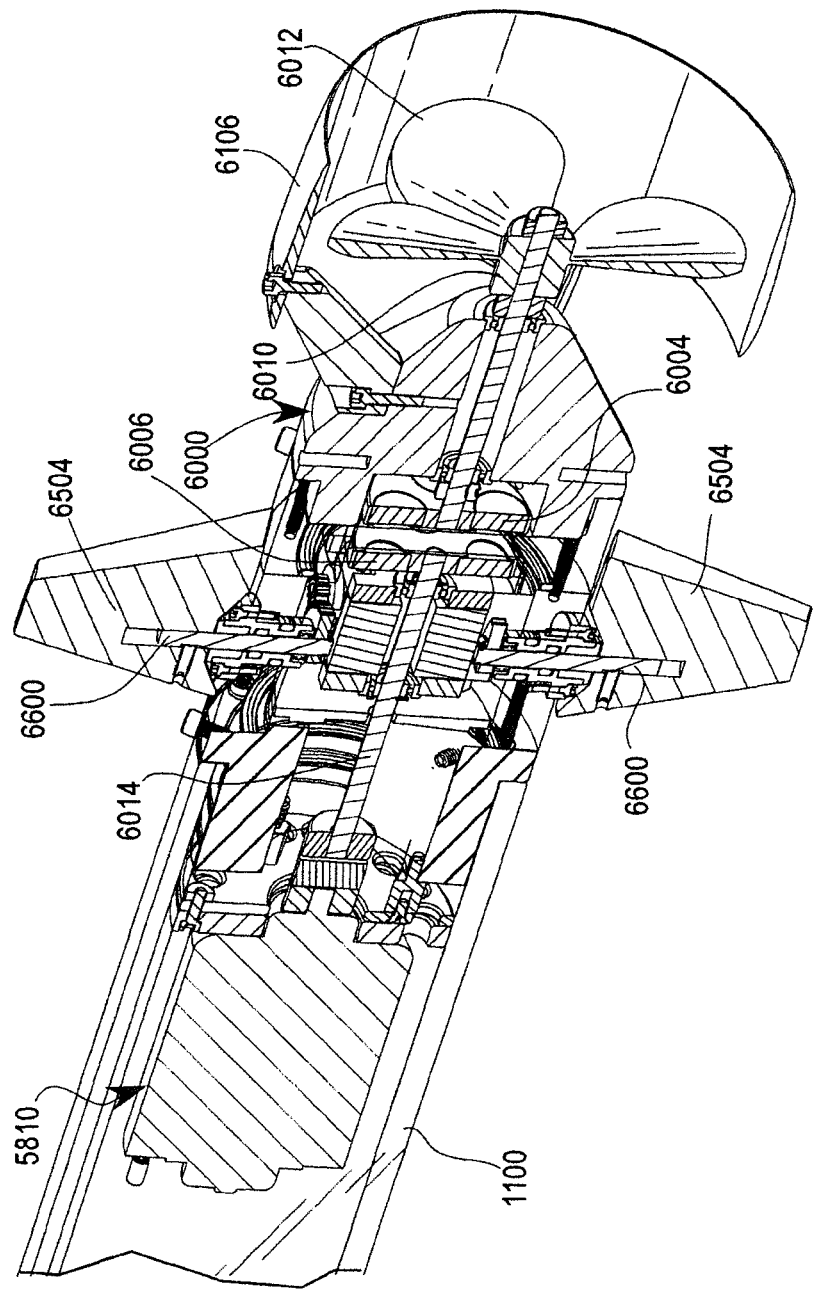
FIG. 66 is a cross-sectional view of the portion of the inline rudder thruster pressure vessel.

Referring next to FIGS. 65 and 66, the inline rudder thruster pressure vessel 6500 is shown in elevation and in section. Shown are the tube 1100, the motor assembly 5810, a rudder module magnetic clutch end cap 6502, the inline propeller housing 6008, a plurality of rudders 6504, the motor coupling 5806, the end cap shaft 6014, a plurality of rudder shafts 6600, the propeller shaft 6402, the magnetic clutch, the inline propeller, and the propeller shroud 6106.

Figure 67:
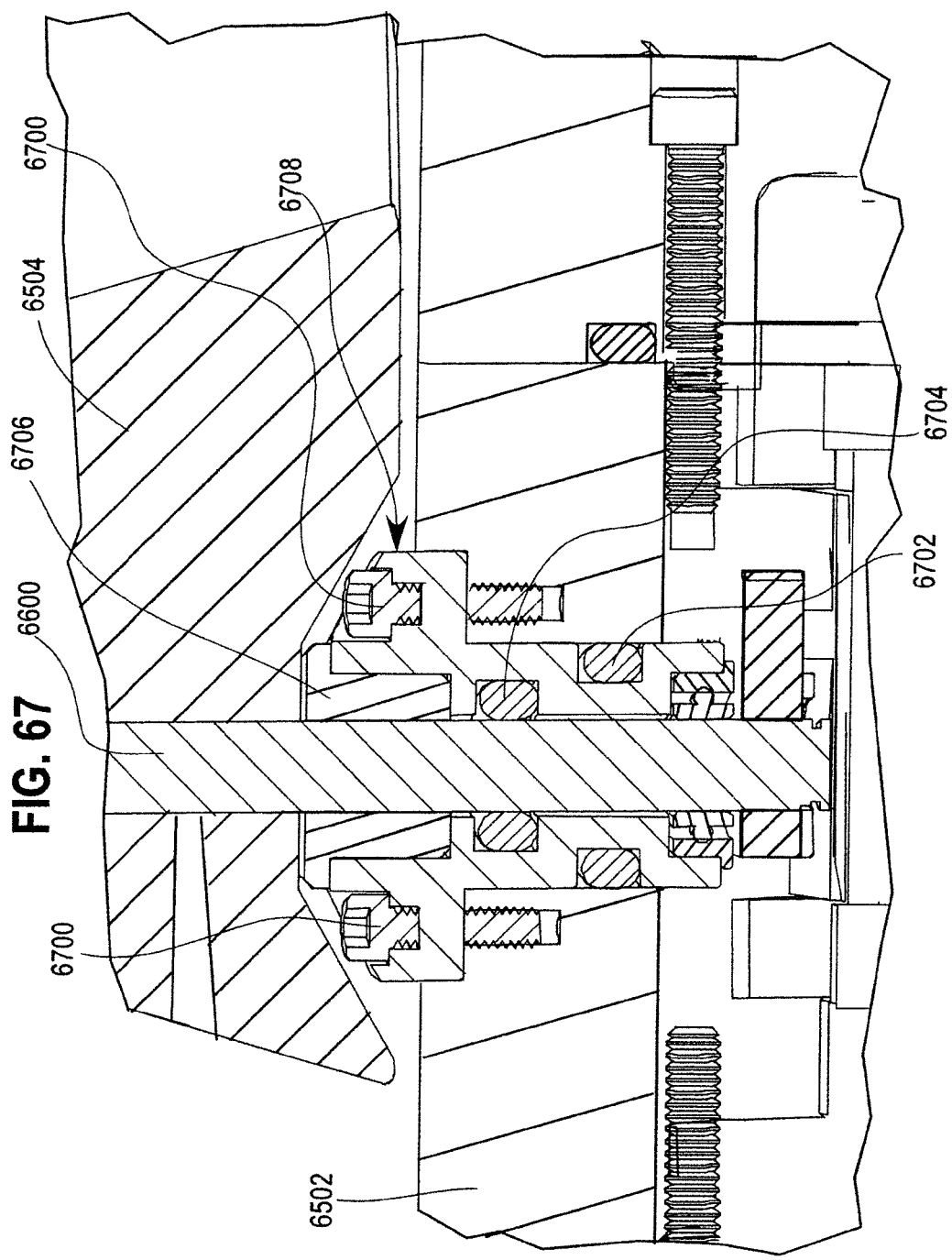
FIG. 67 is a cross-sectional view of a rudder shaft mount.

The inline rudder thruster pressure vessel 6500 uses a modified magnetic clutch end cap (an inline rudder magnetic clutch end cap 6502) that incorporates additional elements for rotation of rudders 6504 which extend outward from the perimeter of the inline rudder magnetic clutch end cap 6502. Coupled to the end cap shaft 6014 is the servo assembly 6602, which includes four servos. Rudder shafts are rotationally coupled to the servo assembly 6602 and extend through the perimeter of the rudder module magnetic clutch end cap housing, including a watertight seal around the shafts while still permitting rotation as shown in FIG. 67. Each rudder 6504 is coupled to the corresponding rudder shaft 6600. In the embodiment shown, four rudders 6504 are equally spaced around the perimeter of the inline rudder magnetic clutch end cap 6502, but other numbers of rudders 6504 may be used as desired.

The end cap shaft 6014 of the rudder module magnetic clutch end cap passes between the four servos, and is long enough to span the distance between the motor 5800 and the magnetic clutch on the other side. The servo output is normally 180 degrees of rotation at 19 oz-in of torque. Each servo shaft drives a 4:1 reduction gear that turns the rudder shaft 6600 which passes through the inline rudder magnetic clutch end cap 6502 through an o-ring rotary seal and attaches to the rudder 6504, delivering 45 degrees of rotation at roughly 50 oz-in.

The end cap shaft 6014 extends to the end of the inline rudder magnetic clutch end cap 6502 proximate to the propeller, where it is coupled to the inline propeller module 6000.

Referring again to FIGS. 65 and 66, a common design for autonomous URVs 100 that are designed for long-range data-gathering operation along a pre-programmed route is to have the single long thruster pressure vessel terminated with the single inline propeller 6012 and two to four rudders 6504 for steering rather than relying upon multiple orthogonally oriented thrusters for maneuvering as is typical in tele-operated URVs 100. When operating in open obstacle-free water this scheme trades un-needed turn-in-place maneuverability for increased range by minimizing the drag profile. The URVDS supports this with the inline rudder thruster pressure vessel 6500.

Servos included in the servo assembly 6602 are readily commercially available and can be driven by any of several commercially available circuit boards that receive position commands via RS-232, SPI, I2C, and which output standardized servo control PWM signals to multiple servos. These signals are well described in the literature and customized circuit boards that provide equivalent signals are easily built. An exemplary version uses a circuit board with a single microcontroller such as an Atmel ATMega48 to convert RS232 coded position commands to PWM signals on four output lines to the four servos.

While two actuators controlling two rudders 6504 each (coupled together) on opposite sides of the robot would be sufficient to control yaw and pitch maneuvering, having four independent rudders 6504 more options for control by enabling the URV 100 to control roll about its longitudinal axis. For example, the tendency for the URV 100 to roll that is imparted by a single propeller turning in the water can be counteracted, or the URV 100 can actively roll, for example to point an instrument such as the camera in different directions.

While the inline and lateral propellers are typically used in dedicated pressure vessels 103 on URVs 100 with multiple pressure vessels 104, the inline rudder magnetic clutch end cap 5602 and inline propeller module 6000 typically terminate the single pressure vessel 104 which houses all control electronics, power supplies, and payloads for long range untethered autonomous operation. This design configuration is typified by torpedo-form autonomous vehicles.

Referring next to FIG. 67, a cross-section of a rudder shaft mount 6708 is shown. Shown are the inline rudder magnetic clutch end cap 6502, the rudder shaft 6600, a plurality of rudder shaft mounting screws 6700, an inner o-ring 6702, an outer o-ring 6704, and an outer bearing 6706.

The rudder shaft mount 6708 is a generally tubular structure including a lateral flange configured to seat on the exterior of the inline rudder magnetic clutch end cap 6502 when the rudder shaft mount 6708 is inserted in a hole in an exterior wall of the inline rudder magnetic clutch end cap 6502. The rudder shaft 6600 passes through the rudder shaft mount 6708 before exiting the inline rudder magnetic clutch end cap 6502. A plurality of fasteners, for example the rudder shaft mounting screws 6700, couple the rudder shaft mount 6708 to the inline rudder magnetic clutch end cap 6502. The rudder shaft mount 6708 includes a perimeter notch proximate to the exterior of the end cap for receiving the outer o-ring 6704. The rudder shaft mount 6708 also includes an inner notch proximate to the interior of the end cap for receiving the inner o-ring 6702. The rudder shaft mount 6708 is also configured to receiving the tubular outer bearing 6706 where the rudder shaft 6600 exits the rudder shaft mount 6708.

The inner o-ring 6702, which seals a joint between the rudder shaft mount 6708 and the inline rudder magnetic clutch end cap 6502, is a static seal preventing water ingress around the mounting. The outer o-ring 6704, which seals a joint between the rudder shaft mount 6708 and the rudder shaft 6600, is a rotary seal configured to rotate only through approximately +/−22.5 degrees, and rotates only when the rudder 6504 changes angle (i.e. fairly infrequently) (when the rudder 6504 changes angle), thus the upper o-ring can be considered to be a static seal with its characteristically high reliability, rather than a rotary seal.

Buoyancy Management System

Figure 68:
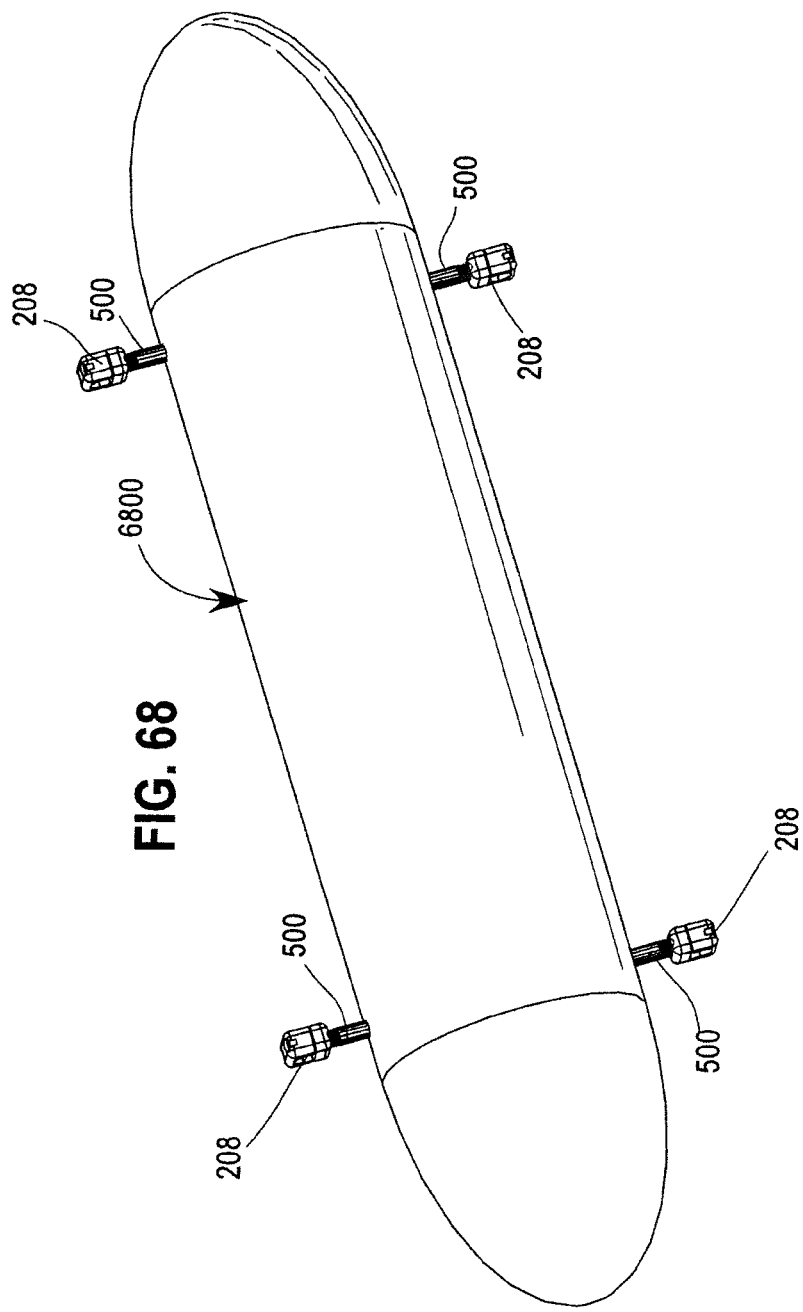
FIG. 68 is a perspective view of aw cylindrical float buoyancy module.

Referring next to FIG. 68, a cylindrical float buoyancy module 6800 is shown. Shown are a cylindrical float 6802, the link struts 500 and the rail clamps 208.

Cylindrical float 6802 may be made of polystyrene foam with a ⅛" thick layer of epoxy resin as a coating. In the embodiment shown each end of the cylindrical float 6802 terminates in a nosecone shape. The diameter of the cylindrical float 6802 is typically chosen such that the cylindrical float buoyancy module 6800 may be coupled to parallel chassis rails 200. The cylindrical float buoyancy module 6800 includes two link struts 500, one proximate to each end, which are embedded in the cross-section of the cylindrical float 6802 and protrude on each side. Ends of the link struts 500 are coupled to the rail clamp 208. The cylindrical float buoyancy module 6800 may then be coupled to the rails 200 of the chassis 102 as previously described in the chassis section. It will be apparent to those skilled in the art that other configurations of embedded link struts 500 and cylindrical float buoyancy module 6800 lengths may be used.

Figure 69:
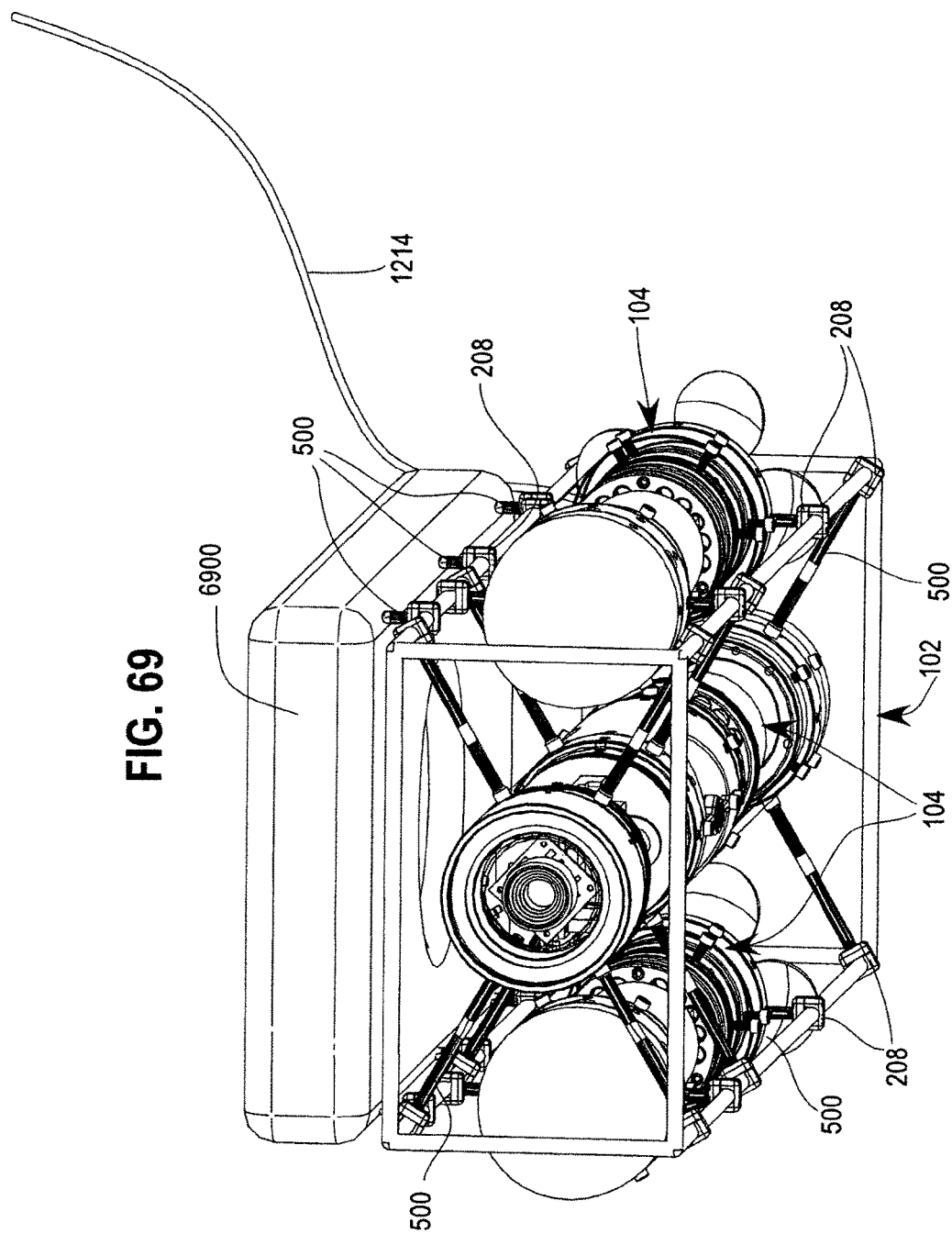
FIG. 69 is a perspective view of an exemplary URV including a syntactic foam buoyancy module.

Referring next to FIG. 69, the URV 100 including a syntactic foam buoyancy module 6900 is shown. Shown are the chassis 102, the pressure vessels 104, the rail clamps 208, the link struts 500, and the syntactic foam buoyancy module 6900.

The syntactic foam buoyancy module 6900 in the embodiment shown is a rectangular shape including a circular cut-out near the center. The syntactic foam buoyancy module 6900 also includes embedded link struts 500. The syntactic foam buoyancy module 6900 of FIG. 69 includes six links struts embedded so that one end remains within the syntactic foam buoyancy module 6900. The protruding end of the link strut 500 is coupled to the rail clamp 208, which is coupled to the rail 200 as previously shown.

Syntactic foam is available in formulations to provide buoyancy at any ocean depth without crushing, and is easily machined into any shape. Since syntactic foam buoyancy modules 6900 don't rely upon cylindrical shape to withstand pressure they can be made in flat-sided volumes such as the rectangular volume of FIG. 69 or more intricate shapes when needed. The syntactic foam buoyancy module 6900 of FIG. 69 includes the circular cut-out above the URV's vertical thruster to permit free flow of water through the propellers.

Another buoyancy module 108 method is to simply use empty pressure vessels 104 either alone or by adding additional length to existing pressure vessels 104 that contain other components. The amount of buoyancy gained is easily derived from the volume of the tube 1100, and the water it displaces. The 3" diameter acrylic tube 1100 with a ¼" thick wall yields 0.166 lbs of buoyancy per inch of empty tube 1100 length, almost exactly 1 lb per 6" of tube 1100 (excluding its mounting hardware). This is also easier for the user to build in the field since it only requires cutting the pressure vessel tube 1100 to the length required for the amount of flotation needed, and then using existing end caps to seal it. Pressure vessels 104 used for buoyancy need not be completely empty. A few light components such as circuit boards may be incorporated and cabled into the main system at the user's discretion.

Figure 70:
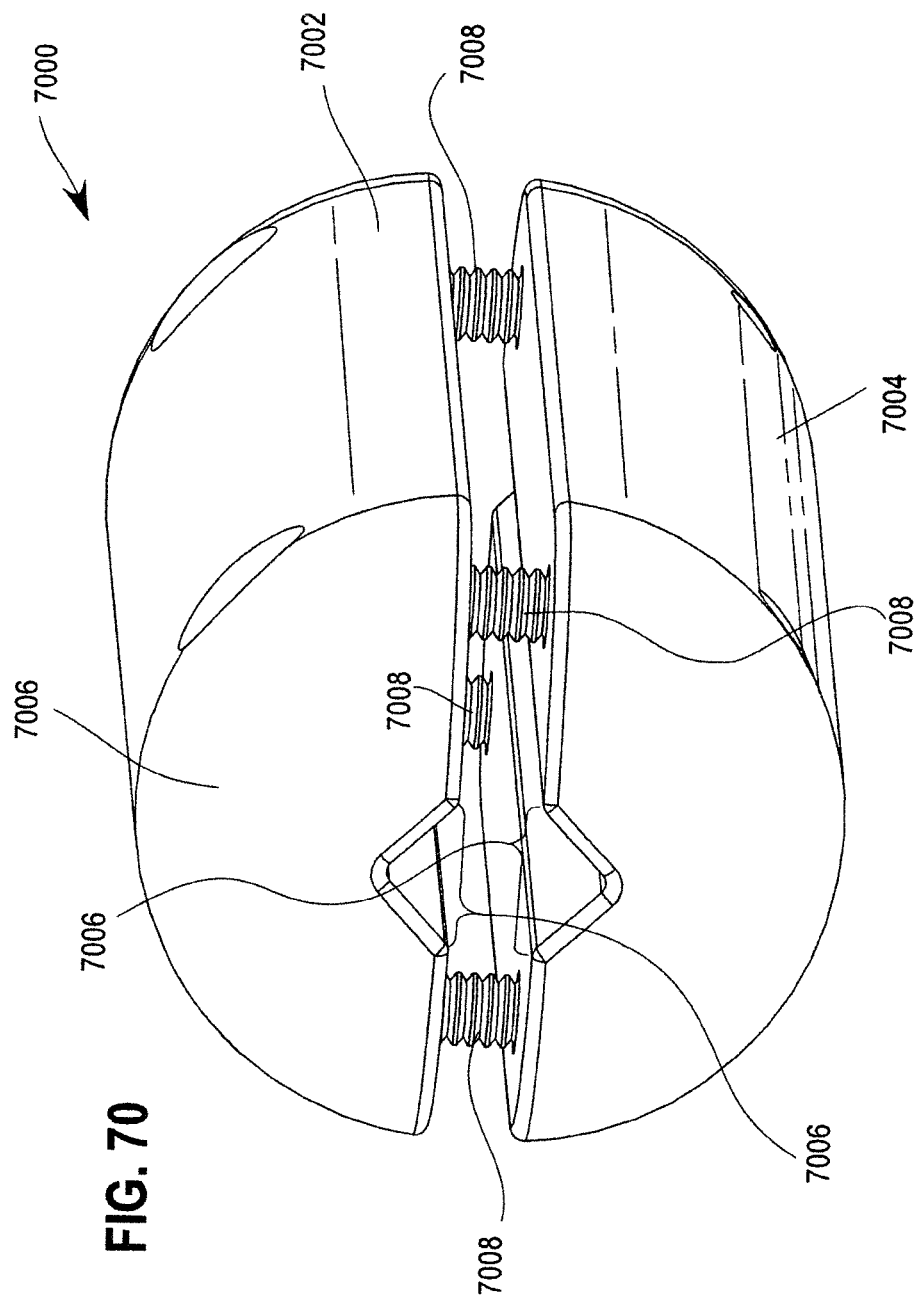
FIG. 70 is a perspective view of a ballast module.

Referring next to FIG. 70, a perspective view of a ballast module 7000 is shown. Shown are a first ballast 7002, a second ballast 7004, a ballast notch 7006, and a plurality of ballast screws 7008.

The ballast modules 7000 are comprised of lead encased in rubber or plastic and include two generally half-cylindrical parts: the first ballast 7002 and the second ballast 7004. The first ballast 7002 and the second ballast 7004 are coupled together using the ballast screws 7008, and form a generally cylindrical shape when coupled together. A space may be left between the first ballast 7002 and the second ballast 7004 in the coupled position. The flat sides of the first ballast 7002 and the second ballast 7004 include the longitudinal ballast notch 7006 such that the rail 200 may fit in the notches when the first ballast 7002 is coupled to the second ballast 7004.

While re-positioning the buoyancy modules 108 allows great control of trim, sometimes the best solution will be a combination of both buoyancy and ballast. The repositionable ballast modules 7000 complement the buoyancy modules 108, providing trimming weights typically ranging from 0.25 lbs to 0.5 lbs to correct small errors in trim.

Figure 71:
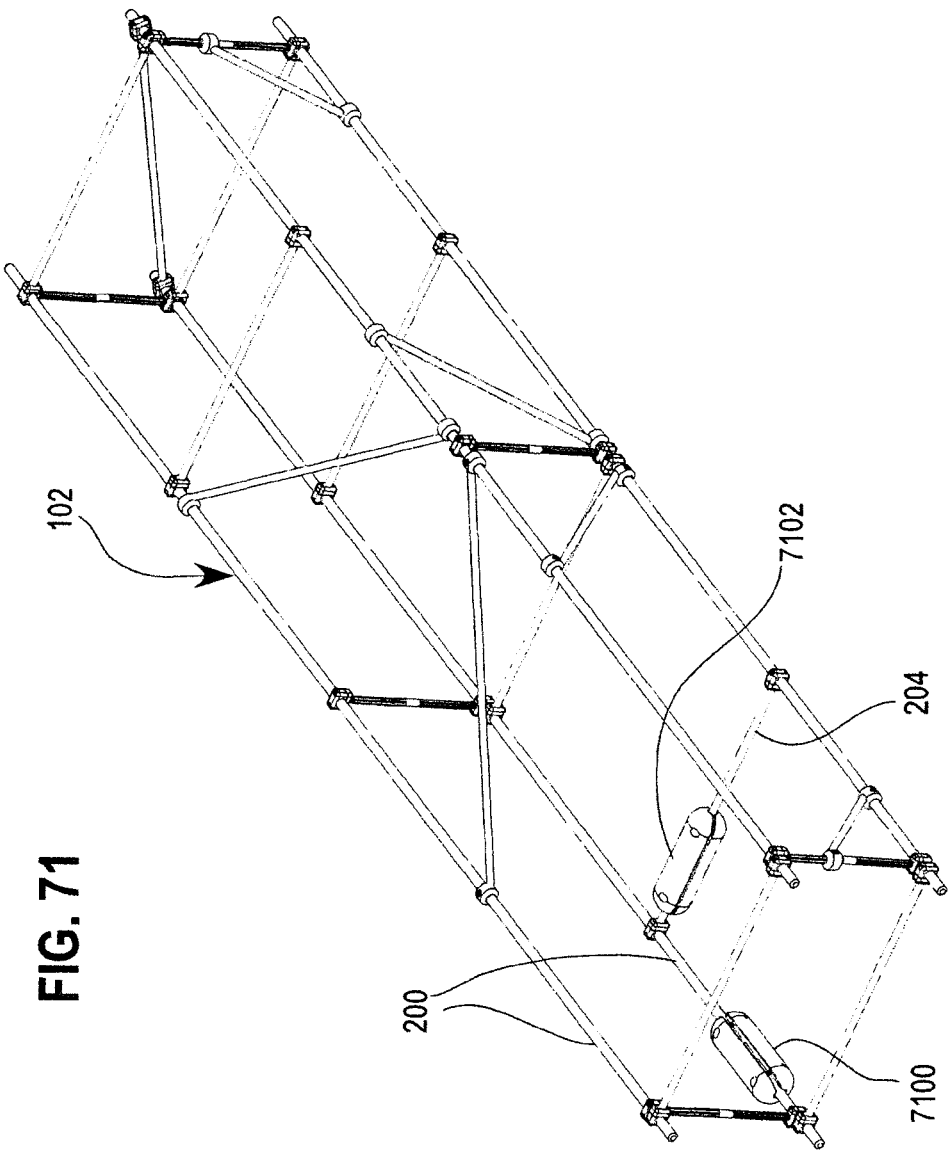
FIG. 71 is a perspective view of ballast modules coupled to the URV chassis.

Referring next to FIG. 71, two ballast modules 7000 are shown attached to the chassis 102. Shown are a rail ballast 7104, a beam ballast 7102 and the chassis 102.

The rail ballast 7104, is shown coupled to the rail 200 of the chassis 102, and the beam ballast 7102 is shown coupled to the beam 204 of the chassis 102. The ballasts may be repositioned by loosening the ballast screws 7008 and sliding the ballast along the rail 200 or beam 204, or may be removed by removing the screws entirely and then recoupling the ballast in another location on the chassis 102.

The beam 204 can be positioned anywhere along the rail 200, providing fore-aft trim, and the ballast module 7000 can be positioned from side to side along the beam 204 for providing fine adjustment of side to side trim whenever differences in cabling or attached sensors 4800 or accessories create a list to the side. Thus a pound or two of ballast can be positioned precisely anywhere in the horizontal plane contained by the rails 200. While their main intent is to be used as temporary trim while adjusting the overall trim of the URV 100 under development, they can be permanently installed at the user's discretion. The dimensions of the rectangular center opening for the rail 200 are such that the weight can be screwed down onto either rails 200 or (typically thinner) beam 204 or post 206 rods.

Normally the buoyancy modules 108 of all types are mounted upon struts threaded for rail clamps 208 so that the buoyancy modules 108 can be easily moved along the rails 200 to adjust trim; e.g., if the URV 100 is nose-heavy in the water, its buoyancy modules 108 can be slid forward along the rails 200 or the URV's 100 heavier masses can be slid backwards until the masses and buoyancies are balanced.

The rail chassis system allows great freedom to position a URV's 100 negative and positively buoyant buoyancy modules 108 or pressure vessels 104 to give a metacentric height (MH) in accordance with the URV's 100 required function. For example, on the URV 100 that is primarily a remote camera platform it may be advantageous to have a steady horizontal attitude to give a camera viewer a stable horizontal image to provide greater visual orientation in a chaotic visual environment. This URV 100 would benefit from a high MH, placing its buoyancy modules 108 at the top of the vehicle and its heavier elements, motors 5800, batteries, etc. lower on the chassis 102. But on another URV 100 the positive and negative elements may be balanced about its central plane, giving a low (or zero) MH, facilitating pitch and roll maneuvers that may be useful if its camera is frequently pointed upward or downward or at odd angles as it might be during a pipe inspection.

Referring next to FIGS. 71A-71D, rebalancing of the URV 100 while assembled is shown. Shown are the URV 100, the added pressure vessel 7104, and the buoyancy module 7106.

Figure 71A:
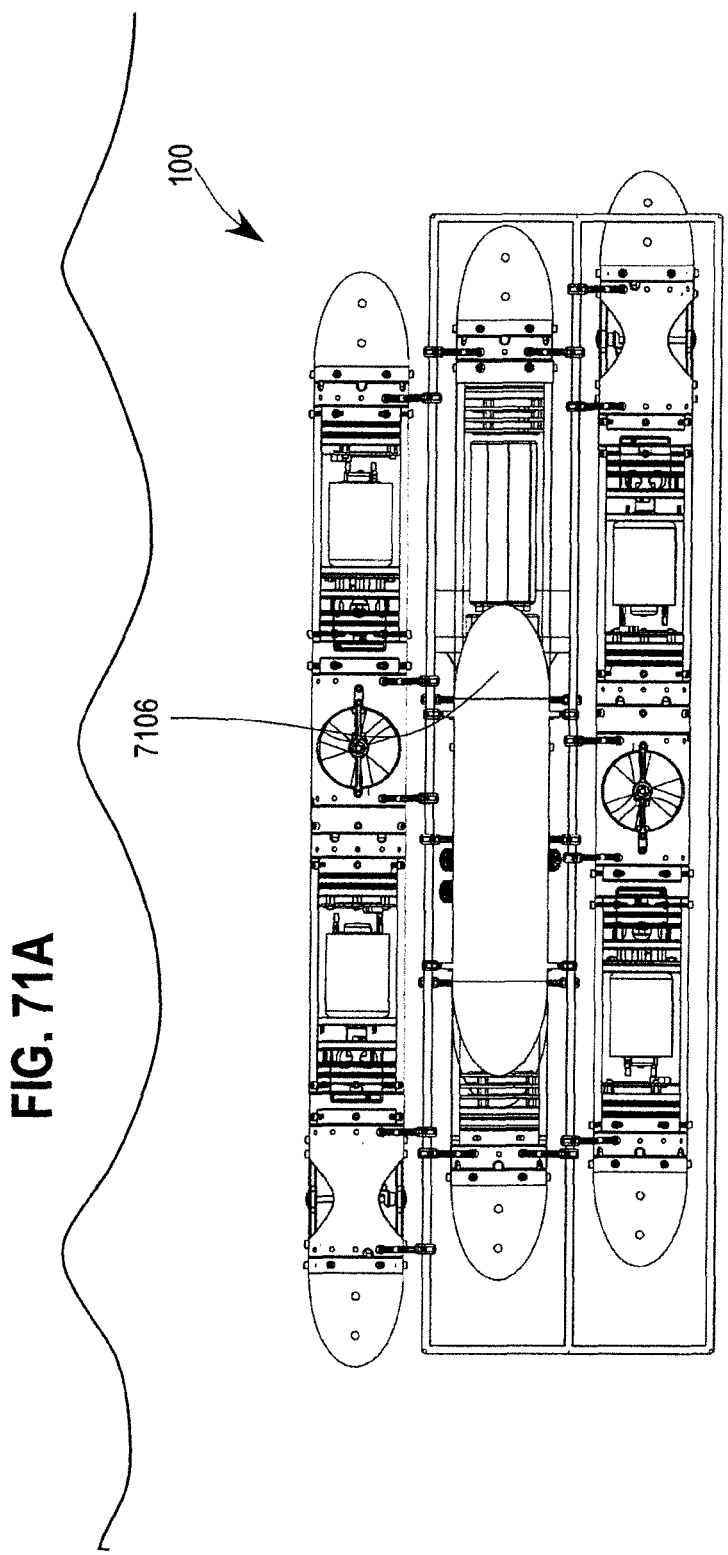
FIG. 71A is a first elevational view of the underwater URV.
Figure 71C:
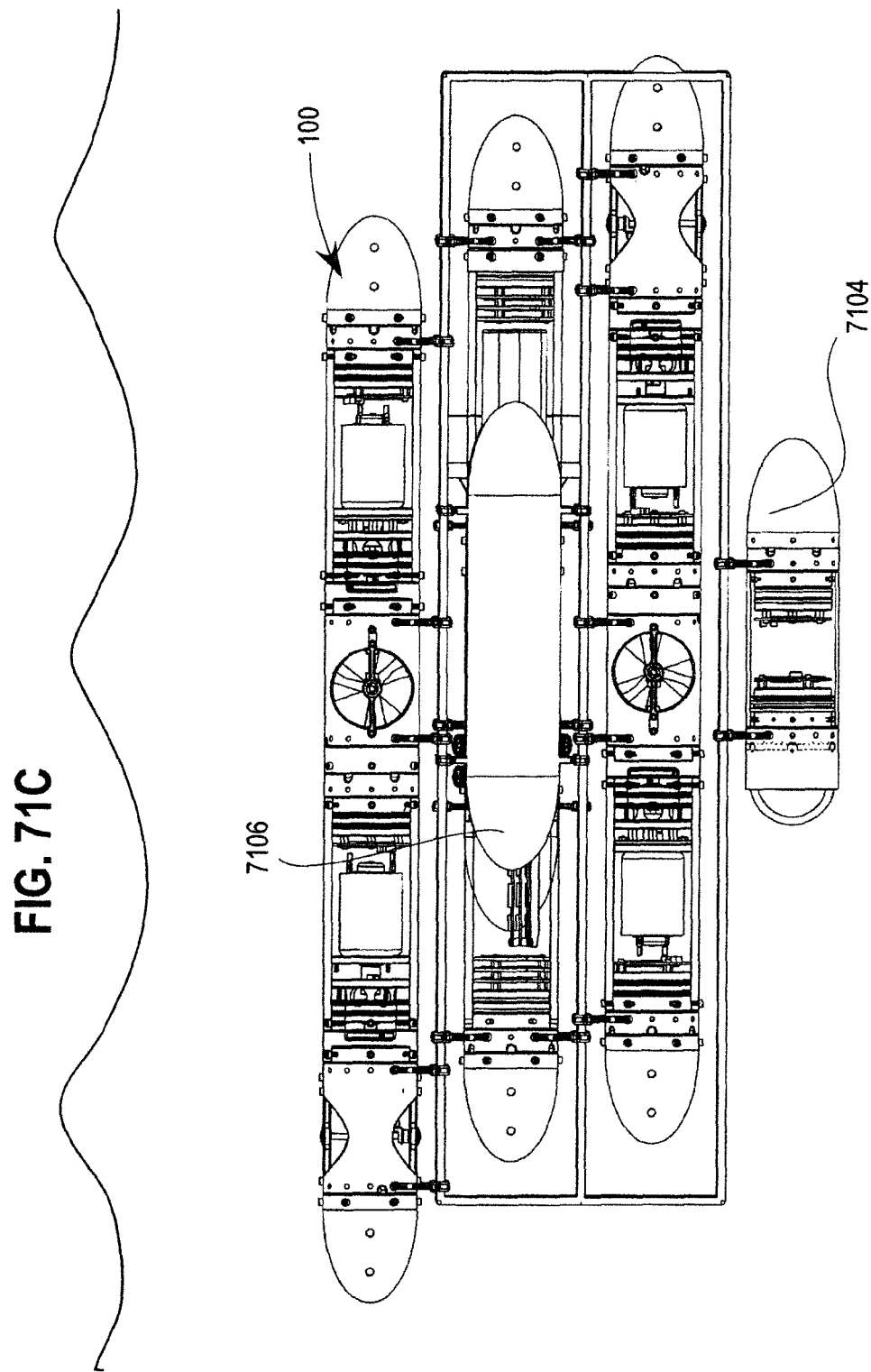
FIG. 71C is a third elevational view of the underwater URV.
Figure 71D:
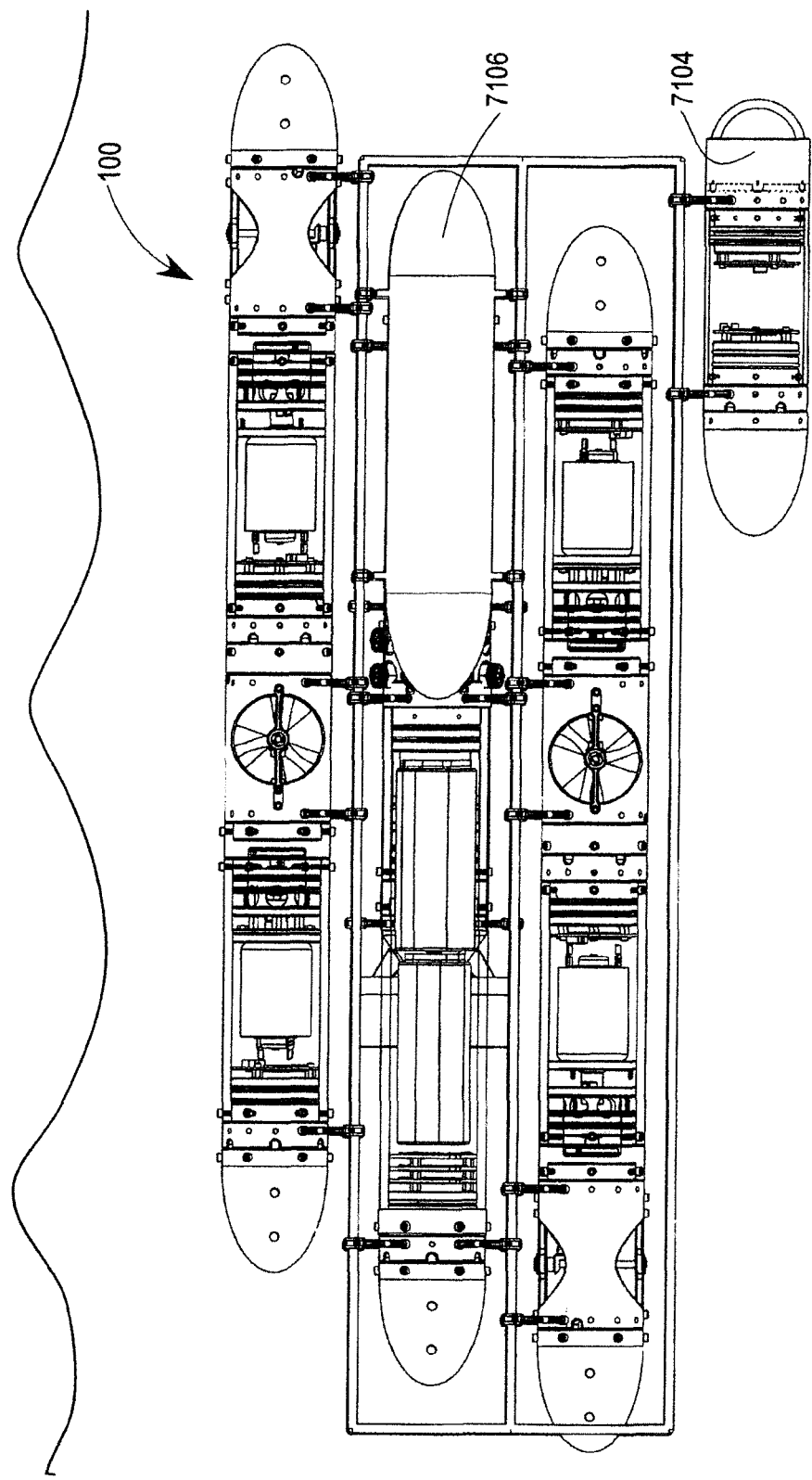
FIG. 71D is a fourth elevational view of the underwater URV.

In FIG. 71A, the URV 100 is underwater in a balanced position such that the longitudinal axes of the pressure vessels 104 are approximately horizontal. In FIG. 71B, the added pressure vessel 7104 has been coupled to one side of the URV 100 using the chassis system as previously described, unbalancing the URV such that the longitudinal axes are no longer horizontal. In FIG. 71C, the added pressure vessel 7104 has been moved along its attached rail 200 such that the URV 100 is rebalanced and the longitudinal axes are again horizontal. In FIG. 71D, an alternate means of rebalancing the URV of FIG. 71B is shown. In FIG. 71D, the buoyancy module 7106 is moved along its attached rail 200 such that the URV 100 is rebalanced.

Referring again to FIGS. 71A-71D, mass and trim change heavily influences the speed of the design cycle for underwater vehicles. For any unrestrained submerged object, gravity will align its center of buoyancy (CB—specifically, the center of gravity of the water the object displaces) vertically above its center of gravity (CG).

The URV must be balanced front to back and side to side by insuring that the axis between the CB and CG is perpendicular to the intended horizontal plane of the resting vehicle. Any offset in that perpendicular alignment will result in the URV 100 listing in the water to an extent proportional to the extent of the misalignment.

Any new pressure vessel that is added or subtracted or re-positioned and that is not either neutrally buoyant or positioned with its own CB and CG axis co-linear with the vehicle's main CB-CG axis will require compensating repositioning of buoyancy to realign the URV's 100 horizontal orientation.

On both commercially available and experimental, researcher-built URVs this balance is typically achieved by calculating the weights and buoyancies of the pressure vessels in advance and positioning them within the chassis with some small measure of adjustability to provide a margin of error. The calculations require considerable skill. If they are in error (or a new pressure vessel that substantially alters the balance needs to be added) and the masses must be repositioned, substantial re-design of the chassis 102 is often needed. Even an error of a few inches of offset will cause a noticeable list. The more often pressure vessels need to be added or subtracted from the URV the more often this time-consuming process will have to be carried out by a knowledgeable engineer.

Having the chassis 102 composed of parallel rails 200 allows the various individual pressure vessels 104 and buoyancy modules 108 to be repositioned forward and backward along the full length of the chassis rails 200 until the positively and negatively buoyant elements are exactly balanced. This gives the user the ability to quickly and easily compensate for even large new loads. Even the inexperienced user can do this quickly and easily using direct observation rather than calculation. By simply placing the URV 100 in water and sliding the pressure vessels or buoyancy modules 108 along the chassis rails 200 until they balance and the chassis 102 floats level in the water (adding new buoyancy 108 or ballast modules 7000 if needed), and then securing them in place, the operation of balancing the URV is made as easy and intuitive as using a balance beam scale.

Exemplary URVs Using the URVDS System

The modularity and the recombinability of the URVDS provides for development of URVs 100 with a vast range of scale, complexity and mission capability. Shown here are examples of URVs 100 developed using the URVDS.

Figure 72:
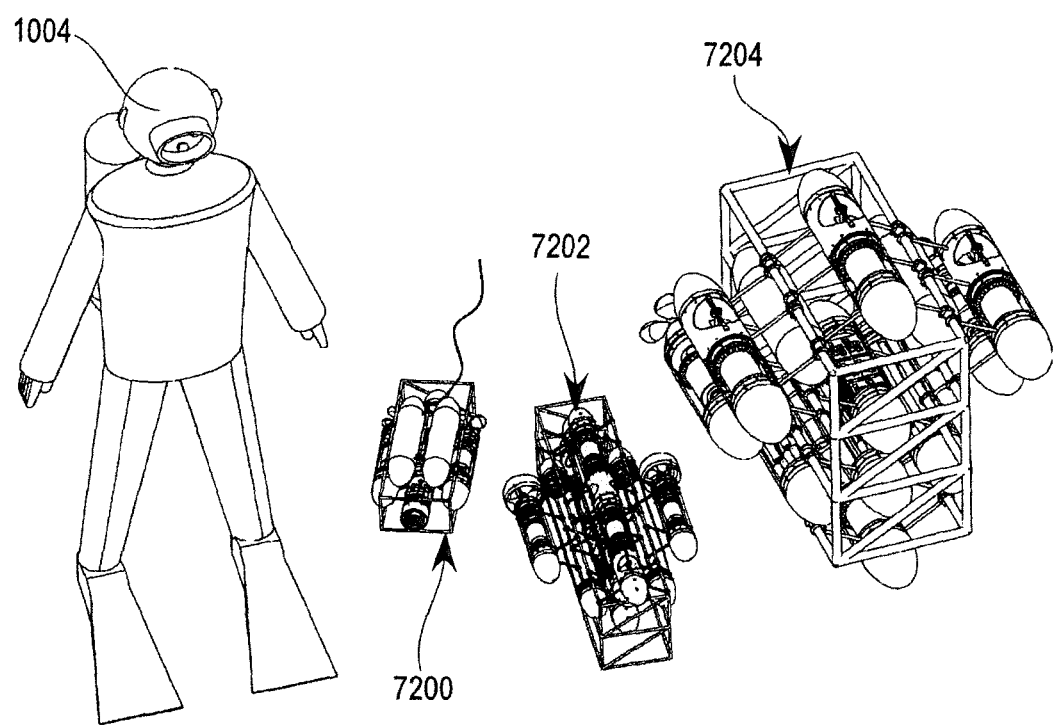
FIG. 72 is a perspective view of a plurality of exemplary URVs.

Referring next to FIG. 72, a plurality of URVs is shown: a one-cell URV 7200, a two-cell URV 7202 and a three-cell URV 7204 along with a diver 1004 for scale.

These small-scale URVs 7200 7202 7204 may include the reconfigurable chassis system or the permanent welded chassis 102. Adding more cells lets the user easily add additional pressure vessels 104 for sensors 4800, computation, buoyancy, batteries, etc. as needed.

Figure 73:
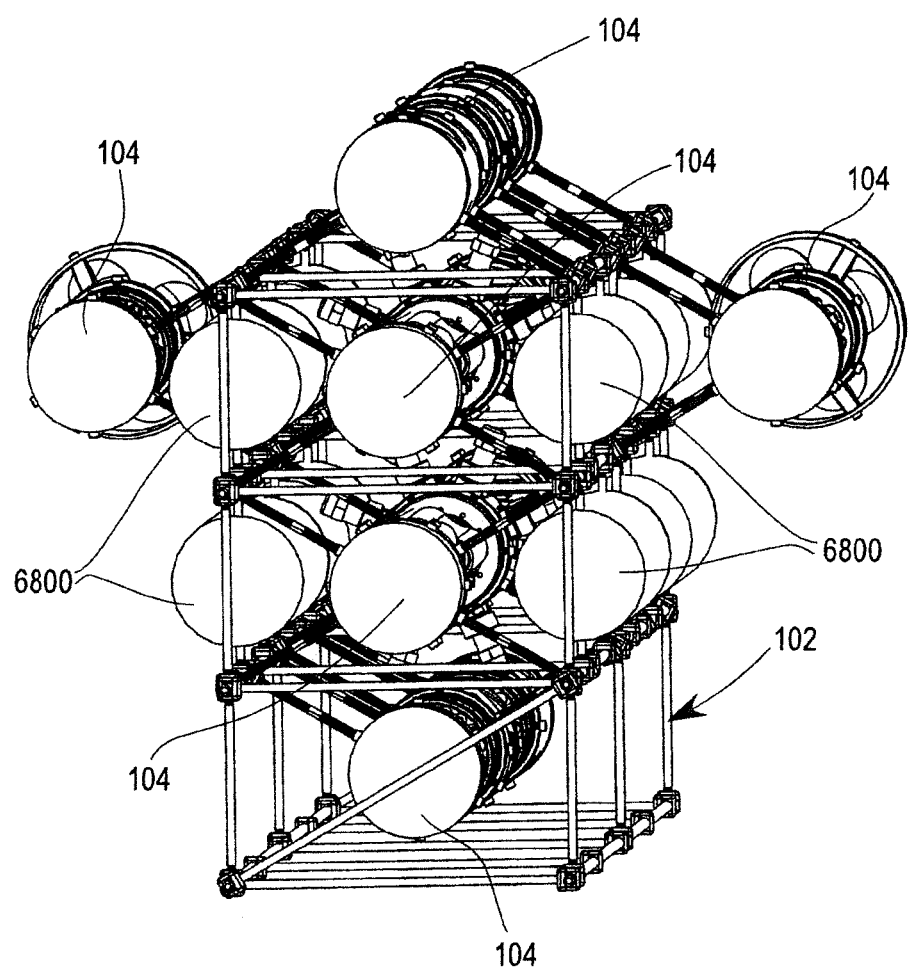
FIG. 73 is a perspective view of an exemplary three-cell URV.

Referring next to FIG. 73, a more complex three-cell URV is shown, including ten pressure vessels 104 coupled to the chassis 102. The URVDS allows for a wide range of numbers of pressure vessels 104 attached to the chassis 102, allowing for the system to be configured for any user requirement.

Small Scale URV Systems

Figure 74:
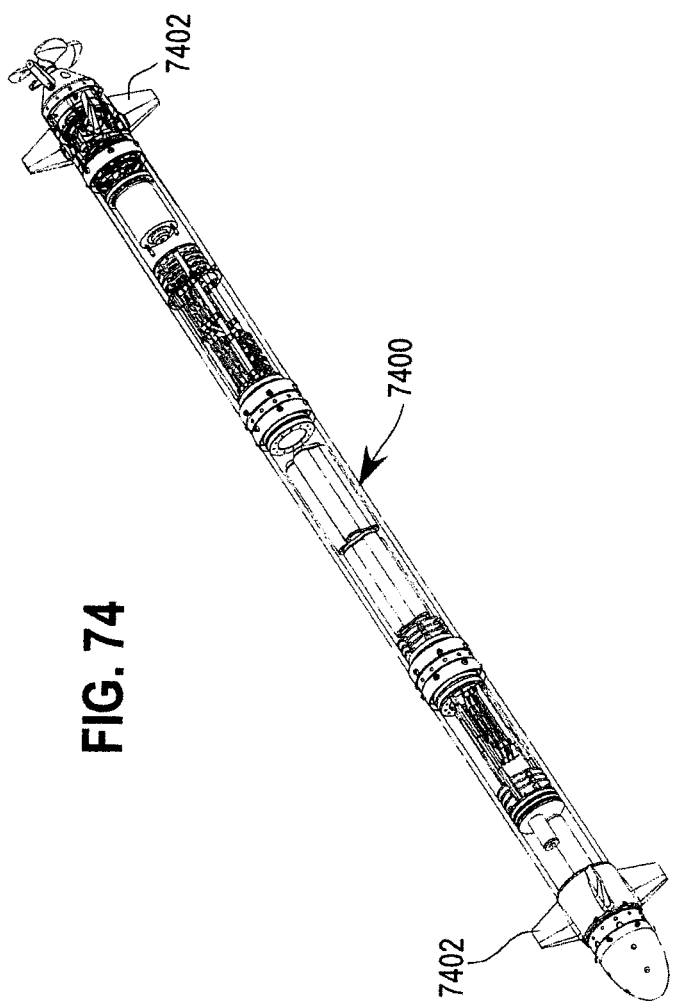
FIG. 74 is a perspective view of an exemplary small-scale URV.

Referring next to FIG. 74, shown is an exemplary small-scale Autonomous Underwater Vehicle (AUV) 7400 in one embodiment of the URVDS. The AUV 7400 includes the URVDS pressure vessel system but includes no external chassis 102 and is configured for untethered autonomous operation. All maneuvering is controlled by a plurality of tailfins 7402. The AUV 7400 depends upon forward motion, with water flowing over their fins, to maneuver. The AUV 7400 is excellent for long distance travel but incapable of station-keeping (maintaining a hover in one spot).

Figure 75:
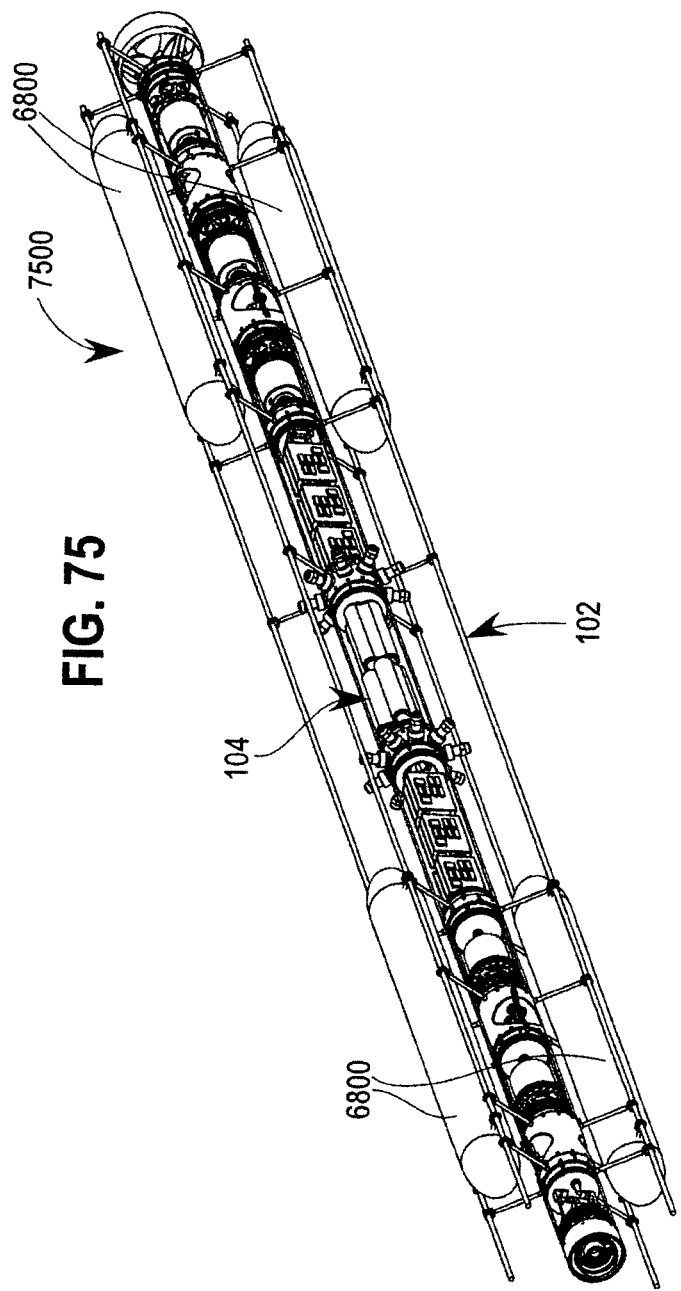
FIG. 75 is a perspective view of an exemplary pipe inspection URV.

Referring next to FIG. 75, an exemplary pipe inspection URV 7500 is shown. The pipe inspection URV 7500 includes a long, narrow one-cell chassis. The pipe inspection URV 7500 includes one inline thruster (at rear), two vertically oriented lateral thrusters and two horizontally oriented lateral thrusters for 5 degrees of freedom, forward, sideways, and vertical motion with pitch and yaw. This would make it a very agile robot in conditions of confined spaces that required fitting through small openings but also required avoiding contact with walls, even in turbulent conditions, such as a forensic or archaeological dive on a shipwreck.

Large Scale URV Systems

The same chassis geometry principles apply to larger frames, allowing larger thrusters, more batteries and heavier loads. As with the smaller 4.5"-grid frames described above, the chassis 102 can be extended to handle more pressure vessels 104 by stacking cells.

Figure 76:
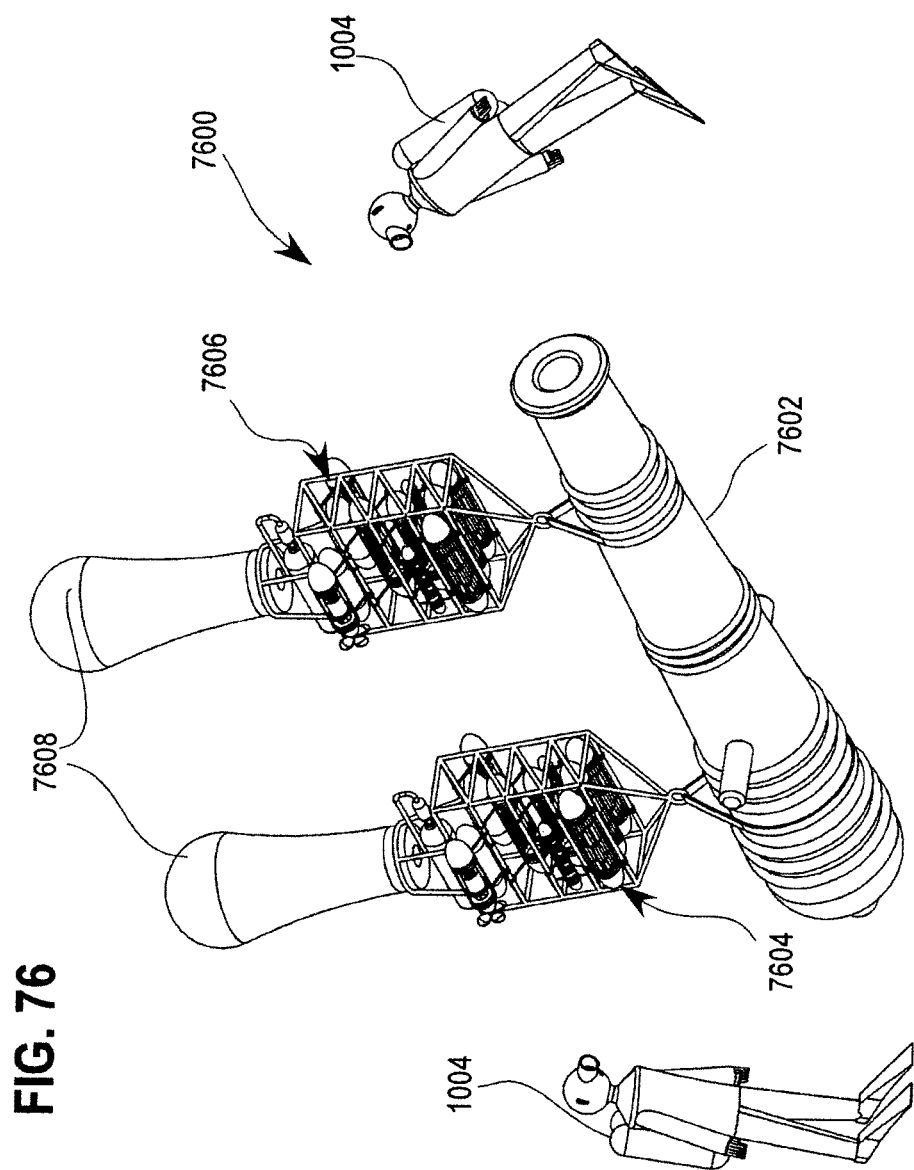
FIG. 76 is a perspective view of an exemplary heavy-lift salvage URV.

Referring next to FIG. 76, an exemplary heavy-lift salvage URV system is shown lifting a piece of heavy underwater salvage 7602. Shown are a first URV 7604, a second URV 7606, two lift bags 7608, the salvage 7602, and the plurality of divers 1004.

The heavy-lift salvage URV 7600 assists salvage divers 1004 recovering large heavy objects from the seafloor. As previously known in the art, one or more divers 1004 would attach inflatable lift bags 7608 to the heavy salvage object 7602 and maneuver it through the water by manually inflating or deflating the lift bag 7608 with air from their scuba tanks to control vertical movement, and swimming along pushing the object. With lift bags 7608 supplying typically able to supply thousands of pounds of lift, this is a tricky operation with large forces involved; and errors or mishaps such as a knot slipping loose or a severed cable between lift bags 7608 and object may be catastrophic.

The exemplary heavy-lift salvage URV 7600 is built on a heavy welded four-cell chassis 102 built on the 9" grid unit 712 with 1" diameter rails 200. Note the use of both 3" and 6" diameter pressure vessels 104, allowed by simply adjusting the strut lengths and using larger rail collars to match the larger frame size. The users would first build the reconfigurable chassis 102 to mount pressure vessels 104 onto to develop the robot and to test and confirm its viability, then build the permanent welded chassis 102 if long term use was desired.

The robot controls the filling and venting of the large lift bags 7608 via an electronically valved air tank using feedback from its depth sensors 4800 to control depth. The lift bags can deliver typically 500 to 1000 lbs of buoyancy each to lift heavy objects off the bottom and move them under command of nearby salvage divers 1004. This allows the salvage divers 1004 a safe stand-off distance from a dangerous operation as well as precise digital control over rates of ascent and positioning. Ultrasonic positioning beacons on each URV could allow each URV to locate its position relative to other robots and allow coordinated 'swarm' behaviors to lift larger objects. This would allow closely coordinated lifting in dark or murky waters where human divers 1004 would be unable to see each other or communicate for coordinated effort.

Referring again to FIG. 10 the exemplary IMAX® camera support URV 1000 is shown. Shown are the IMAX® camera 1002, the support URV 1000, the heavy-duty chassis 900, and the diver 1004.

The URVDS reconfigurable chassis elements make it possible to build large complex and rigid space frames and integrate robotic components into their structures. From a few simple elements, the chassis for a robot of arbitrary size and complexity can be built to fit customized applications. Thus, a robotic 'overcoat' or exoskeleton can be wrapped around large, difficult to maneuver underwater objects.

The exemplary IMAX® camera support URV 1000 is configured to support the 1300 lb IMAX® Underwater Camera 1002 system, used to create high-definition underwater movies in panoramic format for the popular IMAX® Theatres. Although it is neutrally buoyant in water, the housed camera's 1300 lb inertial mass and high drag make it operable in only the most benign underwater conditions, normally requiring two divers 1004 to manipulate it, making it difficult to aim and follow fast swimming sea creatures. The system is impossible for even strong divers 1004 to swim with against ocean currents as small as one knot, and conditions of strong surf or surge make its shifting 1300 lb mass too dangerous for operators to be near.

Wrapping the camera system 1002 in the robotic exoskeleton URV 1000 with inline and lateral thrusters for 6-degree-of-freedom maneuvering and accelerometers and gyroscopes for stabilization would eliminate those difficulties, providing precise, autonomous or joystick-controlled self-propulsion, rapid and precise camera pan and tilt, and full camera stabilization even in the presence of chaotic current, surf and surge. The camera 1002 could then be driven via a joystick and ethernet tether from a surface vessel or by the diver 1004 swimming alongside the camera 1002 with a waterproof joystick. Used with an ultrasonic positioning system, it would enable complex underwater tracking shots to be made with the complete repeatability for multiple takes that camera operators on land enjoy.

One standard cell and trapezoidal cell form the basic space frame pressure vessel chassis 900. As with small-scale chassis 102, the IMAX Camera chassis 900 consists of only the five typical chassis elements: 1" diameter×4' long rails 200, 9" posts 206, 15.588" (9×(tan 60))" beams 204, and 18" braces 202, all 0.75" diameter, and the rail clamps 208 that join the elements.

Thrusters, batteries, computer, sensors 4800 and buoyancy elements are mounted on the chassis 900. The chassis 900 could easily be extended and adapted to provide a place for the diver 1004/cameraman to ride (or be towed) behind the camera 1002, making the system a manned underwater camera platform that could give the diver 1004/cameraman more precise control and faster camera movement than divers 1004 could provide by pushing the camera 1002.

For production quantities of such a roboticized camera system URV 1000 the welded steel or aluminum chassis 900 would be made. But during prototyping, the reconfigurable chassis system would allow rapid design iterations allowing faster and more frequent experimental verification or rejection of design changes required to perfect the permanent chassis than could be obtained by constantly cutting and re-building the welded prototype chassis.

Other Robotic Applications

A robotic exoskeleton chassis similar to the heavy-duty chassis 900 could be quickly built to accommodate standard oceanographic data collection tools like a Seabird SBE-32 Carousel Water Sampler. The Water Sampler, normally deployed from a ship via a tether cable, collects 24 water samples either autonomously or on operator command. It could be configured as a robotic free-swimming sampler, capable of autonomously taking samples from several different locations and depths along a pre-programmed route. This could allow a single ship to drop several units, each independently collecting samples over many days, then recover them, rather than having the ship committed to managing one tethered sampler at a time, staying on station for several days, then repeating the multi-day process at several locations. Since research vessel operations cost tens of thousands of dollars per day, this could multiply the effectiveness of research trips while achieving great cost savings.

While the invention herein disclosed has been described by means of specific embodiments, examples and applications thereof, numerous modifications and variations could be made thereto by those skilled in the art without departing from the scope of the invention set forth in the claims.

What is claimed is:

1. An underwater robotic vehicle development system comprising:
    a chassis comprising a plurality of rods coupled together to form a space frame;
    a pressure vessel having a pressure vessel longitudinal axis and including a plurality of threaded link strut mounting holes on an external portion of the pressure vessel; and
    a plurality of link struts each having a first end and a threaded second end, wherein the first end of each link strut of the plurality of link struts is coupled to one rod of the chassis and the threaded second end of each link strut of the plurality of link struts is threaded into one of the plurality of threaded link strut mounting holes of the pressure vessel, whereby the pressure vessel is coupled to the chassis.

2. The underwater robotic vehicle development system of claim 1, wherein the pressure vessel comprises a first tube interposed between and coupled to a first end cap and a second end cap, wherein the first tube, the first end cap, and the second end cap each have a longitudinal axis generally coincident with the pressure vessel longitudinal axis, wherein each end cap includes at least one of the plurality of threaded link strut mounting holes, and wherein the pressure vessel is configured to provide a dry interior tube space within the first tube when the pressure vessel is underwater.

3. The underwater robotic vehicle development system of claim 2, wherein at least one end cap includes at least one component mounting hole juxtaposed with the dry interior tube space and configured for mounting at least one interior component within the dry interior tube space.

4. The underwater robotic vehicle development system of claim 2, the pressure vessel further comprising:
    a second tube interposed between and coupled to the first tube and the second end cap, and
    a link interposed between and coupled to the first tube and the second tube, wherein the second tube and the link each have a longitudinal axis generally coincident with the pressure vessel longitudinal axis.

5. The underwater robotic vehicle development system of claim 4, the link further including at least one of the plurality of threaded link strut mounting holes on an external portion of the link.

6. The underwater robotic vehicle development system of claim 4, wherein the link is generally tubular and configured such that the dry interior tube space is continuous from the first tube to the second tube via the link.

7. The underwater robotic vehicle development system of claim 6, the link further including at least one connection port configured to provide at least one waterproof exterior connection port on an exterior surface a perimeter of an external portion of the link, whereby a component within the dry interior tube space of the pressure vessel can be connected to an exterior element via the connection port.

8. The underwater robotic vehicle development system of claim 4, the pressure vessel further comprising:
 a third end cap interposed between and coupled to the first tube and the link;
 a fourth end cap interposed between and coupled to the link and the second tube, whereby the pressure vessel provides separate dry interior tube spaces within the first tube and the second tube when the pressure vessel is underwater.

9. The underwater robotic vehicle development system of claim 8, wherein at least one of the third end cap and the fourth end cap are configured to allow a cable to pass through the end cap from the interior dry tube space to outside of the pressure vessel while preventing water from entering the interior dry tube space.

10. The underwater robotic vehicle development system of claim 4, the link further comprising a propeller.

11. The underwater robotic vehicle development system of claim 10, wherein an axis of the propeller is oriented orthogonally to the pressure vessel longitudinal axis.

12. The underwater robotic vehicle development system of claim 2, the pressure vessel further comprising a dry nosecone including a parabolic external portion, wherein the dry nosecone is coupled to the first end cap such that the first end cap is interposed between the first tube and the dry nosecone and the parabolic external portion is distal to the first tube, wherein an axis of symmetry of the parabolic external portion is generally coincident with the longitudinal axis of the pressure vessel.

13. The underwater robotic vehicle development system of claim 2, the pressure vessel further comprising a propeller module coupled to the first end cap such that the first end cap is interposed between the first tube and the propeller module, the propeller module including a propeller wherein a rotational axis of the propeller is generally coincident with the pressure vessel longitudinal axis.

14. The underwater robotic vehicle development system of claim 13, the first end cap further comprising a plurality of movable rudders extending outward from an exterior perimeter surface of the first end cap.

15. The underwater robotic vehicle development system of claim 1, wherein the first end of each link strut of the plurality of link struts being coupled to one rod of the chassis further comprises the first end of at least one of the of the plurality of link struts coupled to a rail clamp and coupling the rail clamp to the rod.

16. The underwater robotic vehicle development system of claim 15, wherein the rail clamp includes an aperture configured to receive the rod, and the rail clamp being coupled to the rod includes the rod passing through the aperture.

17. The underwater robotic vehicle development system of claim 1, wherein the plurality of rods includes a first rod and a second rod, and the plurality of rods coupled together to form a space frame includes an end of the first rod coupled to a rail clamp having an aperture configured to receive the second rod, and the second rod passing through the aperture.

18. The underwater robotic vehicle development system of claim 1, further comprising at least one buoyancy module configured to be buoyant in water coupled to the chassis.

19. The underwater robotic vehicle development system of claim 18, wherein the buoyancy module is coupled to the chassis via at least one buoyancy module link strut having a first end and a threaded end, wherein the first end is coupled to the chassis and the second end is coupled to the buoyancy module.

* * * * *

UNITED STATES PATENT AND TRADEMARK OFFICE
CERTIFICATE OF CORRECTION

PATENT NO. : 10,093,403 B2
APPLICATION NO. : 15/089929
DATED : October 9, 2018
INVENTOR(S) : Williams Page 1 of 1

It is certified that error appears in the above-identified patent and that said Letters Patent is hereby corrected as shown below:

In the Claims

Claim 15, Column 58, Line 18, delete "of the of the" and insert --of the--.

Signed and Sealed this
Twenty-ninth Day of January, 2019

Andrei Iancu
*Director of the United States Patent and Trademark Office*